United States Patent
Buckland et al.

(10) Patent No.: US 11,704,809 B2
(45) Date of Patent: Jul. 18, 2023

(54) METHODS, SYSTEMS AND COMPUTER PROGRAM PRODUCTS FOR CLASSIFYING IMAGE DATA FOR FUTURE MINING AND TRAINING

(71) Applicant: Translational Imaging Innovations, Inc., Hickory, NC (US)

(72) Inventors: Eric L. Buckland, Hickory, NC (US); Micaela R. Mendlow, Jersey City, NJ (US); Robert C. Williams, Durham, NC (US)

(73) Assignee: Translational Imaging Innovations, Inc., Hickory, NC (US)

( * ) Notice: Subject to any disclaimer, the term of this patent is extended or adjusted under 35 U.S.C. 154(b) by 248 days.

(21) Appl. No.: 17/142,560

(22) Filed: Jan. 6, 2021

(65) Prior Publication Data
US 2021/0209758 A1    Jul. 8, 2021

Related U.S. Application Data

(60) Provisional application No. 62/957,401, filed on Jan. 6, 2020.

(51) Int. Cl.
  *G06T 7/12*    (2017.01)
  *G06T 7/00*    (2017.01)
  *G06F 18/243*    (2023.01)

(52) U.S. Cl.
  CPC .............. *G06T 7/12* (2017.01); *G06F 18/243* (2023.01); *G06T 7/0012* (2013.01);
  (Continued)

(58) Field of Classification Search
  CPC ................... G06T 7/0012; G06T 7/12; G06T 2207/10101; G06T 2207/20021;
  (Continued)

(56) References Cited

U.S. PATENT DOCUMENTS

| | | | |
|---|---|---|---|
| 8,811,745 B2 | 8/2014 | Farsiu et al. | |
| 1,169,864 A1 | 1/2019 | Bagherinia | |
| 2015/0317790 A1* | 11/2015 | Choi | ............. G06T 7/12 382/128 |

OTHER PUBLICATIONS

Altman, D.G. et al., Measurement in Medicine: The Analysis of Method Comparison Studies, 307-317 (1983).
(Continued)

*Primary Examiner* — Siamak Harandi
(74) *Attorney, Agent, or Firm* — Stanek Lemon Crouse & Meeks, PA

(57) ABSTRACT

A method for segmenting images is provided including tessellating an image obtained from one of an image database and an imaging system into a plurality of sectors; classifying each of the plurality of sectors by applying one or more pre-defined labels to each of the plurality of sectors, wherein the pre-defined labels indicate at least one of an image quality metric (IQM) and a metric of structure; assigning each of the plurality of classified sectors an Image Quality Classification (IQC); identifying anchor sectors among the plurality of classified sectors, applying filtering and edge detection to identify target boundaries; applying contouring across contiguous sectors and using the assigned IQC as a guide to complete segmentation of an edge between any two identified anchor sectors; and smoothing across segmented regions to increase parametric second-order continuity.

20 Claims, 34 Drawing Sheets

(52) U.S. Cl.
CPC ............... *G06T 2207/10101* (2013.01); *G06T 2207/20021* (2013.01); *G06T 2207/30041* (2013.01); *G06T 2207/30168* (2013.01)

(58) Field of Classification Search
CPC . G06T 2207/30041; G06T 2207/30168; G06T 2200/24; G06T 2207/20076; G06T 7/136; G06T 7/143; G06K 9/6279; G06F 18/243
See application file for complete search history.

(56) References Cited

OTHER PUBLICATIONS

Atkinson, G. et al., Comment on the Use of Concordance Correlation to Assess the Agreement between Two Variables, vol. 53 (International Biometric Society).
Bach, A. et al., Axial length development in children, Int. J. Ophthalmol. 12, 815-819 (2019).
Barnhart, H.X. et al., An overview on assessing agreement with continuous measurements, vol. 17 (2007).
Bernstein, S.L. et al., Postnatal growth of the human optic nerve, Eye 30, 1378-1380 (2016).
Bland, J.M. et al., Statistical Methods for Assessing Agreement Between Two Methods of Clinical Measurement, The Lancet, 327, 307-310 (1986).
Blindness Statistics National Federation of the Blind.
Box, G.E.P. et al., On the Experimental Attainment of Optimum Conditions, J. R. Stat. Soc. Ser. B Methodol. 13, 1-38 (1951).
CDC Vision Health Initiative Economic Studies. https://www.cdc.gov/visionhealth/projects/economic (2017).
Chatziraili, I. et al.. Angioid Streaks: A Comprehensive Review From Pathophysiology to Treatment, Retina, 2019;39(1):1-11, doi: 10.1097/AE.0000000000002327.
Chen, M. et al., Shape Decomposition of Foveal Pit Morphology using Scan Geometry Corrected OCT, Ophthalmic Med Image Anai (2019), 2019;11855:69-76, doi:10.1007/978-3-1030-32956-3_9.
Chiu, S.J. et al., Automatic segmentation of seven retinal layers in SDOCT images congruent with expert manual segmentation. Opt Express, 2010;18(18):19413-19428, doi:10.1364/OE.18.018413.
Dubbelman, M. et al., Radius and asphericity of the posterior corneal surface determined by corrected, Scheimpflug photography, Acta ophthalmologica Scandihavica 80, 379-382, doi:10.1034/.1600-0420.2002.800406.x (2002).
Dubis, A.M. et al., Reconstructing foveal pit morphology from optical coherence tomography Imaging, Br J Ophthalmol 2009;93(9):1223-1227, doi:10.1136/bjo.2008.150110.
Gao, Q. et al., Refractive Shifts in Four Selected Artificial Vitreous Substitutes Based on Gullstrand-Emsley and Liou-Brennan Schematic Eyes, Invest. Ophthalmol. Vis. Sci. 50, 3529-3534 (2009).
Gilbert, C. et al., Childhood blindness in the context of Vision 2020—The right to sight, Bull. World Health Organ. 79, 227-232 (2001).
Graham, R.L. et al., Apollonian, circle packings: number theory, Journal of Number Theory, vol. 100, Issue 1,2003, pp. 1-45, ISSN 002-314X, https://doi.org/10.1016/S0022-314X(03)00015-5.
Hendrickson et al., Rod Photoreceptor Differentiation in Fetal and infant Human Retina, Exp. Eye Res. 87, 415-426 (2018).
Hu, H. et al., Characterization, treatment and prognosis of retinoblastoma with central nervous system metastasis. BMC Qphthamol. 18, 107 (2018).
Kazerouni, A.M., (2009), Design and analysis of gauge R&R studies: Making decisions based on ANOVA method, 52.
Kolb C. et al., 3-D printing of highly translucent ORMOCER®-based resign using light absorber for high dimensional accuracy, J. Appl Polym Sci, 2020; 138:e49691, https://doi.org/10.1002/app.49691.
Kuo, A.N. et al. Correction of ocular shape in retinal optical coherence tomography and effect on current clinical measures, American Journal of Ophthalmology 156, 304-311, doi:10.1016/j.ajo.2013.03.012(2013).

Lee, H., et al., Comparison of mouse and human retina; morphology and function in albinism: potential implications for therapeutic development, The Lancet 389, S59 (2017).
Lee, H. et al., In vivo foveal development using optical coherence tomography, Invest. Ophthalmol Vis. Sci. 56,4537-4545 (2015).
Lee, H et al., Pediatric optical coherence tomography in clinical practice-recent progress, Invest. Ophthalmol. Vis. Sci. 57, OCT69-OCT79 (2016).
Lee, J.Y. et al., Fully Automatic Software for Retinal Thickness in Eyes With Diabetic Macular Edema From Images Acquired by Cirrus and Spectraiis Systems, Invest Ophthalmol Vis Sci 54, 7595-7602 (2013).
Lim, M.E. et al., Handheld Optical Coherence Tomography Normative Inner Retinal Layer Measurements for Children <5 Years of Age, Am. J. Ophthalmol. 207, 232-239 (2019).
Lin, L.I.-K., A Concordance- Correlation Coefficient to Evaluate Reproducibility, Biometrics 45, 255 (1989).
Linderman, R. et al., Assessing the Accuracy of Foveal Avascular Zone Measurements Using Optical Coherence Tomography Angiography: Segmentation and Scaling, Trans. Vis. Sci. Tech., 2017;6(3):16, doi: https://doi.org/10.1167/tvst.6.3.16.
Lianas, S. et al. Assessing the Use of Incorrectly Seated Optical Coherence Tomography Angiography Images in Peer-Reviewed Studies: A Systematic Review, JAMA Ophthalmol. (2019)doi:10.001/jamaopthalmol.2019.4821.
Mocan, M.C et al., The Relationship Between Optic Nerve Cup-to-Disc Ratio and Retinal Nerve Fiber Layer Thickness in Suspected Pediatric Glaucoma, J Pediatr Ophthalmol Strabismus, 2020;57(2):90-96, doi: 10.3928/01913913-20200117-02.
Moore, B.A. et al., Fovea: a new program to standardize the measurement of foveal pit morphology, PeerJ. 2016;4:e1785, Published Apr. 11, 2016, doi:10.7717/peerj.1785.
Musin, O., "Analogs of Steiner's porism and Soddy's hexlet in higher dimensions via spherical codes", Archiv der Mathematik 111 (2018): 493-501.
Norrby, S., The Dubbelman eye model analysed by ray tracing through aspheric surfaces, Ophthalmic & physiological optics, The Journal of the British College of-Ophthalmic Opticians (Optometrists) 25, 153-161, doi:10.1111/j.1475-1313.2004.00268.x (2005).
Park, H.Y. et al., Optic Disc Change during Childhood Myopic Shift: Comparison between Eyes with an Enlarged Cup-to-Disc Ratio and Childhood Glaucoma Compared to Normal Myopic Eyes, [published correction appears in PLoS One, 2015;10(9):e0137938], [published correction appears in PLoS One, 2016;11(2):e0150316, Kim, Sung Eum [corrected to Kim, Sung Eun]], PLoS One, 2015;10(7):e0131781, Published Jul. 6, 2015, doi:10.1371/journal.pone.0131781.
Patel, A. et al., Optic Nerve Head Developmentin Healthy Infants and Children Using Handheld Spectral-Domain Optical Coherence Tomography, Ophthalmology, vol. 123, 2147-2157 (Elsevier Inc., 2016).
Rao, R. et al., Retinoblastoma, Indian J. Pediatr. 84, 937-944 (2017).
Retinoblastoma—St. Jude Children's Research Hospital, https://www.stjude.org/disease/retinoblastoma.html, 5 pages (2021).
Sardar, D.K. et al., Optical properties of ocular tissues in the near infrared region, Lasers Med. Sci. 22, 46-52 (2007).
Soddy, F., The Bowl of Integers and the Hexlet, Nature 139, 77-79 (1937), https://doi.org/10.1038/139077a0.
Uhlhom, S.R. et al., Refractive index measurement of the isolated crystalline lens using optical coherence tomography, Vision Res 48, 2732-2738, doi:10.1016/j.visres.2008.09.010 (2008).
Vajzovic, L. et al., Maturation of foe Huma Fovea : Correlation, of Spectral-Domain Optical Coherence Tomography Finding With Histology, Am. J. Ophthalmol. 154, 779-789.e2 (2012).
Vallejos, R. et al., A Spatial Concordance Correlation Coefficient with an Application to Image Analysis, (2019).
Westheimer, G., "Retinal Light Distribution for Circular Apertures in Maxwellian View", J. Opt. Soc. Am.49, 41-44 (1959).
Westphal, V. et al., Correction of geometric and refractive image distortions in optical coherence tomography applying Fermat's principle, Opt. Express 10, 397-404 (2002).
Williams, D.R., Visual consequences of the foveal pit, Invest. Ophthalmol. Vis. Sci. 19, 653-667(1980).

(56) References Cited

OTHER PUBLICATIONS

World Medical Association, World Medical Association Declaration of Helsinki: ethical principle for medical research involvlnd human subjects. JAMA 310, 2191-2194 (2013).

Kauer et al., Automatic Quality Evaluation as Assessment Standard for Optical Coherence Tomography, Progress in Biomedical Optics and Imaging SPIE, 10868, 2019, 11 pages (pp. 1086814-1-1086814-11).

International Search Report and Written Opinion, PCT/US2021/012290; dated Mar. 30, 2021; 23 pages.

* cited by examiner

| TARGET | LENGTH [NT] | HEIGHT [IS] | ASCANS | BSCANS |
|---|---|---|---|---|
| MACULA | 10 MM | 5 MM | 500 | 100 |
| OPTIC NERVE HEAD | 10 MM | 10 MM | 500 | 100 |
| WIDEFIELD | 12 MM | 8 MM | 600 | 80 |

FIG. 2

| SEGMENT | REION | SUB-REGION | NAMED STRUCTURE | LAYER | INNER SURFACE | OUTER SURFACE |
|---|---|---|---|---|---|---|
| POSTERIOR CHAMBER | | | VITREOUS | | | |
| | INNER RETINA | | RETINAL NERVE FIBER LAYER | 1 | | b |
| | | GANGLION CELL COMPLEX | GANGLION CELL LAYER | 2 | a | c |
| | | | INNER PLEXIFORM LAYER | 3 | b | d |
| | | | INNER NUCLEAR LAYER | 4 | c | e |
| | | | OUTER PLEXIFORM LAYER | 5 | d | f |
| | OUTER NUCLEAR LAYER | | OUTER NUCLEAR LAYER | 6 | e | h |
| | OUTTER RETINA | | EXTERNAL LIMITING MEMBRANE | | f | g |
| | | | OUTER SEGMENT | | | h |
| | | | ELLIPZOID ZONE | | | i |
| | | | RETINAL PIGMENT EPITHELIUM | | | j |
| | | | BRUCH'S MEBRANE | | | k |
| | | | CHORIOCAPILARRIS | | | |
| | CHOROID | | CHOROID | | | |
| | | | SCLERA | | | |

FIG. 3C

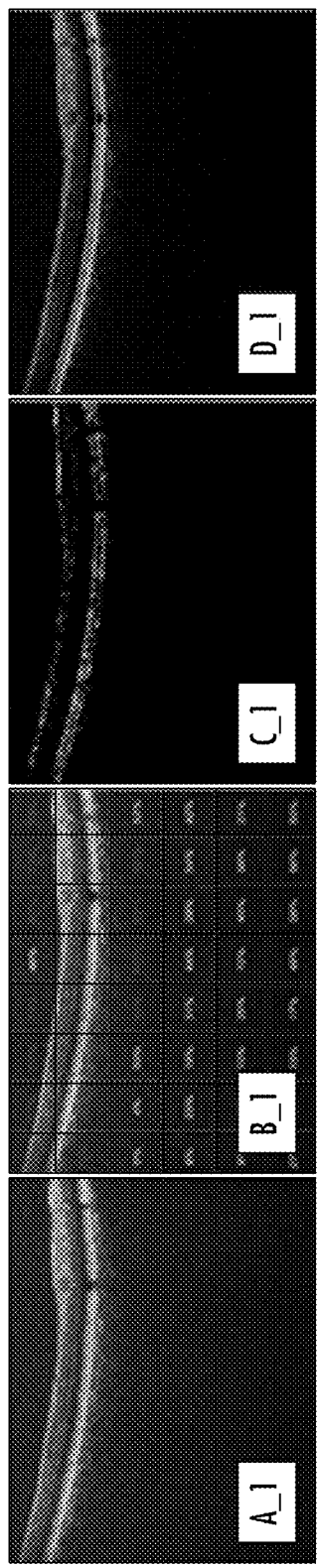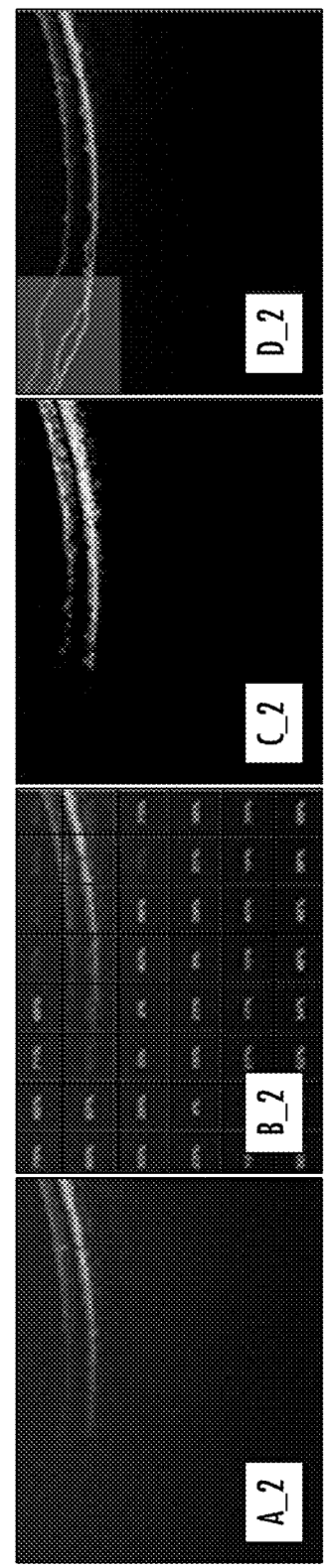

TABLE: SPECIFICATIONS OF THE ANALYTICAL EYE MODEL AND THE OPTOMECHANICAL EYE MODEL

ANALYTICAL EYE MODEL

| ELEMENT NO. | ELEMENT | RADIUS* (mm) | THICKNESS* (mm) | INDEX N- (550nm) |
|---|---|---|---|---|
| 1 | CORNEA | 7.87 | 0.574 | 1.376 |
| 2 | ANTERIOR CHAMBER | 6.40 | 3.520 | 1.336 |
| 3 | CRYSTALLINE LENS | 10.91 | 3.756 | 1.427 |
| 4 | VITREOUS CAVITY | -6.16 | 16.320 | 1.336 |
| 5 | RETINA | -13.00 | 0.250 | 1.360 |

OPTOMECHANICAL EYE MODEL

| ELEMENT NO. | ELEMENT | RADIUS* (mm) | THICKNESS* (mm) | INDEX N- (550nm) |
|---|---|---|---|---|
| 1 | CORNEA | 10.3 | 3.98 | 1.519++ |
| 2 | ANTERIOR CHAMBER | INFINITY | 3.00 | 1.334+++ |
| 3 | CRYSTALLINE LENS | 30.360 | 2.590 | 1.519++ |
| 4 | VITREOUS CAVITY | -30.360 | 15.60 | 1.334+++ |
| 5 | RETINA | -13.00 | - | - |

*RADII AND THICKNESS OF THE ANALYTICAL MODEL ARE OBTAINED FROM DUBBELMAN FOR A RELAXED (OD ACCOMMODATION ADULT (35 YEARS) EYE. -REFRACTIVE INDICES OF THE CORNEA AND OCULAR MEDIA IN THE ANALYTICAL MODEL ARE TAKEN FROM GULLSTRAND EXCEPT FOR THE LENS FOR WHICH AN EQUIVALENT REFRACTIVE INDEX IS ADOPTED
++RADII OF CURVATURE AND REFRACTIVE INDICES OF THE GLASS LENSES (LA1074 AND LB1258, THORLABS).
+++REFRACTIVE INDEX OF BALANCED SALINE SOLUTION

| 25 BRIGHT |
| GCC 75 GRAY |
| INL 25 DARK |
| OPL 25 BRIGHT |
| ONL 75 DARK |
| OS 50 BRIGHT |

| LAYER | THICKNESS (um) | ATTEN COEFF | ATTEN COEFF (dB/um) | LAYER ATTEN. (dB) |
|---|---|---|---|---|
| RNFL | 25 | 3 | -0.017 | -0.43 |
| GCC | 75 | 2 | -0.011 | -0.85 |
| INL | 25 | 1 | -0.006 | -0.14 |
| OPL | 25 | 2 | -0.011 | -0.28 |
| ONL (INNER) | 50 | 1 | -0.006 | -0.28 |
| ELM | 5 | 1 | -0.006 | -0.03 |
| ONL (OUTER) | 25 | 1 | -0.006 | -0.14 |
| OUTER RETINA | 50 | 3 | -0.017 | -0.85 |
| TOTAL | 280 | | | -3.01 |

| H (mm) | | LAYERS | | | | | | |
|---|---|---|---|---|---|---|---|---|
| 17 | | 0 | 1 | 2 | 3 | 4 | 5 | |
| | 1 | 0.06 | 0.18 | 0.53 | 1.59 | 4.76 | 14.29 | RESOLVED CONE ANGLE (MILLIRADIANS) |
| | 2 | 0.12 | 0.35 | 1.06 | 3.18 | 9.53 | 28.58 | |
| UNIT DIAMETER (um) | 4 | 0.24 | 0.71 | 2.12 | 6.35 | 19.06 | 57.11 | |
| | 6 | 0.35 | 1.06 | 3.18 | 9.53 | 28.58 | 85.56 | |
| | 8 | 0.47 | 1.41 | 4.24 | 12.71 | 38.10 | 113.86 | |
| | 10 | 0.59 | 1.76 | 5.29 | 15.88 | 47.61 | 141.98 | |
| | 1 | 0.003 | 0.010 | 0.030 | 0.091 | 0.273 | 0.819 | RESOLVED CONE ANGLE (DEGREES) |
| | 2 | 0.007 | 0.020 | 0.061 | 0.182 | 0.546 | 1.638 | |
| UNIT DIAMETER (um) | 4 | 0.013 | 0.040 | 0.121 | 0.364 | 1.092 | 3.272 | |
| | 6 | 0.020 | 0.061 | 0.182 | 0.546 | 1.638 | 4.902 | |
| | 8 | 0.027 | 0.081 | 0.243 | 0.728 | 2.183 | 6.524 | |
| | 10 | 0.034 | 0.101 | 0.303 | 0.910 | 2.728 | 8.135 | |

FIG. 15B

APPOLLONIAN CIRCLE PACKING (-1, 2, 2, 3)

APPOLLONIAN CIRCLE PACKING (-6, 11, 14, 15)

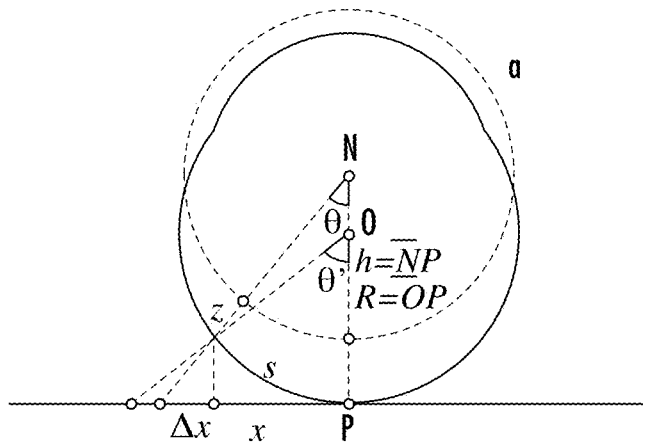
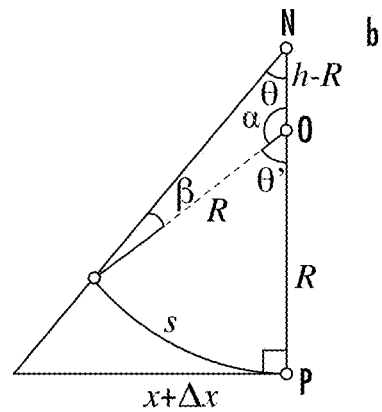
FIG. 19A
FIG. 19B
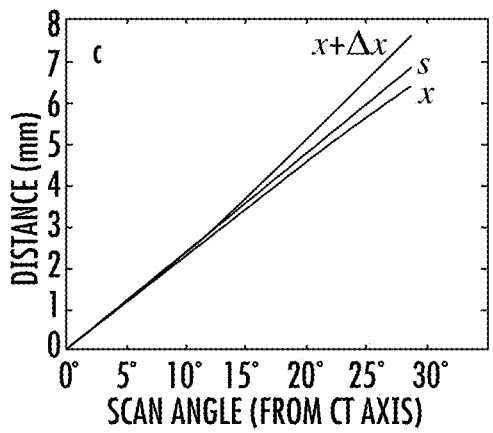
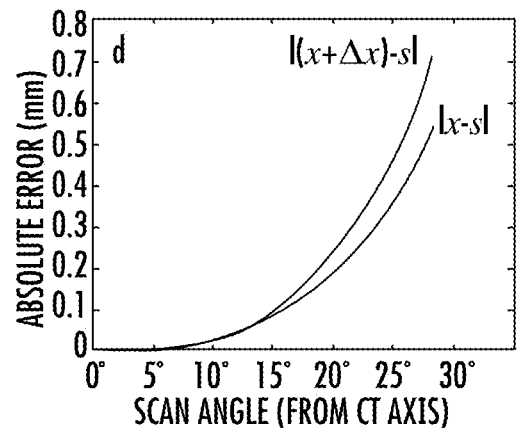
FIG. 19C
FIG. 19D
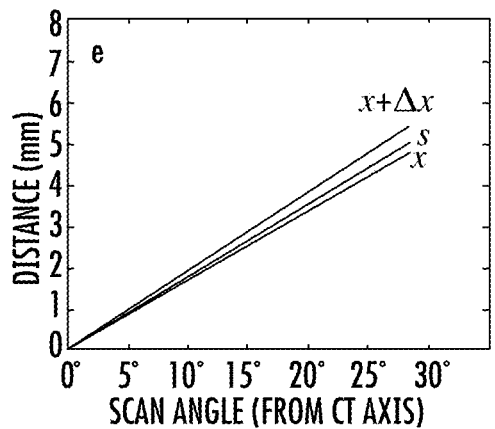
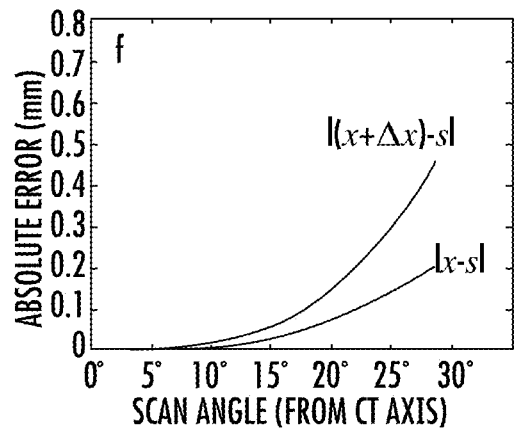
FIG. 19E
FIG. 19F

METHODS, SYSTEMS AND COMPUTER PROGRAM PRODUCTS FOR CLASSIFYING IMAGE DATA FOR FUTURE MINING AND TRAINING

CLAIM OF PRIORITY

The present application claims priority to U.S. Provisional Application No. 62/957,401, filed Jan. 6, 2020, entitled Medical Image Processing Development Training and Validation Environment, the content of which is hereby incorporated herein by reference in its entirety.

GOVERNMENT CONTRACT

This inventive concept was made with government support under Grant No. 1R43EY030408 awarded by the National Institute of Health. The government has certain rights in the inventive concept.

BACKGROUND

Childhood blindness is listed as a high priority within the World Health Organization's Vision 2020—The Right to Sight program. Worldwide, 1.4 million children may be blind. There are 63,000 blind children in the United States, and 700,000 children reporting a visual disability. The number of blind children in the United States Vision loss and blindness cost the U.S. economy $51.4 billion annually. Many causes of vision loss and blindness in children are considered avoidable or amenable to treatment if caught and managed early. Glaucoma and Retinopathy of Prematurity fall into this latter class of maladies that are manageable if correctly identified early. Retinoblastoma, the most common form of eye cancer in children, while rare, can be treated if diagnosed early, and, if left untreated, may lead to extraocular metastasis, visual loss and death.

The eye is not mature at birth and continues to develop into early adolescence. The axial length of the eye grows from approximately 17 mm at birth to 24 mm, with the most rapid change occurring in the first three years. Differentiation of photoreceptors, development of the fovea and growth of the optic nerve continues through early adolescence. Spectral domain optical coherence tomography (SDOCT) is a standard of care in in adult ophthalmology but has not translated to routine pediatric application. The rapid development of the infant eye coupled with the challenges of imaging infants, places unique demands on diagnostic interpretation of OCT images in clinical practice.

One SDOCT system exists specifically for handheld imaging of pediatric patients. The Envisu C2300, developed by Bioptigen and now marketed by Leica Microsystems, received FDA 510(k) clearance in 2012 and remains the only such device on the market. Envisu software includes a tool (on-screen calipers) for manual measurements but lacks automated measurements or normative data. The lack of automated measurement software coupled to an age-stratified normative reference database is a major impediment to broad-based adoption of OCT, Envisu or otherwise, in pediatric clinical practice.

In other words, in pediatric patients, a resulting image of the eye may not be reliable due to many factors including an uncooperative patient, variability in the size of the patient's eye, inability to focus in the eye and the like. Furthermore, although the variability in sizes of adult/mature eyes are not as significant as the pediatric eye, variability does exist and this variability does affect the quality of the image. Accordingly, improved techniques for quantifying structures of the eye that are less sensitive to the variability of the image are desired for all patients.

SUMMARY

Some embodiments of the present inventive concept provide a method for segmenting images, the method including tessellating an image obtained from one of an image database and an imaging system into a plurality of sectors; classifying each of the plurality of sectors by applying one or more pre-defined labels to each of the plurality of sectors, wherein the pre-defined labels indicate at least one of an image quality metric (IQM) and a metric of structure; assigning each of the plurality of classified sectors an Image Quality Classification (IQC); identifying anchor sectors among the plurality of classified sectors, applying filtering and edge detection to identify target boundaries; applying contouring across contiguous sectors and using the assigned IQC as a guide to complete segmentation of an edge between any two identified anchor sectors; and smoothing across segmented regions to increase parametric second-order continuity. Identifying the anchor sectors include applying the assigned IQC to identify columns across the image as candidates for initial segmentation; using the assigned IQC along each column to identify rows of maximum probability of containing segmentable images; and identifying an array of high-probability sectors to become anchor cells for initiating segmentation.

In further embodiments, tessellating the image may include applying a repeating geometric pattern to the image to provide a plurality of sectors in a grid and wherein each of the plurality of sectors are shaped like the geometric pattern.

In still further embodiments, the geometric pattern may be one of a rectangular geometric pattern and a hexagonal geometric pattern.

In some embodiments, the method further includes determining if the assigned IQC indicates a below-threshold probability of finding an edge; and completing a bridge to preserve a gap if it is determined that the assigned IQC indicates a below-threshold probability of finding an edge.

In further embodiments, classifying each of the plurality of sectors may include labeling each of the plurality of sectors with one or more of the following types of labels: System-Specific, Subject-Independent grades, or metrics; Subject-Specific, Quality Independent grades; Quality-Specific grades and Expert labels.

In still further embodiments, the expert labels may be obtained by expert annotation of the images wherein the expert physically marks the images at pre-defined points.

In some embodiments, the image database may include images acquired using healthy control subjects to develope an age-stratified normative database.

Still further embodiments of the present inventive concept provide a system for managing, visualizing and processing image data, the system including an image database; a collections and projects database; a methods Library, an outputs and reports database, and applications program interfaces (APIs) to communicate with processors external to the system, the system including an image management module that organizes a catalog of images into a plurality of collections and projects assigned to collections; an image visualization and annotation module that allows users to view images in context of collections and projects assigned to collections; an annotation module to allow a user to apply a plurality of qualitative and quantitative annotation to images to include data associated with the images; an image processing module for applying a sequence of one or more algorithms or recipes, where a recipe includes a sequence of algorithm processes with specified parameters, to a filtered set of images within the collection or project; and a data analysis module that includes parallel processing of image sets defined by a collection, with separate algorithms or recipes applied within a series of projects associated with a collection, for automated comparison with and between methods defined by the algorithms or recipes unique to each project but applied to a common data set defined by a collection.

BRIEF DESCRIPTION OF THE DRAWINGS

FIG. 2 is a table illustrating scan patterns for repeatability and reproducibility assessments where patterns match the Ulverscroft data set and NT refers to nasal-temporal direction; and IS refers to inferior-superior direction in accordance with some embodiments of the present inventive concept.

FIG. 3C is a table defining physiological layers and surfaces of images according to some embodiments of the present inventive concept.

FIGS. 5A through 5D and FIGS. 6A through 6D are images illustrating examples of methodology on (A) high quality and (B) low quality images. From Left to right: (1) raw image; (2) Sectors IQM, red indicates predicted image sector; (3) filtered image; (4) segmented image in accordance with some embodiments of the present inventive concept.

FIG. 12C is a table illustrating specific parameters of a model eye of FIGS. 12A and 12B in accordance with some embodiments of the present inventive concept.

FIG. 15B illustrates a table including dimension of the circles in FIG. 15A in accordance with some embodiments of the present inventive concept.

FIGS. 19A through 19F are a series of graphs illustrating aspects of the model eye in accordance with some embodiments of the present inventive concept.

DETAILED DESCRIPTION OF EMBODIMENTS

Figure 1A:
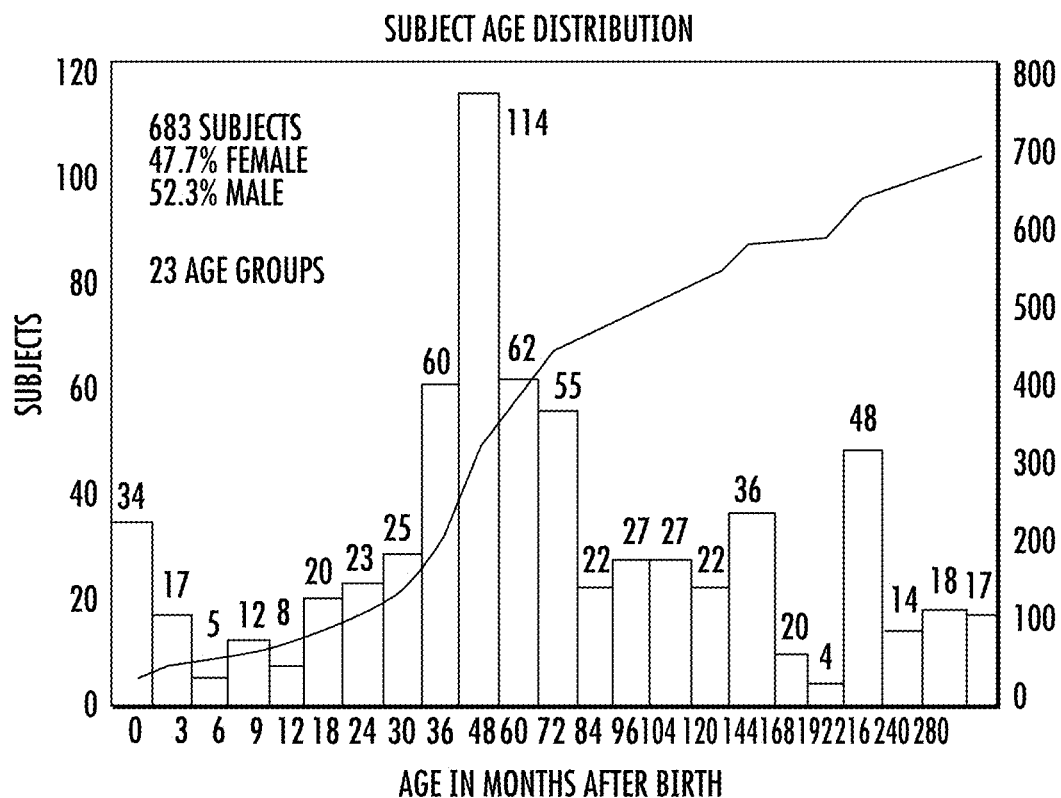
FIGS. 1A through 1D are graphs illustrating distribution of subjects in normative data collection (A) age stratification and subject counts by bin; (B) Gender distribution by bin; (C) and subjects per developmental age group; and (D) aggregation of bins into developmental age group in accordance with some embodiments of the present inventive concept.

The inventive concept now will be described more fully hereinafter with reference to the accompanying drawings, in which illustrative embodiments of the inventive concept are shown. This inventive concept may, however, be embodied in many different forms and should not be construed as limited to the embodiments set forth herein; rather, these embodiments are provided so that this disclosure will be thorough and complete, and will fully convey the scope of the inventive concept to those skilled in the art. Like numbers refer to like elements throughout. As used herein, the term "and/or" includes any and all combinations of one or more of the associated listed items.

The terminology used herein is for the purpose of describing particular embodiments only and is not intended to be limiting of the inventive concept. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and this specification and will not be interpreted in an idealized or overly formal sense unless expressly so defined herein.

As will be appreciated by one of skill in the art, the inventive concept may be embodied as a method, data processing system, or computer program product. Accordingly, the present inventive concept may take the form of an entirely hardware embodiment or an embodiment combining software and hardware aspects all generally referred to herein as a "circuit" or "module." Furthermore, the present inventive concept may take the form of a computer program product on a computer-usable storage medium having computer-usable program code embodied in the medium. Any suitable computer readable medium may be utilized including hard disks, CD-ROMs, optical storage devices, a transmission media such as those supporting the Internet or an intranet, or magnetic storage devices.

Computer program code for carrying out operations of the present inventive concept may be written in an object-oriented programming language such as Java®, Smalltalk or C++. However, the computer program code for carrying out operations of the present inventive concept may also be written in conventional procedural programming languages, such as the "C" programming language or in a visually oriented programming environment, such as VisualBasic or JavaFx.

The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

The inventive concept is described in part below with reference to a flowchart illustration and/or block diagrams of methods, systems and computer program products according to embodiments of the inventive concept. It will be understood that each block of the illustrations, and combinations of blocks, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the block or blocks.

As discussed in the background, due to variability in the size of the eyes of patients systems and methods for quantifying structures of the eye in both adult and pediatric patients may be difficult. When imaging the eye of a pediatric patient, many factors may lead to highly variable images. For example, children, especially very young children, may be uncooperative. Further, the size of the eye itself can vary widely in children because the eye is not mature. There is currently no system that quantifies aspects of, for example, the retina, for pediatric eyes. Accordingly, some embodiments of the present inventive concept provide methods, systems and computer program products for quantifying structures of the eye that are less sensitive to the variability of the image; a calibration module that allows for calibration of systems not specifically designed to account for the variability of the size of the eye for both adult and pediatric eye and system for managing images for use in other methods and systems as will be discussed further herein.

Some embodiments of the present inventive concept provide an automated retina segmentation software and an age-stratified normative database of the pediatric retina. Although some embodiments discussed herein related specifically to pediatric data, it will be understood that embodiments of the present inventive concept are not limited thereto. As discussed above, although variability in size of the adult eye is not as significant, this variability nonetheless effects the output. Thus, one database used in accordance with embodiments herein and is a collection of 683 healthy control subjects provided by the Ulverscroft Eye Unit of the University of Leicester. This collected is analyzed retrospectively in accordance with some embodiments herein. Embodiments of the present inventive concept may provide the first FDA-cleared and clinically available optical coherence tomography (OCT) normative database for the full spectrum of the developing human retina. Furthermore, some embodiments further provide automated retinal OCT segmentation algorithms that are responsive to the high-variability OCT images acquired in handheld imaging of children (and adults) and will thereby extend the utility of this technology to a general non-cooperative patient population and to lower cost instrumentation as will be discussed further herein.

Some embodiments of the present inventive concept further provide for a calibration apparatus and related methods designed to calibrate retinal imaging systems, specifically "Maxwellian view" systems that image (and/or illuminate) in a cone posterior to a pupil of limited aperture. The calibration apparatus of the present inventive concept is a spherical eye model (SEM) with a defined posterior radius of curvature and a posterior chamber length, i.e. a distance from a pupil to the posterior pole of the Model, with anterior focal optics, together which mimic the distances and relationships in the human eye. A noticeable gap with respect to quantitative imaging of the retina is the lack of a calibration standard, and the strong dependence of imaging techniques on the length of the posterior chamber of the eye which is largely an unknown quantity, at least with respect to data that guides retinal imaging systems. Furthermore, the lack of standards has made the quantitative application of adult optical coherence tomograph (OCT) imaging systems to the under-developed eye of the child untenable and has further limited the clinical interoperability of imaging systems and their normative data to imaging systems of one model by one manufacturer, thereby dramatically increasing the cost for introducing new instruments to the market or qualifying new diagnostic imaging biomarkers that for broad use across a class of instruments. Some embodiments of the present inventive concept provide a calibration apparatus and related method of use to improve quantitative retinal imaging independent of stage of development or intrinsic eye length, and to improve the interoperability of retinal imaging instruments to advance the development of new quantitative, objective imaging biomarkers for diagnosis and development of new ocular therapies.

Some embodiments of the present inventive concept provide for an image data management, visualization, and image processing environment (SHERPA: Systematic Hierarchical Ensembles for Review, Processing, and Analysis) to make the management of complex image and data sets efficient and traceable for the purposes of organizing collections of images in Projects, viewing and annotating images, decimating images into smaller sectors for local analysis, developing, testing and validating algorithms and recipes (algorithms with tuned parameters sets), and parallel management of processing steps for comparison with and between methods. In some embodiments, SHERPA provides a systematic user interface, workflow, and data structure to facilitate a uniform record of image annotation and processing tasks to make the study of complex relationships within medical images and their subject populations possible.

As discussed above, some embodiments of the present inventive concept utilize the Leicester Pediatric Image Bank as the database of images. The Leicester research team acquired the images using healthy control subjects with the Envisu C2300 for the purpose of developing an age-stratified normative database. In these embodiments, all imaging was conducted under TRB approval, patient consent, and full compliance with the Helsinki Convention on protection of Human Subjects. All imaging was conducted without sedation, and without pupil dilation. This data set includes images of macula (the macula is in the center of the retina at the back of the eye, optic nerve head (ONH), or both. In particular, the image set includes 683 subjects "binned" in 23 age groups. Seventeen of the bins including images of subjects between birth and age 12 years of age and contain 84% of the subjects. Of this 84%, 47.7% of subjects are female, 52.3% are male. The subjects are approximately 80% caucasian, with approximately 20% asian (Indian subcontinent). The distribution of the population by age and gender is shown in FIGS. 1A through 1D and the scan acquisition patters are listed in in the Table set out in FIG. 2.

Figure 1B:
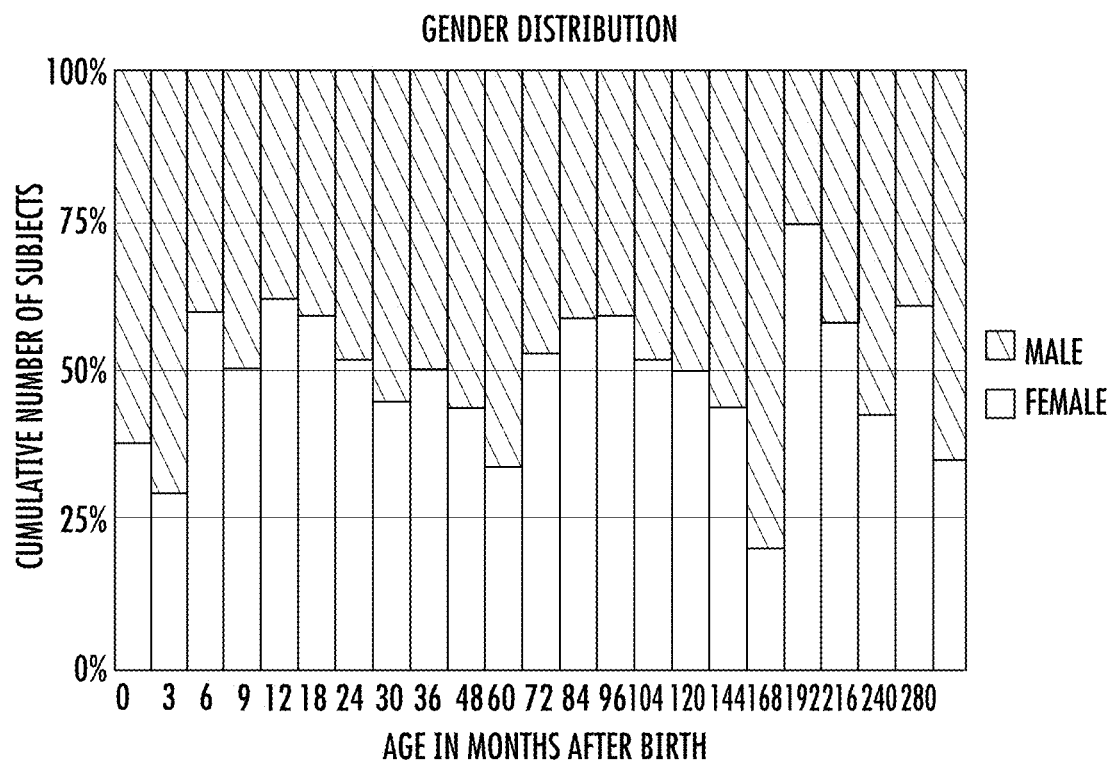
Figure 1C:
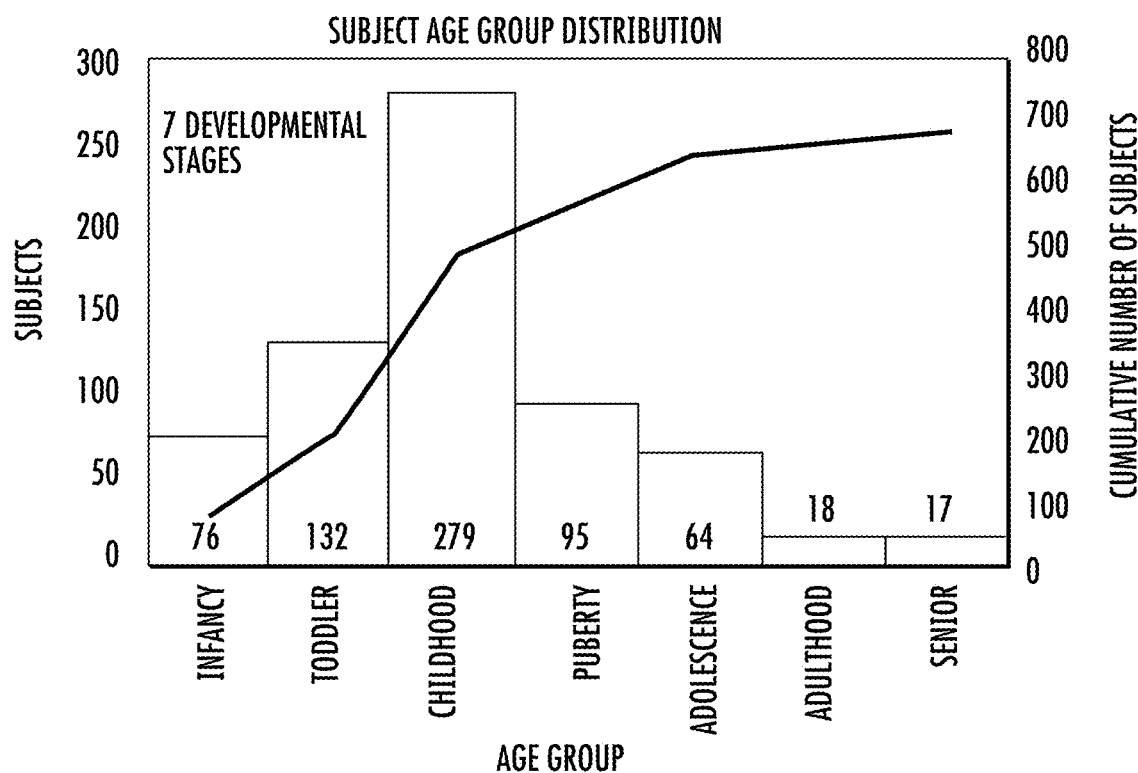
Figure 1D:
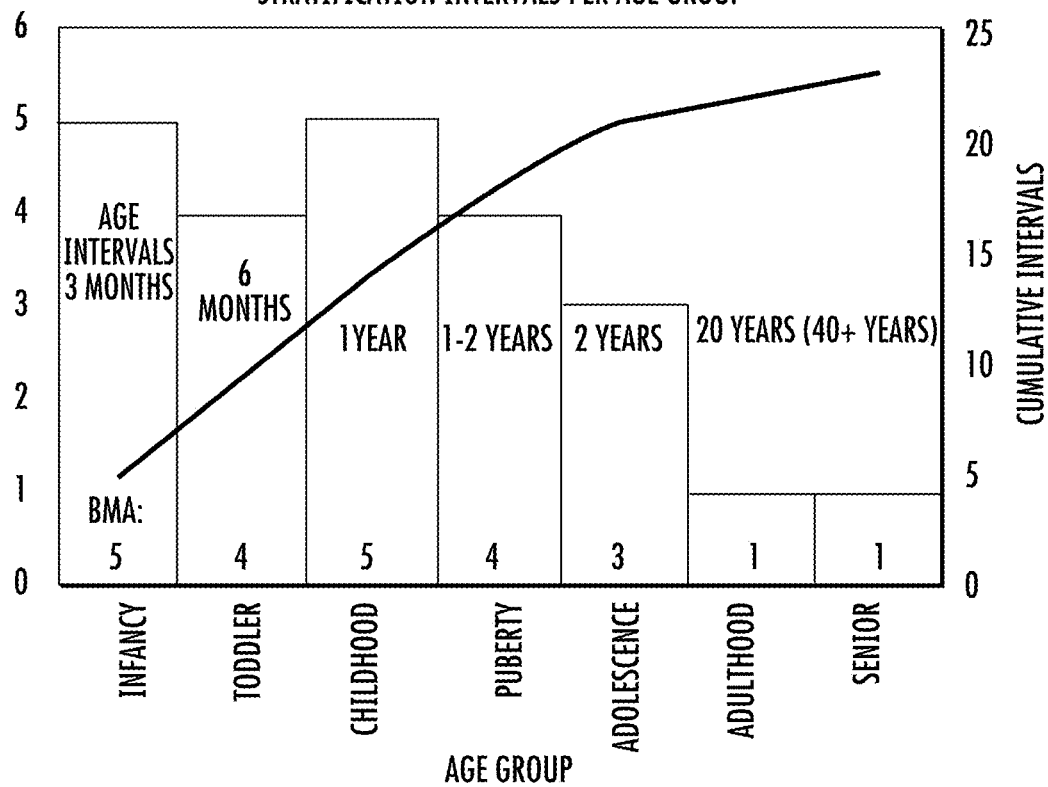

In particular, FIGS. 1A through 1D are graphs illustrating the distribution of subjects in the normative data collection in accordance with some embodiments. FIG. 1A illustrates the data by age stratification and subject counts by bin. FIG. 1B illustrates the data by gender distribution by bin. FIG. 1C illustrates the data by subjects per developmental age group. FIG. 1D illustrates the data by aggregation of bins into developmental age group. The Table illustrated in FIG. 2 shows scan patterns for repeatability and reproducibility assessments. Patterns match the Ulverscroft data set. The table illustrates a target of the scan; the length in the nasal-temporal (NT) direction; the height in the inferior-superior (IS) direction; a number of A-scans and a number of B-scans. As shown in the table, the target in these embodiments could be the macula, the optical nerve head (ONH) or a widefield. The macula refers to the center of the retina at the back of the eye. The retina is the light-sensitive membrane forming the innermost layer of the eyeball. The data in FIG. 2 is provided for example only and is not intended to limit embodiments discussed herein.

As used herein, "A-scan or Amplitude Scan" refers to a scan that provides data associated with the length of the eye (subject). Similarly, "B-scan" refers to a two-dimensional, cross-sectional view of the eye and the orbit. "C-scan" or "C-slice" refers to a two-dimensional enface view of a section of the eye, generally a plane orthogonal to the "B-scan."

It will be understood that although specific embodiments are discussed herein with respect to the leicester pediatric image bank, embodiments of the present inventive concept may be used in combination with any image bank available. Thus, as used herein, an image bank can include any collection of images as needed for embodiments of the present inventive concept. For example, an image bank may include a collection of OCT, OCTA photographic, and adaptive-optic images and associated metadata, collected under Institutional Review Board (IRB) approval with informed consent allowing image re-use. As used herein, "metadata" refers to, but is not limited to, any patient demographics, medical histories, diagnoses that inform the images, subject to any and all protections under applicable United States and international patient privacy regulations.

As used herein, "subject" refers to the thing being imaged. It will be understood that although embodiments of the present inventive concept are discussed herein with respect to human eyes, embodiments of the present inventive concept are not limited to this configuration. The subject can be any subject, including a veterinary, cadaver study or human subject without departing from the scope of the present inventive concept. Additionally, aspects of the present inventive concept are applicable to many different types of collections of images, two-dimensional, three-dimensional, hyperspectral, video, and the like.

As further used herein, the term "binned" refers to organizing data into a contiguous set of categories that represent an attribute or label assigned to an object or subject, where the attribute may represent a value across a range of potential values, and where a set of subjects with a subset of the range of values are organized into a sub-range of the total possible range of values, such as the number of subjects in an age-range in a histrogram of the entire population of subjects aged from birth to old age. Bins in this context may be numeric as in a typical histogram, but Bins may also be non-parametric labels of any class of attribute, generally useful when the complete set of Bins forms a complete set of the population. Further, Bins in this context are generally mutually exclusive, and collectively exhaustive.

Some embodiments of the present inventive concept utilize an image processing environment entitled MOSAIC OCULOMICS™ (MOSAIC). MOSAIC is discussed in commonly assigned U.S. patent application Ser. No. 16/839, 475, filed on Apr. 3, 2020, entitled Methods, Systems and Computer Program Products for Retrospective Data Mining, the content of which is hereby incorporated herein by reference as if set forth in its entirety.

Some embodiments of the present inventive concept utilize an image processing environment entitled SHERPA. SHERPA is a Catalog Management system that supports, for example, filtering of images from a database along a set of pre-defined attributes; creating re-useable collections of such filtered images; assigning images to projects, providing algorithmic and user applied labels and annotations to images within a project; further filtering images according to such annotations; applying computational recipes to these sub-filtered, or binned, sets of data according to algorithms defined for such sets of images, deriving a set of numeric results from such recipes, processing statistical analysis from the numeric results and the like. SHERPA may wholly contain the processing steps outlined, or may pass images or derived data to external processors through an Applications Programming Interface (API). SHERPA facilitates the management and analysis pipeline through process logging and record keeping, automated management of the allocation of data sets to algorithm training, testing, and validation workflows, automated parallel allocation of data sets to multiple recipe workflows, including human-mediated and fully automated image processing workflows, artificial intelligence, machine learning and deep learning workflows, aggregation of results for analysis of such workflows independently, and statistical comparison of such workflows.

Some embodiments of the present inventive concept establish a statistical baseline for the capability of quantitative handheld OCT imaging. Regulatory clearance of automated measurements and normative data generally requires validation against a controlled standard. The accepted "gold-standard" is manual measurements by expert trained graders. Some embodiments of the present inventive concept establish a baseline from handheld images acquired by an expert photographer on healthy eyes of cooperative adults. As discussed above, imaging of uncooperative pediatric patients is further complicated by imprecise aiming, pupil centration, focus, and working distance. Some embodiments of the present inventive concept further quantify image quality as a function of defocus and working distance errors to provide better clinical guidance on optimizing images and validating the domain of successful and/or unsuccessful segmentation. Working distance errors may be associated with incorrect reference arm settings in the imaging system due to, for example, uncertainty in subject axial eye length. For example, light in an OCT system is generally split into two arms—a sample arm (containing the target) and a reference arm, for example, a mirror. Under optimal conditions, the reference arm path length may be tuned precisely to the sample arm, which includes the length of the subject eye during retinal imaging. In sub-optimal conditions, the reference arm may be mismatched to the subject, leading to inferior image quality and errors in image interpretation.

In some embodiments, analysis of variance (ANOVA) may be used to assess the repeatability and reproducibility strategy of manual measures of a series of images acquired on a number of (for example, twelve) nominally healthy adult eyes (parts) using multiple imaging systems, for example, three Envisu C2300 systems. Thus, in these embodiments, images are acquired using a handheld system and the subjects are seated, with no head restraint, no pupil dilation, and no sedation. In this particular example, a total of 324 images (12 eyes×9 images×3 systems) images are acquired. In some embodiments, three trials are performed (repeats) including each of three scan patterns on three separate Envisu systems. The scan patterns correspond to the Leicester acquisition protocol in the Table of FIG. 2. The best quality images according to the subjective judgement of the expert photographer supported by a range of reference target images are selected.

Figure 3A:
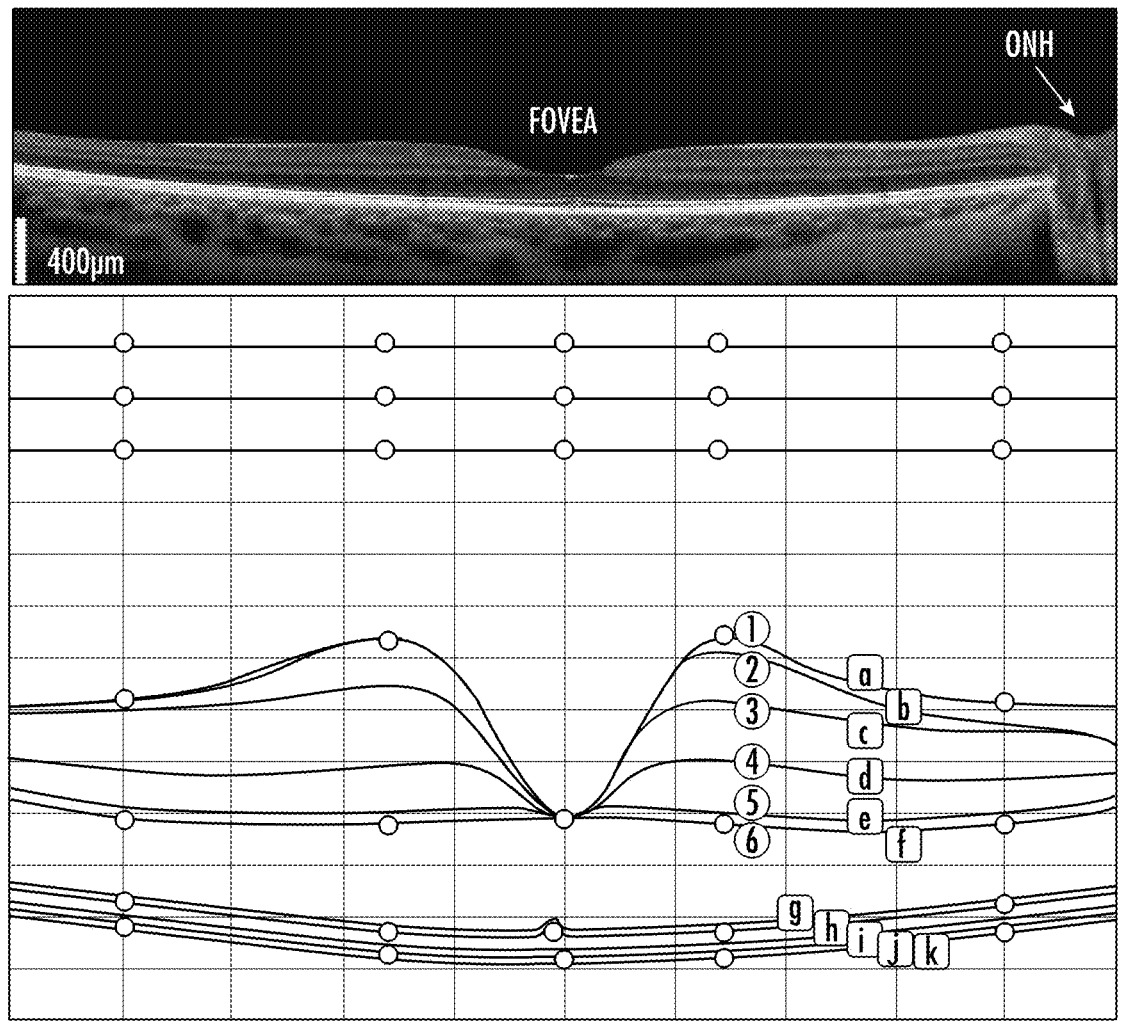
FIGS. 3A and 3B are graphs illustrating schema for manually marking three sequential frames centered on (A) foveal pit and (B) optic nerve head, respectively, in accordance with some embodiments of the present inventive concept.
Figure 3B:
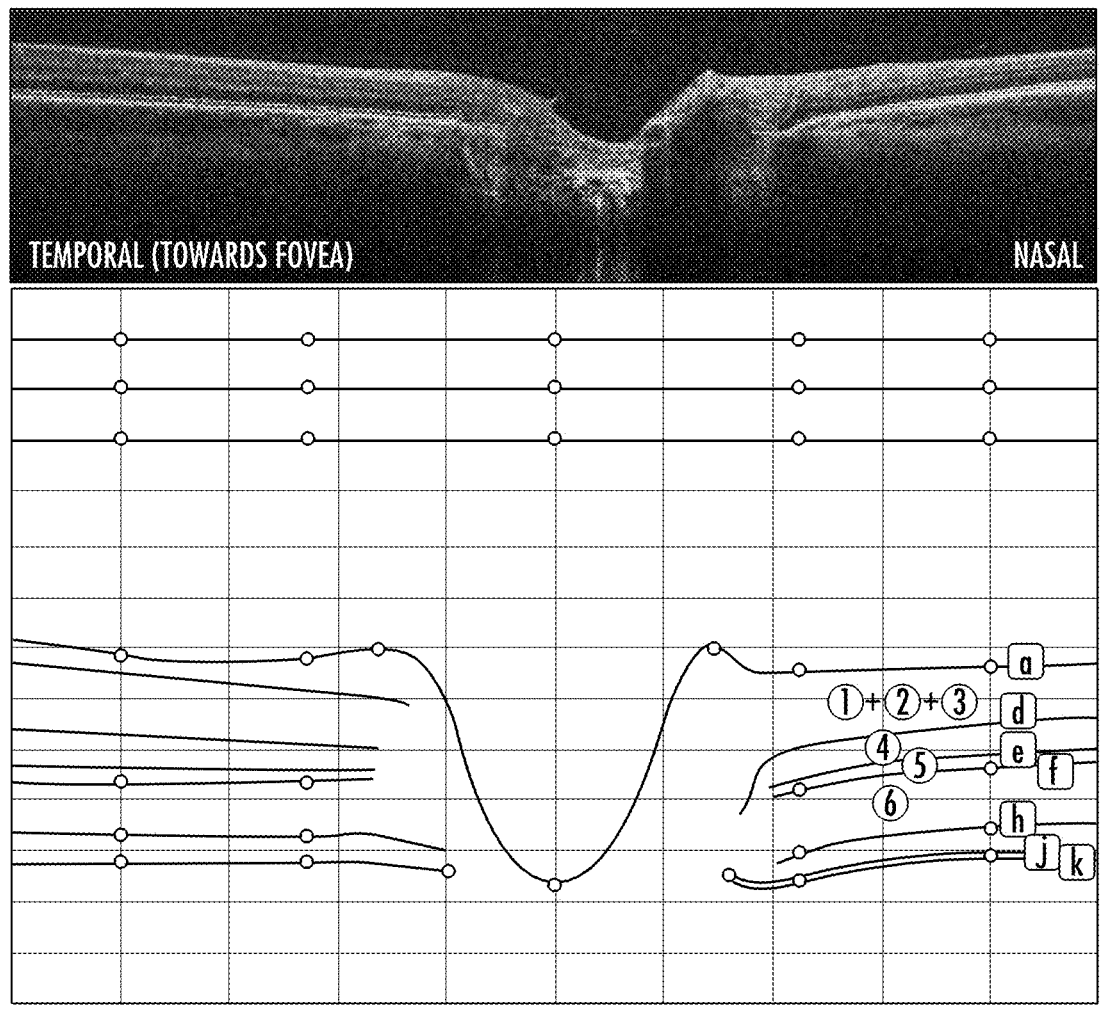

Referring now to FIGS. 3A and 3B, schema for manually marking three sequential frames centered on (A) foveal pit and (B) optic nerve head, respectively, will be discussed. The retina is a complex layered structure whose observed features have been validated against histology. The characterization of the retina for use in automated or guided diagnostics and prognostics is quite challenging for the richness of the visual and neurological processes in sight. Certain measurements are established as standards of care and supported with normative data for the adult eye, yet the actual set of objective, quantitative biomarkers that are extracted from volumetric images of the retina is quite slim, and largely limited to pathology of the mature adult retina. Current normative datasets are device specific (constrained to a specific manufacturer and model), adult only, gender non-specific, and ethnicity non-specific. Useful normative values are also limited to total retinal thickness in the vicinity of the fovea, and nerve fiber layer thickness in a circumference about the optic nerve head. Yet the primary clinical application of OCT imaging of the fovea is an observational interpretation of edema associated with age-related macular degeneration that does not require measurement. Use of the nerve fiber layer thickness is intended to support the diagnosis of glaucoma, but the diagnostic value remains fraught. Given the exceptional progress in understanding the visual processes and the development of therapies, including gene therapies that are successfully treating blindness, there is clearly a need to develop and validate a more complete and robust set of imaging biomarkers to diagnose disease earlier, develop precision medical treatments, and screen patients as candidates for treatments. This problem is no less important for the pediatric population that has a lifetime of sight to consider. Some embodiments of the present inventive concept catalog measurements in three dimensions that are associated with retinal physiology, provide a methodology for searching for biomarkers associated with normal pathological development, and provide a system for verifying and validating such biomarkers with techniques of big data.

As illustrated in FIGS. 3A and 3B, various layers and surfaces of the retina are indicated in the vicinity of the fovea (macula) (FIG. 3A) and in the vicinity of the optic nerve head (FIG. 3B). These structures carry generally accepted names, though as research advances, some of the naming conventions continue to evolve. The various layers are indicated by number-labeled filled circles and boundary surfaces are indicated by alpha-labeled open squares. Naming conventions are summarized in the table set out in FIG. 3C. Some embodiments of the present inventive concept are focused on the retina; the retina resides as the back surface of the posterior chamber of the eye. It is convenient to organize the structures of the retina into the Inner Retina (adjacent the vitreous and facing the Anterior Segment (cornea and lens)) of the eye; the Outer Nuclear Layer (comprising the photoreceptors); and the Outer Retina. From the Vitreous to the Sclera, the layered structure of the retina as substantially visualized with OCT is listed in FIG. 3C. The numbered layers and alpha-labeled bounding surfaces are visible and generally amenable to manual segmentation and may be amendable to automated segmentation. Layers 2 and 3, the Ganglion Cell Layer and Inner Plexiform Layer, respectively, have soft, low contrast boundaries, and are for this reason often grouped as the Ganglion Cell Complex.

An OCT image is composed of a three-dimensional matrix of gray-scale image values that reflect the optical backscattered intensity along the direction of an optical ray that forms the scanning optical beam. As used herein, a cross sectional image is referred to as a B-scan. The B-scan is an array of A-scans. A-scans are the backscattered intensity profiles along a ray (i.e. an A-Scan as acquired follows the path of light through a structure). Many scan patterns may be used to acquire OCT images of the retina, including rectangular raster scans, radial scans, annular scans, and the like. For simplicity, embodiments of the present inventive concept are restrict discussions to raster scans that comprise a series of (x, z) B-scans offset sequentially in the y-direction, without any loss of generality. In Cartesian coordinates, every voxel in the image has an intensity value I(x, z, y), where the ordering of (x, z, y) is of convenience to preserve the z-axis as the depth axis in the cross-sectional view, and each B-scan may be considered I_i(x,z; y_i). A typical clinical OCT image of the retina may have an A-scan of length 1024 pixels, with 500-1000 A-scans per B-scan, and 100-500 B-scans per volume, therefore including a range of 1024×500×100 to 1024×1000×500 voxels, from 51.2 to 512 megapixels, respectively. As systems become faster and storage memory cheaper, the maximum image size may increase, though this range of values encompasses more information than is objectively clinically useable today. Considering only the boundary surface surfaces on a fully segmented image set, the number of voxels that may be analyzed for quantitative biomarkers is reduced by the ratio of number of layers (a-k) to the length of an A-scan, 11/1024, i.e. two orders of magnitude. The prospect of developing a finite discrete set of biomarkers from this reduced set of values remains daunting.

The set of values from this reduced set may be reduced further with a consideration of the surface geometry and certain shapes symmetries. The shape of the fovea has a characteristic curve that is now modelled in the literature with a four-parameter Difference of Gaussian function or a Sum of Gaussian function, reducing the inner most surface of the fovea (surface (a)) to three parameters. As the fovea continues to develop from birth, it is critical to understand whether the observed shape at any age is normal or pathologic, as may be found in ocular albinism. The science of characterizing the fovea is current and relevant and has also led to the development of open-source software to characterize the fovea pit morphology across species. It is vital to extract the fovea morphology correctly from OCT images, to differentiate between "normal" and pathological foveal shapes across stages of development, gender, and ethnicity, and to ensure interoperability between shapes extracted from different OCT manufacturers and ultimately between other imaging modes such as ultrasound or magnetic resonance imaging (MRI). Furthermore, each surface has its own unique shape function and rotational symmetries, the macula and the optic nerve region are characteristically unique, and the peripheral regions of the retina are also unique and play their own role in development, vision deficits, and disease.

Ultimately, the set of imaging biomarkers may be drawn from a set of parametrized functions representing the shapes and symmetries of each retinal layer and region reduced from the initial megapixel volume data set. Some embodiments of the present inventive concept use an intermediate approach that is extensible to a function-based approach, scalable to the various structures and regions of the retina (and other structures of the eye), and extensible to age-dependent characterization, gender specificities, ethnic specificities and the like according to metadata available for sets of data. These embodiments are appropriate for the statistical assessment of normative data and the statistical differentiation between normal and disease states, and further extensible to the techniques of artificial intelligence (AI). It will be understood that while neural networks and artificial intelligence are in favor, and demonstrate great promise in autonomous diagnosis, such techniques rely on well posed questions and large, uniform datasets. As such, embodiments of the present inventive concept are a preferred approach to the discovery and validation of biomarkers, and a precursor to the deployment of biomarkers in autonomous diagnostic techniques supported by methods in AI and deep learning.

For the development of age-dependent normative data that forms the basis of pediatric retina assessments, some embodiments discussed herein by collecting a reduced set of values strategically oriented around the fovea and around the optic nerve head. Specifically, some embodiments focus on three parallel cross-sections through the fovea and optical nerve head (ONH), respectively, and extract surface locations at four verticals representing the edges of the inner retina, outer nuclear layer, and outer retina in order to capture the primary physiologic structures and facilitate manual grading of images. The black dots in FIGS. 3A and 3B on the graphs indicate manual marking positions to obtain total retina thickness, inner retina thickness, and outer retina thickness. At the fovea, a small depression in the retina of the eye where visual acuity is highest, lateral positions are selected as 1.0 mm and 2.0 mm nasal and temporal to fovea pit. The foveal pit is surrounded by the foveal rim that contains the neurons displaced from the pit. This is the thickest part of the retina. At the ONH, lateral positions are 1.7 mm and 3.4 mm nasal and temporal to ONH center. At the ONH, additional reference marks may be identified by lighter filled dots as reference points for calculating ONH cup-disc geometry an optic nerve shape characteristic relevant to both myopia and glaucoma in adults and children.

To summarize, FIGS. 3A and 3B illustrate manual measurements made at prescribed locations on three frames per scan as diagrammed to calculate total retinal thickness, inner retina thickness, and outer retina thickness in the foveal region and surrounding the ONH. Additional markings of optic nerve center, peaks of the optic nerve rim, and the break in Bruch's Membrane may also be made to facilitate standard the capture of diagnostically relevant structural information visible with OCT.

As an example of reducing the number of seemingly independent variables that may serves as biomarkers (i.e., the number of voxels in the image set or reduced number of voxels in the segmented boundary surface set), chosen here to obtain positions of four boundary surfaces at five verticals on three neighboring B-scans centered on the B-scan and the A-scan within this B-scan that most closely crosses the center of foveal pit. As shown in FIGS. 3A and 3B, the thickness measurements at each lateral position are averaged across the three frames. The resulting values are first used in an ANOVA gage repeatability and reproducibility (Gage R&R) study to assess the contributions of variance in OCT images from intra-class device variation (three devices of the ENVISU C2300 model), imaging repeatability on multiple acquisitions, and variance due to an ostensibly uniform set of "parts", i.e., eyes of healthy mature subjects. A Gage R&R study is a standard method of system capability testing and sets a baseline for the intra-class repeatability and reproducibility of any chosen metric. The Gage R&R studies the contribution of the variability associated with the repeatability of imaging and the variability associated with the reproducibility across systems to the measurement system variance.

Some embodiments of the present inventive concept assess image quality and measurement repeatability as a function of the two factors of improper focus, i.e. uncertainty in refractive error of subject, and improper working distance, i.e. uncertainty in axial eye length of subject. These parameters are particularly influential in the imaging of pediatric eye, where proper refraction is unknown, precise eye length is unknown, and where imaging a non-cooperative subject means that the photographer may not have time to optimize the system for focus and working distance. Both of these factors may be manually adjustable on the image capture device, for example, the Envisu device. The Envisu is manually focused and includes a diopter scale on the objective lens. Proper working distance of, for example, 15 mm, is obtained by setting the reference arm path length to correspond to the subject axial eye length. Envisu is nominally set to the adult eye, for example, 24 mm, but the reference arm can be adjusted.

Embodiments of the present inventive concept use a two-factor, five-level Central Composite Experimental Design (CCD) to evaluate image quality and measurement variability as a function of defocus and working distance error (reference arm setting error) from the subject-optimum conditions. CCD is an efficient design that increases the likelihood of an efficient scale prediction variance and rotatability, which is a key criteria for an optimal design, with the benefit of a low number of runs. CCD makes the reasonable assumption that the response of interest can be approximated on average by a second-order polynomial. The use of the CCD design reduces the number of experiments required to assess the relative impact of defocus and working distance in this two-factor, five-level analysis from a full factorial experiment requiring 25 (5^2) test runs to a reduced number of 11 runs.

Figure 4:
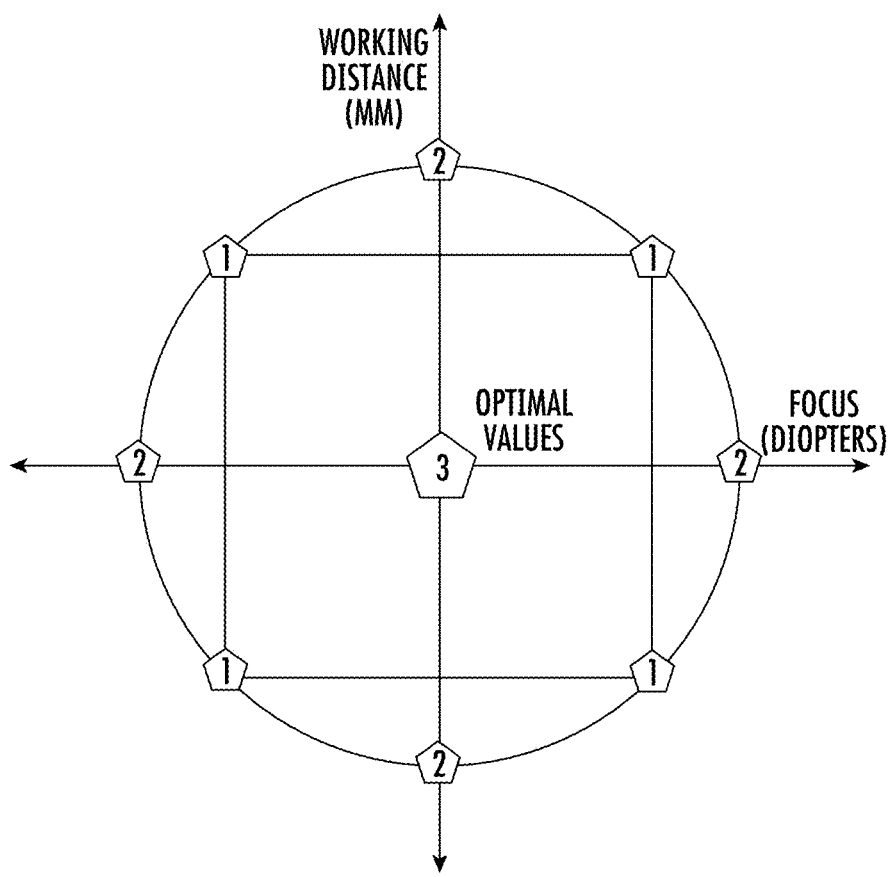
FIG. 4 is a diagram illustrating the CCD with the factors eye length and defocus displayed in coded values in accordance with some embodiments of the present inventive concept.

In some embodiments, the method may include imaging a single eye with the Envisu scan head mounted and the subject stabilized by a chin and forehead rest. Three repeated images will be obtained with the three scan patterns at each of the offset diopter and reference arm settings established for the experiment. FIG. 4 illustrates a diagram of the CCD, where the two axes represent the two factors under study, defocus (diopters) and working distance error (mm), using coded values with their intersection at the subject-optimized values for each factor.

In some embodiments, a CCD is used with 11 randomized runs: one run for each combination depicted by labels "1" and "2" and three runs for the optimal values of the two factors, depicted by "3" in FIG. 4. Label 1 corresponds to each of the four combinations of ±1 (for working distance) and ±1 (for defocus); Label 2 corresponds to each of the four combinations of +1.41 (for working distance or defocus) and 0. Label 3 is for (0,0)—the point with optimal values for the two factors. These runs are used to estimate the pure error and allow for testing for the lack of fit. In some embodiments, the coding for the design variables may be as follows: for focus, an offset value of 1 will correspond to two diopter of defocus; for working distance, an offset value of 1 will equate to two mm of reference arm setting error (equivalently axial eye length error). Any point in the diagram of the CCD with the factors eye length and defocus displayed in coded values on FIG. 4 has coordinates given by values for defocus and working distance (corresponding to axial eye length) error.

In order to have a basis for comparing automated segmentation algorithms that reduce an original image to a reduced matrix of values, one requires a Ground Truth for the reduced matrix. A standard for establishing a Ground Truth for images is the annotation, or labeling, by an expert. In some embodiments of the present inventive concept, an expert annotates a set of images by marking the images at the points indicated in FIGS. 3A and 3B. The action by the user is mediated by a graphical user interface; the user annotation is qualitative and graphical in nature, the software that contains the user interface records one or more values associated with the expert annotation. The mediation of this annotation functionality is one aspect of the present inventive concept and is discussed further below. For the purposes of some embodiments of the present inventive concept, the software records a three-dimensional location associated with the annotation. These pixel (equivalently voxel) locations are scalar values that can be further analyzed, for example to calculate a distance in pixels between any two annotations or to scale the distance in pixels to a distance in physical space, thereby recording a thickness of a layer bounded by two surfaces marked by expert annotation.

It is exceptionally costly to have an expert annotate every location that indicates even a finite subset of boundary surfaces in an image. To annotate every unique pixel forming a single boundary in an OCT image as described herein, a user may be asked to place a single mark per A-scan in every B-scan, and this could be on the order of 100,000 annotations. This would be quite an unreasonable request. Alternatively, a user might be asked to place 10 annotations to mark a boundary surface at approximately even intervals on every B-scan, reducing the workload by a factor of 100, but subjecting the annotation to discretionary decisions by the user. In some embodiments of the present inventive concept, the transverse locations for marking vertical locations of boundaries are pre-defined according the problem defined. The software user interface is programmed to present a subset of a B-scan with an indication of the vertical region of interest, such that the user is guided to mark boundaries according to guidance provided by the software. In this manner, the marking is consistent and repeatable among experts, subject only to interpretation of what defines a boundary, which is the motivation for using experts to define the Ground Truth in the first place.

In some embodiments of the present inventive concept, the annotation used to mark a feature, whether a boundary surface or otherwise, is itself multidimensional. In the primary instance, the annotation is simply an indication that a boundary surface (or other defined structure of interest), exists at the annotated location. The graphical user interface in the present inventive concept includes additional degrees of freedom to mediate an increased content in the expert annotation that supports the location information. The icon used to make the annotation may be selected from a list or a table or a palette, such that the icon chosen provides additional information to the program. The icon may indicate the "quality" of the boundary surface marked, for example the boundary surface is "high contrast" or "low contrast", or "easily identified" or "poorly identified." The label me be binary, or have multiple choices, such as in a LIKERT scale that ranges from a "best" to "worst" or "highest contrast" to "lowest contrast" boundary edge. Further, the icon may be color-coded, shape-coded, or explicitly labeled to indicate any qualitative attribute that is relevant to capturing expertise or furthering quality control. Thus, the combination of an icon having a shape, an embedded alpha-numeric character, a color, and a position on the image captures at least four unique degrees of freedom that adds significant value to the annotation in user-friendly, programmable, re-useable manner to facilitate the establishment of a Ground Truth to an image, and this multi-degree of freedom information can be further used to train, test, and validate automated algorithms that operate on individual images, or statistical or neural network-like algorithms that operate on populations of images.

One of the key advantages of the present inventive concept is guiding the user to place annotations in a constrained region of an image. It is often useful to establish a reference point in the image and a calibration to ensure that the positioning of these guided annotation regions is repeatable and reproducible. In some embodiments of the present inventive concept, the user sets the reference point given a set of instructions. For example, in the circumstance of FIGS. 3A and 3B, the reference point is set at the center of the fovea pit, i.e. the point of deepest valley on the inner most surface of the retina associated with the center of highest visual acuity. In these embodiments, the user may scan through the image volume, and provide a first annotation on the B-scan that appears to the user to represent the fovea pit, at the transverse location (A-scan) of the fovea pit, at the vertical location of the bottom of the fovea pit. This position may then be used as the reference point for the software to guide further annotations.

In some embodiments of the present inventive concept, the user may be presented with an enface view of the OCT volume (an orthogonal surface projection, often referred to a C-scan view, or average intensity projection, or summed voxel projection). Such a view provides more of a photographic representation of the retina, from which the fovea may be distinctly visible to an informed user. The user may then annotate the location of the fovea from this enface view, providing an (x, y) location of the fovea, from which the B-scan and the A-scan may be inferred, but not information directly about the vertical position of the fovea pit.

In further embodiments of the inventive concept, methods discussed herein may be programmed algorithmically to search the image for the location of the fovea using, for example, a priori information on the expected shape of fovea, as discussed above.

In each of the embodiments discussed above, the location identified is a discrete pixel value, whereas the precise location of the target reference point resides somewhere on a continuum of the physiology in the region of identified pixel or voxel. The fovea, for example, may be defined in three-space as a "sombrero" function or multi-dimensional Gaussian function, or even more simply as a parabolic function in the vicinity of the pit, and the approximate location identified through annotation may be used as a local guide point for regional segmentation and curve fitting to find a more precise analog location for the reference landmark. Methods discussed herein provide a fourth embodiment of the establishment of a reference location for guided annotations.

The reference location need not be the fovea. As illustrated in FIG. 3B, the reference location may be the center of the optic nerve head (ONH), identified in a similar manner. Of course, for any given image and any given physiology, reference landmarks may be defined according to the application.

With the reference location identified, a table of target identifiable features to be annotated may be produced, and a palette of annotations presented, in some embodiments of the inventive concept a user may be presented with a graphical interface that automatically presents regions of an image for annotation, records the user annotation according to the location of the annotation along with any associated attributes associated with the chosen annotation, steps the user through a complete set of annotations according to the pre-defined table, provides a first quality check to confirm that all annotations have in fact been made by the user, allows the user to register any notes or reasons for making or missing an annotation that is not otherwise captured in the annotation icon, and provides a second quality check on the choice of annotations according to constraints further programmed into the target table (for example, surface (a) is vertical above surface (b).

In some embodiments of the inventive concept, regions presented for annotation of an image may be presented in a randomized fashion to alleviate a user tendency to behave repetitively.

In some embodiments, a population of such images may be presented to the user for annotation, and such population may be randomized, and further randomized such that the population of regions among images is further scrambled.

In some embodiments of the present inventive concept, a collection of images for annotation is created from a larger catalog of images. The collection of images may be created programmatically or manually according to rules for pulling images into the catalog. In one such embodiment, the collection may be a randomized subset of images. In some embodiments, the images may be a collection of images with a chosen attribute or metadata, such as gender of the subject, age of the subject, race of the subject, imaging device serial number, image date or time and the like. Any such attribute or set of attributes may be appropriate. Within the thusly defined class of images, selection into a catalog may also be a randomized set form within the class.

A further benefit to allowing multiple experts to annotate the same set of data, under the same guidance in accordance with some embodiments of the inventive concept, a set of projects may be defined that present the same collection of images to multiple users for annotation under the same set of conditions. Alternatively, the various projects may present the same collection of images to one or more users using variants of the guidance and annotation conditions to provide for a different axis of comparison. Furthermore, a project may also present the collection of images to a computer processor for automated process under an analogous set of rules, algorithms, or recipes. In some embodiments of the inventive concept, results may be accumulated from a single project or a multiplicity of such projects to analyze intra-project statistics or inter-project statistics, such as to compare experts to each other, compare computer algorithms to experts, or compare computer algorithms to each other.

In some embodiments more ore projects, users, and computer algorithms may be added over time and continue to provide the intra- and inter-project comparisons in an automated fashion. Images may be added to a given collection and projects may be reproduced with the added images both for user annotation or computer algorithms, thus creating an automated and general learning environment. Projects may be run against a refreshed collection of images within the class, to further test experts, or test or validate algorithms with data not previously subjected to the computer algorithms. It will be understood that this user interface, data management, and computation may be accomplished with a desktop computer operating on local data, or with any combination of data storage, database architecture, computational environment, and access to a user interface that may be available to a user, whether local, networked, cloud based; SQL, POSTGRESQL, MONGODB, JSON; CPU, GPU, FPGA, ASIC; desktop or mobile, through virtual reality headsets, or otherwise without any limitation.

In some embodiments of the present inventive concept, these functions of managing a Catalog of images, creating Collections of images according to user-defined criteria, image attributes and metadata, tracking interactions with images including presenting images or regions of images in the context of Projects for expert annotation, and further using Projects to manage the development, training, testing, and validation of automated processing algorithms, tracking activities, and managing databases of collections, projections, classifications, annotations, and computer generated results are the domain of a software system entitled SHERPA. SHERPA is a JAVAFX program with a POSTGRESQL database that is suitable for local operation on a workstation or operation through a web browser interface to a cloud computing system, or on a mobile device through a dedicated APP. SHERPA has Application Programming Interfaces (APIs) to feed annotated images by Collection or Project or further filters applied within Projects to external processing engines, including our MOSAIC OCULOMICS™ software for further batch processing and algorithm development. Similarly, SHERPA APIs allow the controlled distribution of images to third party tools such as MATLAB or to user defined programs written in C, Python, and R and the like. Thus, the primary role of SHERPA is in catalog, annotation, and workflow management, and MOSAIC OCULOMICS serves the role of supporting advanced algorithms and recipes in a batch processing environment. Together SHERPA and MOSAIC OCULOMICS provide greater control over the imaging biomarker development, validation, and deployment process.

Expert Annotation is generally a necessary condition to establish a Ground Truth against which automated analyses may be compared. With respect to images, it is convenient to separate image analysis into image processing techniques, generally designed to segment, quantify, or classify individual images, and into population-based approaches which are targeted at drawing inferences from images using statistical, artificial intelligence, machine learning, and deep learning techniques.

With expert annotation established as a Ground Truth, some embodiments of the present inventive concept provide automated boundary segmentation. Embodiments of the present inventive concept provide a segmentation strategy responsive to the variability in handheld pediatric OCT scans, and systematically train the algorithms with control images and pediatric images drawn from the normative data set. In particular, embodiments of the present inventive concept provide a piecewise Image Quality Metric (IQM) for classifying regions of interest prior to segmentation; a segmentation "recipe" with parameters that are tunable responsive to local image quality; and a method for systematically training algorithms and creating a classification schema that pairs IQM with tuned segmentation recipes.

Handheld images acquired of un-sedated, uncooperative infants have higher average noise levels (from lack of frame averaging), greater variability in image position and tilt, and more SNR variability associated with alignment, focus, and axial eye length uncertainties than is typical in adult imaging. Even for adults, commercial imaging devices employ a global signal strength metric to advise photographers on re-taking an image if the signal is too low for successful segmentation. As discussed in U.S. Pat. No. 8,811,745, Farsui deployed a graph-cut algorithm in the Duke DOCTRAP software for processing handheld pediatric images. As noted, DOCTRAP provides a starting point for segmentation, but every image is reviewed and adjusted by a "grader" even with images of sedated and dilated patients. Embodiments of the present inventive concept propose instead taking a local approach. In particular, some embodiments of the present inventive concept provide a library of algorithms that are applied based on local assessments of image quality. Embodiments of the present inventive concept allow for faster training and are more robust to image variability over a broad range of circumstance. Furthermore, classification library may be used as a precursor to future "explained" neural network approaches to diagnostic decision making from pediatric retinal images.

Embodiments of the present inventive concept provide a histogram-based approach to developing an Image Quality Metric (IQM). The IQM may be applied at any scale relevant to algorithmic decision making, from the quantification of a full volume, to a single two-dimensional (2D) frame, and to a sector within frame. First, the top-to-bottom smooth-varying noise is estimated by pooling all the frames within an image and using maximum likelihood estimation. For each 2D frame in turn, it is gridded using a finite number of rectangular sectors. The grid may be any tessellating shape or overlapping shapes the completely fill the image without departing from the scope of the present inventive concept. Then, for each sector, the probability that it includes signal by the proportion that the pixels' intensity of the sector exceeds the estimated noise level is estimated. Using all the data in a frame, these sector-specific probabilities are converted into percentiles. Thus, a sector with a percentile level of 90% is interpreted as being more likely to contain signal than about 90% sectors within the particular frame. Finally, for each frame the area containing the signal is tuned by an iterative procedure that ensures not only that the final area is formed by the sectors most likely to contain signal, but it is also contiguous. The number of sectors is a tuning parameter. FIGS. 5A through 5D and FIGS. 6A through 6D illustrated the performance of methods in accordance with embodiments discussed herein with an 8×8 grid applied to frames of relatively high image quality (FIG. 5B_1) and relatively low image quality (FIG. 6B_2). In particular, in FIGS. 5A through 6D, examples of the methodology in accordance with some embodiments is illustrated on (A) high quality and (B) low quality images. From Left to right the images are as follows: (1) raw image; (2) Sectors IQM (3) filtered image; (4) segmented image.

In contrast to the prior graph cut methodologies, embodiments of the present inventive concept treat all sectors within the image as independent from the point of view of establishing a segmentation strategy within a sector. A graph cut approach may be an appropriate approach within a sector—these are not mutually exclusive concepts. However, the application of a graph cut approach to an entire image, or an image sector where the image quality varies greatly across the sector, is subject to multiple modes of failure, as the graph cut search algorithm relies on an ability to follow a most-likely continuous path across a region. Embodiments discussed herein alleviate this constraint by increasing the likelihood of continuity within any given sector.

Furthermore, by classifying sectors according to an Image Quality Metric, or for that matter multiple metrics into a joint Image Quality Classification (IQC), tuning parameters that seem to always play a role in automated image processing, fit into a narrow range within each class, and thus segmentation algorithms are more readily and robustly trained to the attributes of the class. Examples of a multi-parameter class may include structural information, such as quantifying the modality in a histogram distribution, for example, number of peaks in the distribution, of intensities in two-dimensional cell, or averaging the vertical stripes in the cell horizontally, and quantifying the peaks and along the averaged section of A-scan. An autocorrelation function may be processed on the sector or its vertical average, and the Fourier Transform extracted to obtain the Power Spectrum as a classification for sector. A cross-correlation with the sector or its vertical average or its horizontal average may be processed with a target shape function to identify the probability the sector contains a target feature, such as a fovea pit as previously discussed, or a layered region with a "normal" set of boundaries, thicknesses, contrasts. In some embodiments of the present inventive concept, a library of Metrics is created that is relevant to the application that may be used to test the content of an image sector in order to label the image sector by a classification that provides a commonality of information, such that each such class may be analyzed by a common set of algorithms to obtain the desired segmentation output.

In the context of the present inventive concept, SHERPA contains libraries of existing Image Quality Classifications and verified algorithms and recipes that may be applied as pre-processing steps to Collections of images in the context of Projects that support a current work objective. For the development, training, testing, and validation of algorithms and recipes, SHERPA presents collections of images to an external environment, such as MOSAIC OCULOMICS as discussed herein.

Some embodiments of the present inventive concept apply a multi-step "recipe" to segment an image. First, target image boundaries are segmented at anchor points along the image. Then a bridge between anchors using active contouring or graph cut methods is created. Finally, the method smooths across anchors considering continuity conditions.

Figure 7:
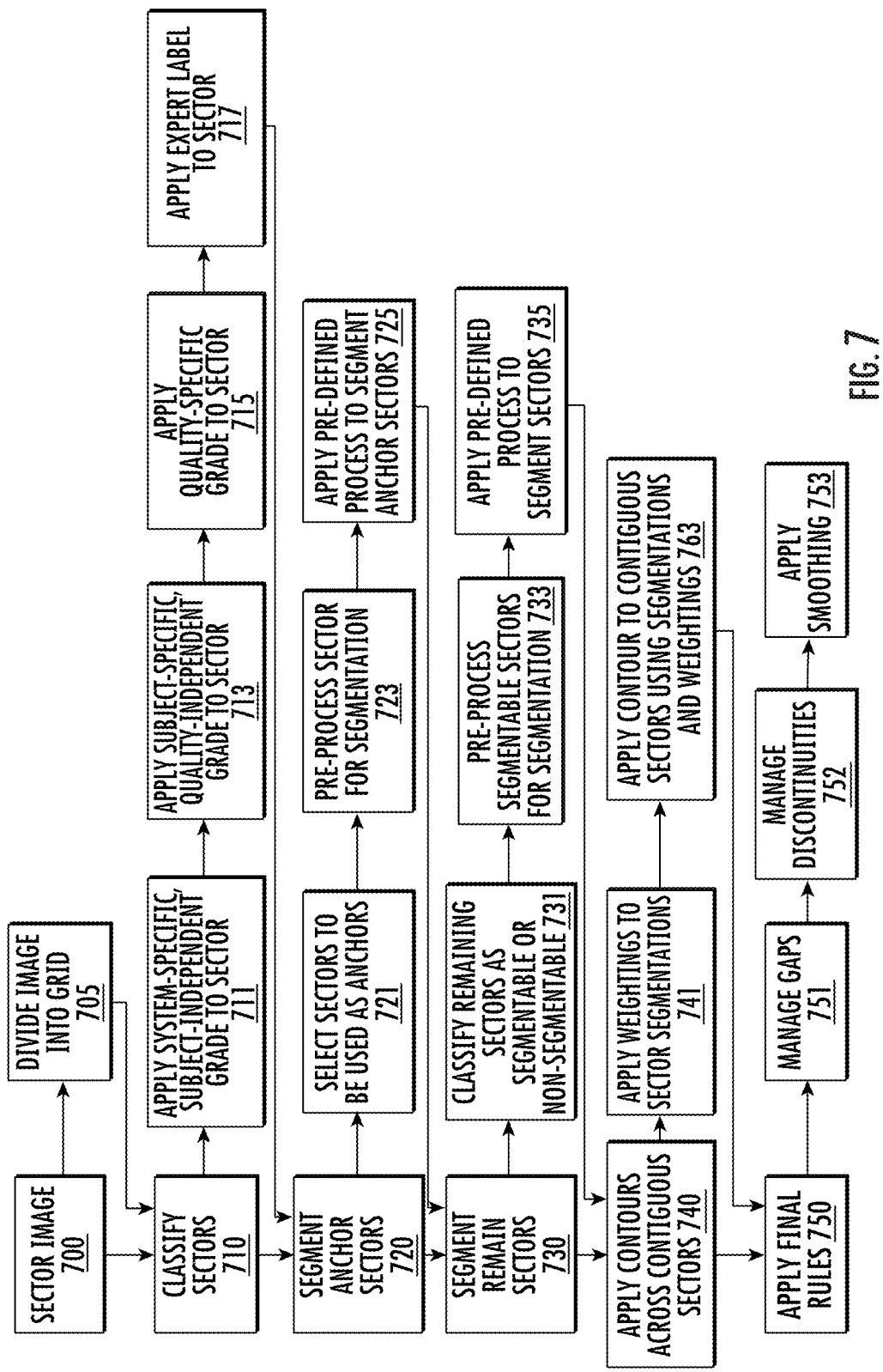
FIG. 7 is a flowchart illustrating operations for segmenting an image in accordance with some embodiments of the present inventive concept.

Referring now to FIG. 7, methods for segmenting images in accordance with some embodiments of the present inventive concept will be discussed. As illustrated in FIG. 7, the method begins at block 700 by tessellating the image into sectors. The sectored image is divided into grids (block 705) and the sectors are classified (block 710). The tessellated image is labeled with a one or more of the following types of labels: System-Specific, Subject-Independent grades, or metrics (block 711); Subject-Specific, Quality Independent grades (block 713), Quality-Specific grades (block 715), and Expert labels (block 717). A system-specific grade may be, for example, a label as to the modality or device manufacturer. The Subject-specific grade may be, for example, an indicator of a imaging target ("fovea"). The Quality Specific grade may be, for example, an image quality metric (IQM), or a metric that is indicative of structure. Each sector such labeled may be assigned to an Image Quality Classification (IQC). Anchor Sectors are then identified (block 720). The IQC is applied to identify columns across the image as candidates for initial segmentation (block 721). Along each column, the IQC is used to identify rows of maximum probability of containing segmentable retina (block 723). The array of high-probability sectors become anchor cells for initiating segmentation (block 725). Then a series of filtering and edge detection steps are applied to identify target boundaries. Some embodiments of the present inventive concept automate the identification of the internal limiting membrane (Surface (a)), outer plexiform-to-outer nuclear layer interface (f), inner edge of ellipsoid zone (h), and outer edge of retinal pigment epithelium/Bruch's membrane complex (j). (blocks 730, 731, 733 and 735). Active contouring or graph cut techniques may be applied combined again with local IQC guidance (block 740), to complete segmentation of an edge between any two anchors (blocks 741 and 743). Where the IQC indicates a below-threshold probability of finding an edge, embodiments of the present inventive concept establish rules (block 750) for completing a bridge (or preserving a gap(block 751)). Some embodiments manage discontinuities (block 752) Finally, the method smooths across the segmented regions increasing the likelihood of parametric second-order continuity (block 753).

Figure 8A:
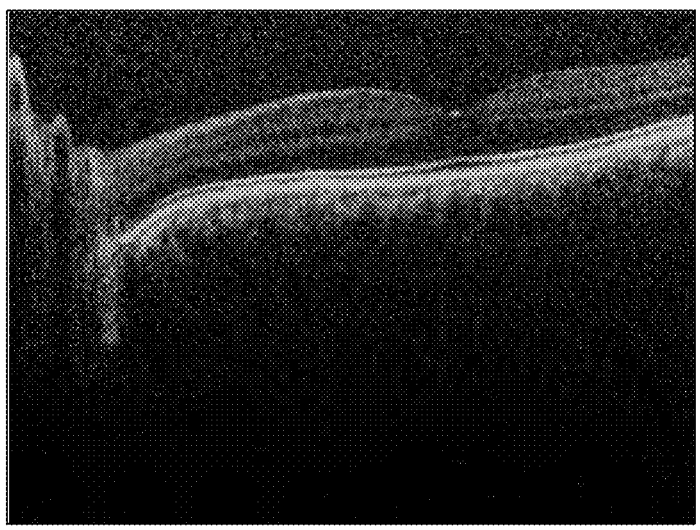
FIGS. 8A through 8E illustrate decimation of an image (FIG. 8A) using rectangular sectors (FIGS. 8B and 8C) and hexagonal sectors (FIGS. 8D and 8E) in accordance with some embodiments of the present inventive concept.
Figure 8B:
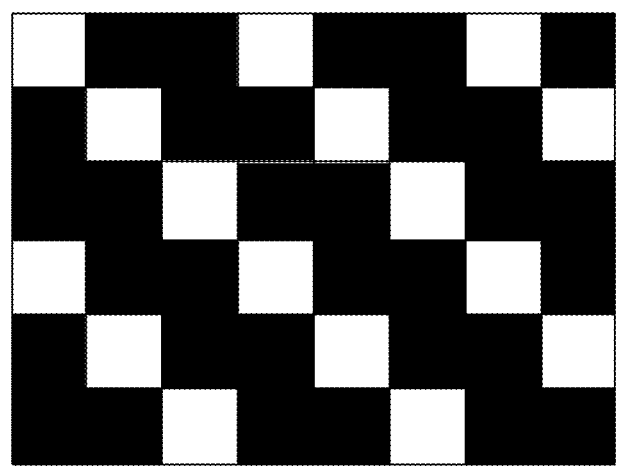
Figure 8C:
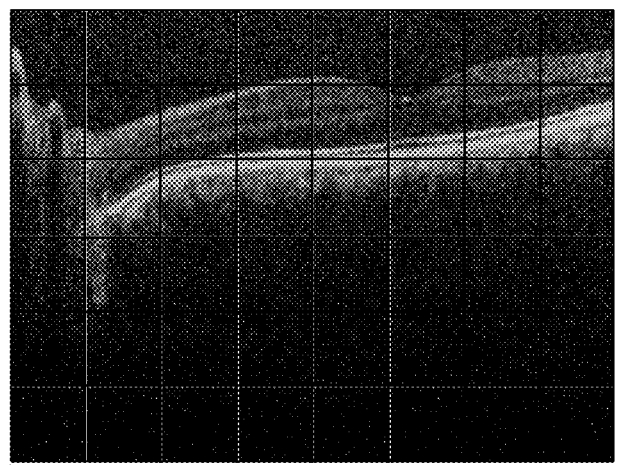
Figure 8D:
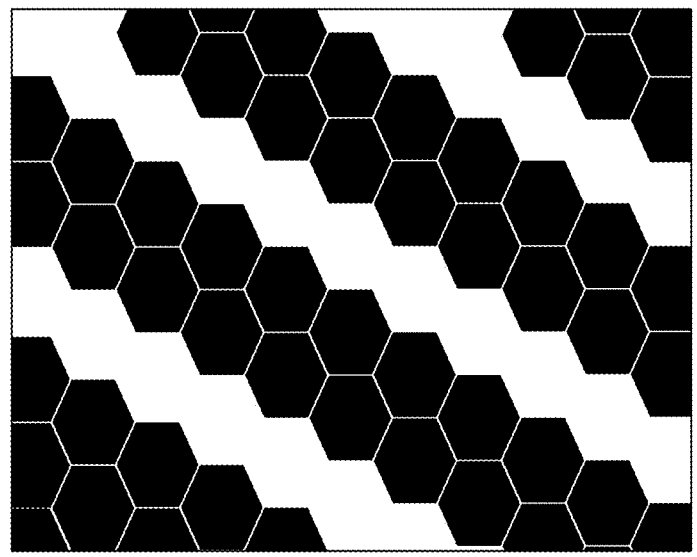
Figure 8E:
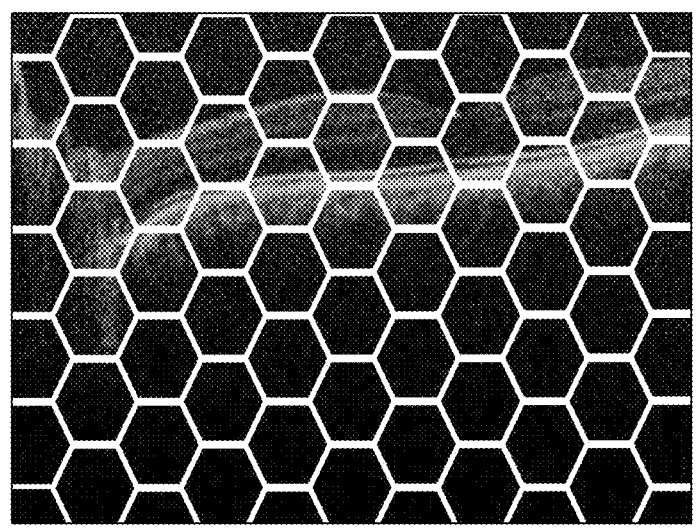

The decimation of images into sectors is very useful for localized image processing, labeling and classification, as shown in FIGS. 8A through 8E. Additionally, as retinal images are increasing considered Personally Identifiable Information (PII) or Protected Health Information (PHI), it is desirable to present only partial, non-identifiable images to users. In FIGS. 8A through 8E, two separate decimation methods are shown. In particular, the top row (FIGS. 8B and 8C) illustrated a grid of rectangular sectors and the bottom row (FIGS. 8D and 8E) illustrates a grid of hexagonal sectors. FIG. 8A illustrated the target cross sectional OCT B-scan. FIGS. 8B and 8D illustrate a binary multiplication map of the grid: white sectors will be shown, black sectors not shown. FIGS. 8C and 8E illustrate the binary map applied to the image of the B-scan. From this, sectors that may be presented are visible to a user for annotation and may be used for classification through the Image Quality Classification (IQC) methodology discussed above. The size of the sectors is large enough to contain relevant information, yet small enough to be considered non-PII with confidence.

Figure 9A:
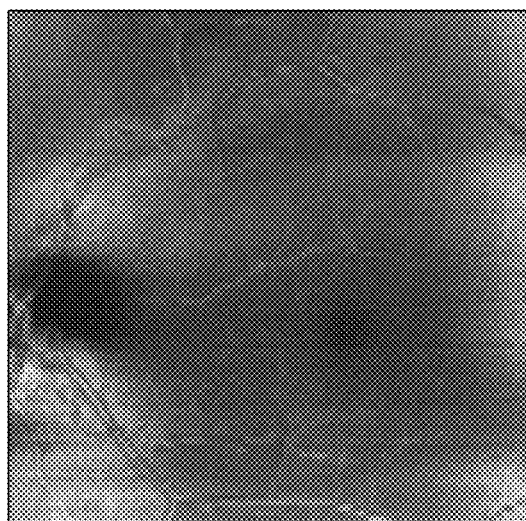
FIGS. 9A through 9E illustrate decimation of an image (FIG. 9A) on an enface view (orthogonal projection) of the same volume set of FIG. 8A using rectangular sectors (FIGS. 9B and 9C) and hexagonal sectors (FIGS. 9D and 9E) in accordance with some embodiments of the present inventive concept.
Figure 9B:
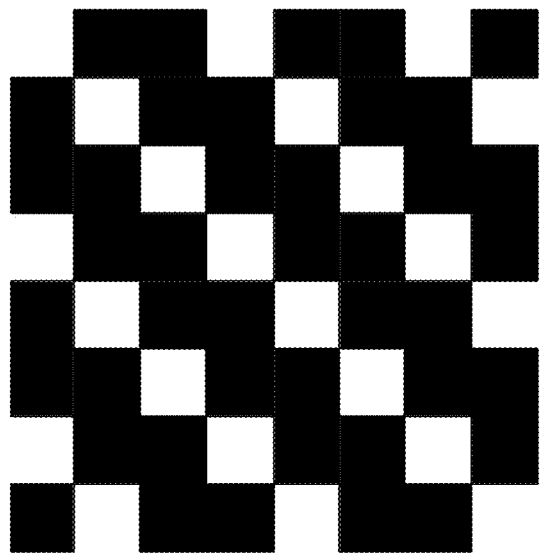
Figure 9C:
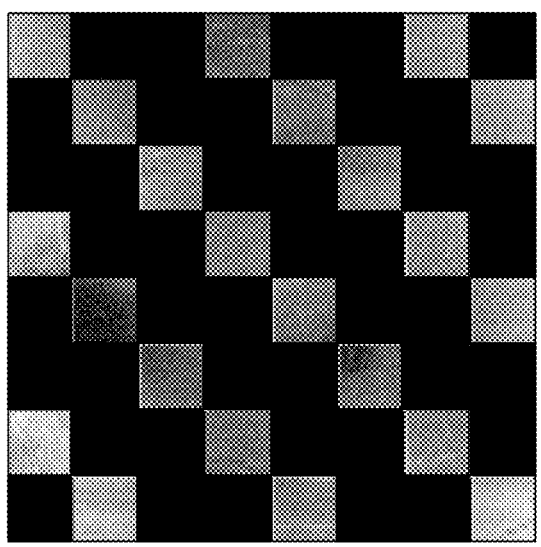
Figure 9D:
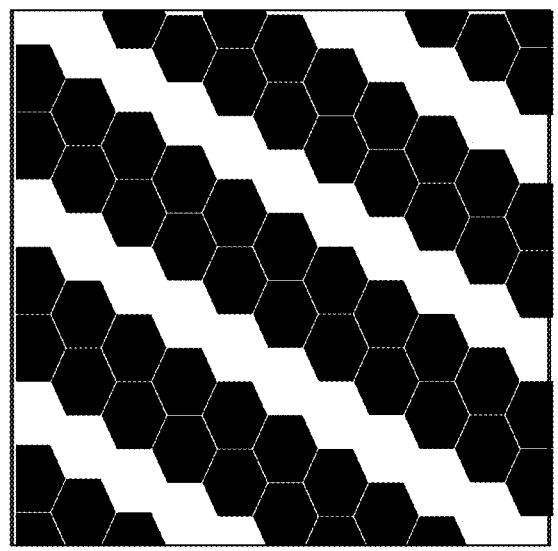
Figure 9E:
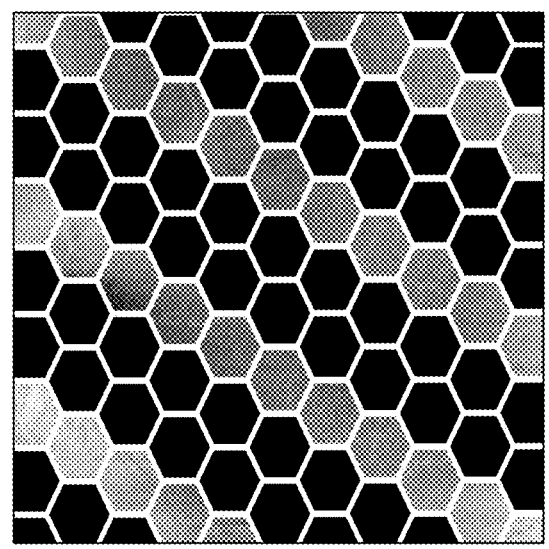

FIGS. 9A through 9E illustrate a similar decimation process discussed above with respect to FIGS. 8A through 8E. However, in FIG. 9A, the image is a an enface view (orthogonal projection) of the same volume set, rather than the OCT B-scan. The Enface view in FIG. 9A is close in appearance to a photograph of a retina, and therefore more at risk to be PII or PHI. The decimated sectors of the enface provide the same utility as for the B-scan, and the same advantage as to protecting PII.

Referring again to FIGS. 5A through 6D, the process discussed above was applied to two handheld images, which were selected to represent a representative range of image quality (high, A.1, and low, A.2). An 8×8 grid was applied and IQM calculated (B.1, B.2). The images were filtered, anchor points segmented (C.1, C.2), and smoothing was applied to three boundaries (segmentation of the OPL-ONL boundary was not attempted). As illustrated, the trial recipe works well on the higher quality image (D.1), and more error is observed, including an error in extrapolation (upper left inset in D.2), in the lower quality image.

Figure 10:
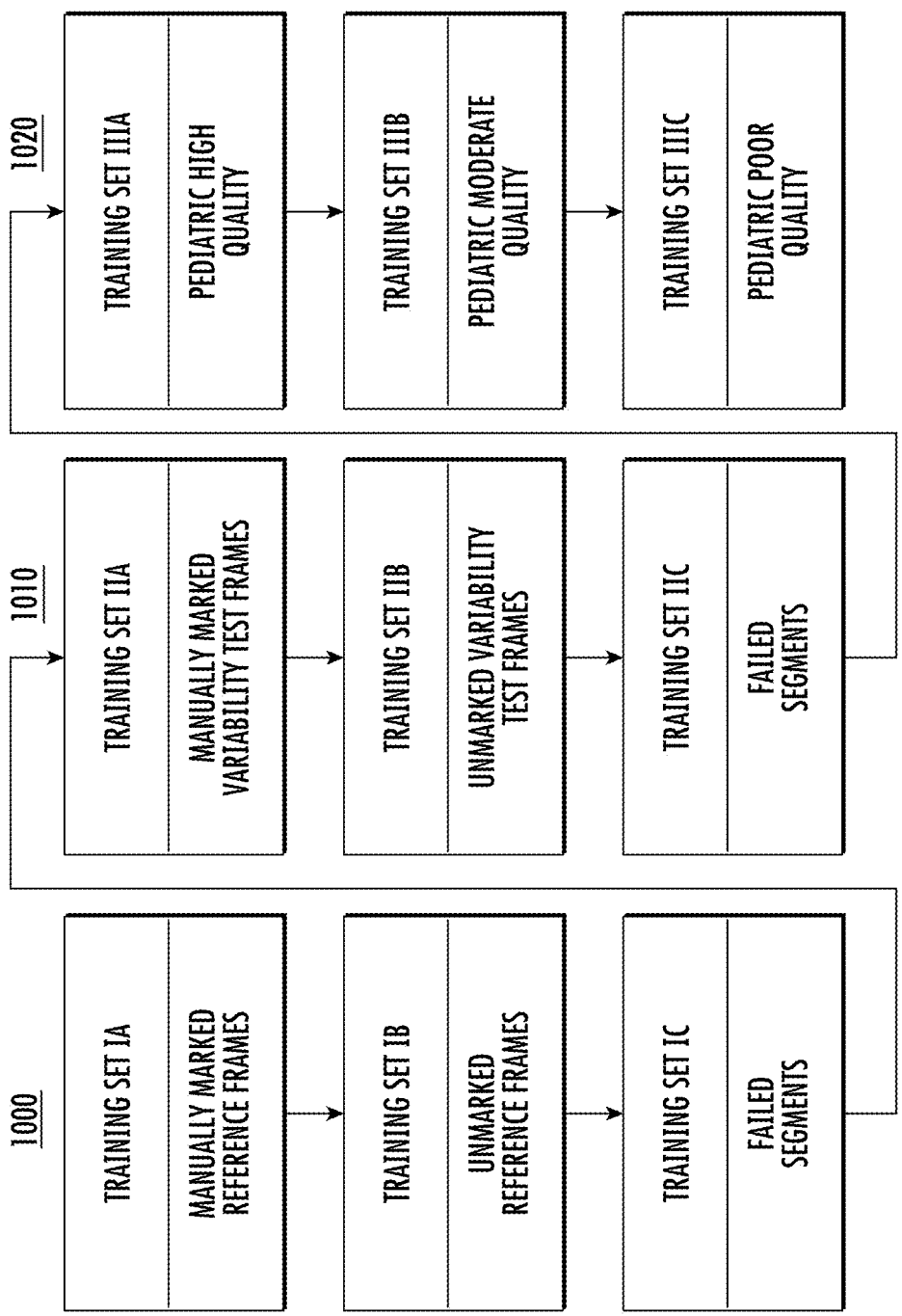
FIG. 10 is a flowchart illustrating training in accordance with some embodiments of the present inventive concept.

Some embodiments of the present inventive concept may be used to train and classify segmentation recipes using a nested triage process. The outer triage loop is used to manage the image set for training, as shown in, for example, FIG. 10, using further the collection and project management tools of SHERPA discussed above. Training Set IA 1000 is drawn from images collected and manually marked using cooperative healthy adults as discussed above, then proceeding to frames from those images that have not been marked. In some embodiments, SHERPA presents training set 1A 1000 to MOSAIC, where each sector of an image is assigned a classification according to a set of single- or multifactor classification metrics as discusses above, and the trained segmentation algorithms, including the algorithmic process flow or "recipe" along with any tuning parameters that were set to yield successful results are assigned to the IQC. The resultant recipes may then be used as the starting point for proceeding to the next set of images; these recipes are applied and tuned to Training Set IIA 1010, also presented by SHERPA to MOSAIC, and to the extent that Training Set IIA 1010 includes image sectors that fall into new classifications, the recipes are "tuned" accordingly and when fully trained, the new recipes are assigned to the respective classification. In this specific case Training Set IIA 1010 is drawn from the perturbed images discussed above. Finally, training will move to Training Set IIIA 1020 drawn similarly from allocation of frames from the Leicester clinical pediatric image set. In this sequence, Training Set IIIA 1020 represents a population of images likely to have the greatest variability and introduce new sector classifications into the mix. As such, Training Set IIIA 1020 may be further divided according to IQM (or IQC) classification into high, medium, and low quality frames, with training proceeding from high to low quality images. During the training process, a classification library may be developed that matches successful recipes to an image sector classifier, as illustrated, for example, in FIG. 11.

Figure 11:
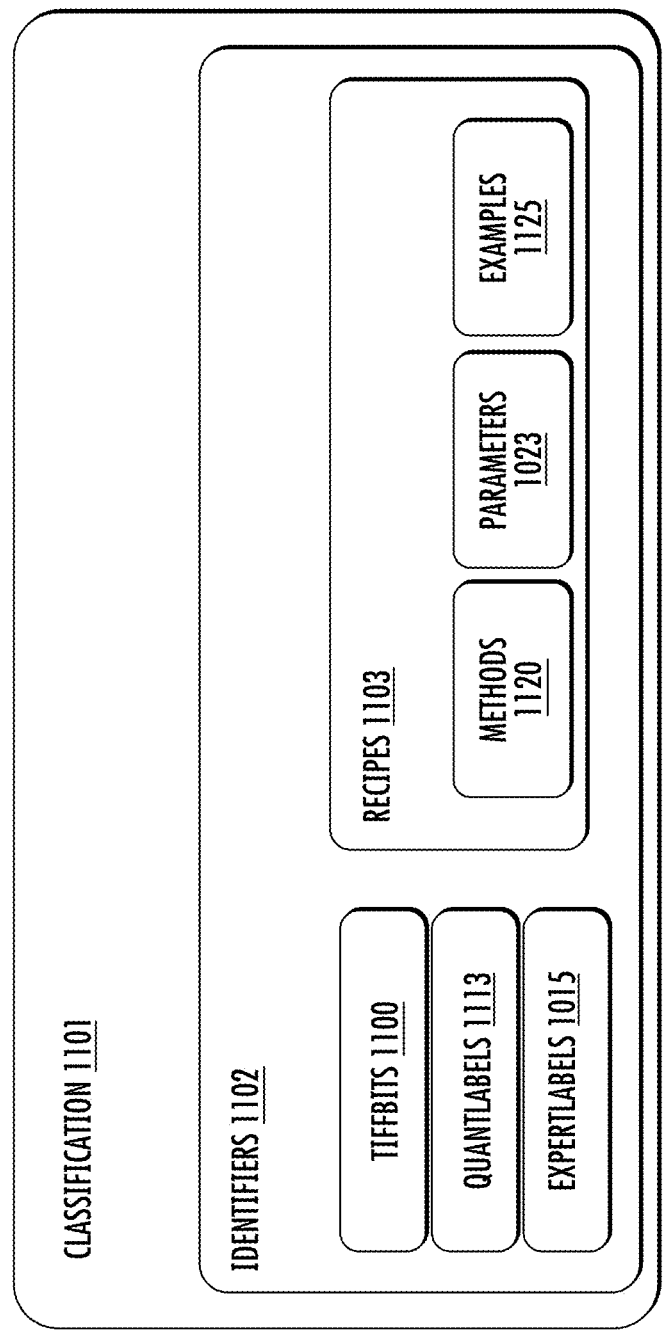
FIG. 11 is a diagram illustrating a classification model in accordance with some embodiments of the present inventive concept.

In particular, as shown in FIG. 11, each class 1101 (classification) includes an image identifier 1102 and a recipe 1102. The image identifier 1102 includes a representative image sample (TIFFBIT™) 1110, a quantitative label (IQM and/or IQC) 1113, and an expert label (annotation) 1015 or placeholder for such label. The Recipe 1103 includes the algorithm steps 1120, associated trained parameters 1023, and a representative output 1125. This process has the distinct advantage of constraining the variability of image quality broadly so that algorithms may converge faster (be subject to a smaller range of tuning parameters or decision trees) as they need only be responsive to more narrowly defined classes of image sectors. Furthermore, by proceeding sequentially from images with high image quality and lower variability to images that are increasingly more difficult to process, a more stable training process may be provided, with maximum reuse of algorithms, and faster training of parameters to create recipes that converge more reliably. Thus, embodiments of the present inventive concept provide a complete classification set that is collectively exhaustive with respect to the training set. When algorithms and recipes are successfully trained and validated for classified image sectors, the resultant library may be applied directly with SHERPA as pre-processing steps for ongoing evaluation and development. That is, SHERPA is not restricted to cataloging, but may also be used to run image collections through verified or validated recipe pipelines without passing to a subsequent development engine like MOSAIC OCULOMICS. Said differently, SHERPA and MOSAIC may integrate seamlessly into a single integrated environment. The user may need to differentiate only in the context of developing new algorithmic pipelines versus the application of existing validated pipelines.

It will be understood that for some class of images, methods discussed herein may not be successful. In such cases, this class of image may provide a useful record of failure modes to guide manual correction, and for future development. As discussed above, SHERPA may be used to manage image catalogs, the grouping of images into collections, and the processing of images in the context of projects. SHERPA further manages the classification library, and the assignment of Recipes to Image Quality Classifications. The classification library with image Identifiers discussed herein may be very useful in for future AI applications. The Image Processing steps associated with segmentation, when developed and validated, provide a set of automated classifications associated with the image classifications that may be further applied to population-based analyses. A single environment provides maximum management and tracking of the image provenance, image annotation, image processing, and batch analysis required for development and validation of imaging biomarkers, independent of the approach used.

In embodiments discussed herein, training is successful when the segmentation may be tested by running a Project to reproduce the Gage R&R analysis discussed above. A pixel-pixel matching of boundary points may be used between the manual and automated segmentations along common A-scans and vertical thicknesses may be calculated using the embedded device calibrations. Standard statistical approaches for assessing agreement may be used between manual measurements as the ground truth and the automated measures. The concordance correlation coefficient may be used, which considers both the systematic bias and the random error in assessing the agreement between the automated and manual segmentation. Bland and Altman plots may be examined for a visual assessment of the agreement.

Some embodiments of the present inventive concept may be used to produce a pediatric normative data set. In particular, a generalizable set of calibration procedures to quantify images is provided and applied to a segregated subset of the University of Leicester pediatric normative image set or any data set. Calibration procedures are critical to validating quantifications and biomarkers that are derived from images acquired on different devices from the same manufacturer, devices of like-modality produced by different manufacturers, and devices of different modality that may in principle be capable producing comparable results. In the field of ocular imaging, OCT images of the retina may be acquired with one of a host of different architectures of the same basic scanning technology. Embodiments of the present inventive concept may not describe all of the variants, similarities and differences of retinal imaging, but it is useful to note that OCT imaging originated with time-domain technology and evolved to the now-dominant Fourier domain technology. Fourier domain techniques bifurcate into spectral-domain OCT (parallel acquisition of spectral backscatter components) and swept source OCT (Serial acquisition of spectral backscatter components). These classifications refer to signal acquisition and processing techniques. Another variable is imaging wavelength (or waveband, as OCT is a broad-bandwidth imaging technique). Imaging of the retina is accomplished either in the 800-900 nm band, or in the 1000-1100 nm band. Images acquired at these wavelengths are superficially quite similar, but absorptive and dispersive properties yield important differences. More troubling, while OCT images may be used interchangeably in the clinic for general purposes, quantitative analysis is not considered to be interchangeable between devices from different manufacturers or in different wavebands. The Federal Drug Administration (FDA) for example, does not include normative data developed by one manufacturer on one model of device to be interchangeable across models, and certainly not across manufacturers or wavebands. This is largely owing to a lack of standards, and the lack of standards is traceable to a lack of systematic calibration techniques, particularly as associated with scanning geometries of the retina.

For historical reasons, OCT images of the retina are generally presented to cartesian coordinates as if the scanning of the retina was telecentric and normal to a flat plane, when in fact the scanning is angular scanning through the pupil of the eye in a Maxwellian geometry. The retina is better visualized as the inner surface of a sphere, and a B-scan would be better visualized as a fan, converging from the outer retina to the inner retina. As the thickness of the retina is thin relative to the distance from the pupil to the retina (0.3 mm vs 17 mm) an argument can be made that the fan distortion is minimal, but it is not negligible, and therefore the visualized shape of the retina in common OCT images is just plain wrong. Further exacerbating the calibration problem, the transverse scale of the retain (distance along the horizontal axis of a B-scan) is predicated on a trigonometric relationship between the scan angle (controlled by the imaging device) and the posterior chamber length (PCL, distance from the pupil to retina, a property of the subject). OCT systems presume a nominal adult PCL, and thus the scale is at best approximate for a "typical" adult, and also just plain wrong for any specific subject. This problem has been noted recently in the literature by Lindermann. For the pediatric population, the problem is even worse, as the eye length grows approximately 50% from birth to maturity, so that at any age, the linear cartesian scale that uses an imputed adult eye length has no real bearing on the subject.

As discussed above, embodiments of the present inventive concept provide a normative database that is age-stratified, independent of axial eye length, and generalizable beyond a single, for example, the Envisu C2300, imaging device. In other words, embodiments of the present inventive concept may be used in combination with any database of images obtained with any qualifying imaging system.

The two most important calibration factors are lateral scan dimensions and axial scaling. Lee and Proudlock demonstrated that retinal structure scales consistently as the eye globe matures, such that visual angle relationships are preserved. Therefore, presenting lateral dimensions as an angle (using a close surrogate to visual angle) will provide much greater physiological correspondence than using a derived linear dimension.

For SDOCT systems operating in the 800 nm-900 nm waveband, axial (vertical, or longitudinal) scaling is well developed, and OCT systems generally apply a single refractive index value of 1.38 to scale the vertical axis in the posterior chamber of the eye. It will be understood that this is an approximate, single value applied to the vitreous and all layers of the retina alike. This may be contrasted with imaging of the cornea, where the image includes air, refractive index n=1, anterior to the cornea with refractive index n=1.38. In such a case, it is well established that correcting for this dramatic refractive index change is essential to imaging as discussed in, for example, U.S. Pat. No. 7,072,047. For future swept source systems operating in the 1000 nm-1100 nm waveband, cross calibration may be readily established if refractive index values that are applied in scaling are preserved. Embodiments of the present inventive concept may utilize and maintain current databases in way that simplifies a future cross-calibration with devices operating at other wavelengths, such as these swept source devices.

Conventional clinical systems use fixed adult axial eye length values for presenting lateral scaling in millimeters and use an average refractive index of the retina for axial scaling. Embodiments of the present inventive concept process from pixel space to physical space that maximizes quantitative accuracy, eliminates dependence on axial eye length, and allows for cross-calibration to other devices.

All Leicester pediatric images discussed above were acquired at a constant device scan length setting, and therefore constant posterior scan angle. Conversion to visual angle is therefore direct as shown in Eqn. (1):

$$\text{visual angle } \theta = \tan^{-1}((\text{scan length mm})/17), \qquad \text{Eqn. (1)}$$

where 17 mm is the adult posterior axial length used as the basis within the Envisu imaging system (primary inventor of the present inventive concept was chief architect of the Envisu system), based on Maxwellian scanning through the nodal point of the emmetropic eye. This is not perfect, in the sense that the implied visual angle is approximate, but this method allows cross-system calibration by determining the effective posterior axial length that is used to compute scan length. This may be accomplished ratiometrically with a simple imaging phantom. In some embodiments of the present inventive concept, images are rescaled from an imputed posterior chamber length and programmed scale to a scan angle using the arctangent of the ratio of a programmed linear scan length (base of the scanned triangle) to a value that is imputed distance from the pupil to the retina (height of the scanned triangle).

Retinal thickness measurements are made perpendicular to the retinal pigment epithelium (Surface (j)). Since the lateral (transverse) and axial (vertical or longitudinal) scales differ by a factor of one thousand (millimeters versus micrometers), angular deviation of the RPE normal to the vertical quickly leads to errors. Embodiments of the present inventive concept apply refractive correction to the image at the vitreous—retina boundary, as commonly applied to anterior segment imaging (Westphal), even though the refractive index difference between vitreous (n=1.336) and retina (n=1.36) is small. Though refraction correction at the air-cornea interface is well known and uniformly adopted, the literature suggests that the refraction at the location of greatest curvature—the edges of the foveal pit, are inconsequential to vision and though it has be demonstrated that the fovea shape does indeed lead to optical magnification at the fovea (a result of refraction). This directly implies that optical rays impinging on the boundary of the fovea do bend, and therefore a precise reconstruction of the OCT image of the retina posterior to the fovea requires a correction for refraction at the vitreous—retina interface (Surface (a)). This behavior has been consistently ignored in the imaging art. And while one may assert the effect is small and localized, it highlights that refraction at the vitreous—retina interface does impact optical ray transmission whenever a ray impinges this interface as a direct consequence of Snell's law. Imaging of non-cooperative subjects, including the handheld imaging of children but certainly not limited to this case, frequently yields tilted images where the optical path impinges the interface at an angle, and without applying refractive correction at this interface, the posterior structure will be visualized in error, and any measurements made posterior to this interface will be in error. Additionally, even the approximation of the retinal surface as "flat" is itself wrong, as the retina sits at the inner surface of a sphere—the eyeball, and the posterior chamber length of the eye sits above (anterior to) the center of curvature of the retina. This is again demonstrated in Chen, though the impact of optical refraction at the surface is missed. Therefore, in some embodiments of this inventive concept, a refractive correction is applied everywhere along the vitreous—retina interface using a first refractive index for the vitreous and a second refractive index for the retina. To the extent that the wavelength dependence of the refractive index is known, the applied indices will be corrected for the waveband of the imaging system. In embodiments where a fluid replaces the vitreous, such as following a surgical vitrectomy, the refractive index of the replacement fluid will be used. As the layer-specific refractive index is not known, at least with any certainty, in some embodiments of the inventive concept an average refractive index value is used for the retina and correct only for first-surface refraction at the vitreous-retina interface. In further embodiments, refractive correction may be applied at each subsequent boundary surface, to the degree that refractive indices are known or may be hypothesized.

Given the refractive correction, thicknesses normal to the RPE are computed without applying artificial flattening algorithms that create unnecessary distortion. Thus, embodiments of the present inventive concept have greater accuracy, less dependence on image tilt, and greater flexibility to investigate the impact of refraction and tilt on OCT imaging. Further, such embodiments including both angular rescaling and refractive correction lend themselves to improving interoperability of quantitative measures between manufacturers and across wavelengths, and provide an avenue for improving the interoperability of data acquired with optical, ultrasonic, and magnetic resonance images that are all used in diagnostic applications involving the eye.

It will be understood that the angular rescaling derived from Eqn. (1) above relies on an imputed value for the posterior chamber length, and upon careful inspection raises the question of exactly what the "base of the scanned triangle" refers to with respect to measuring a transverse length along the retina. Some use a model of the subject eye to provide a more accurate representation of the scan geometry. While this approach validates the existence of the problem, embodiments of the present inventive concept provide a more direct, subject-independent approach to calibrating the scanning system to remove the dependence on the subject. It is therefore a further object of the present inventive concept to provide an apparatus and a method for calibrating OCT retinal imaging systems specifically, and Maxwellian imaging systems of the retina more generally.

Figure 12A:
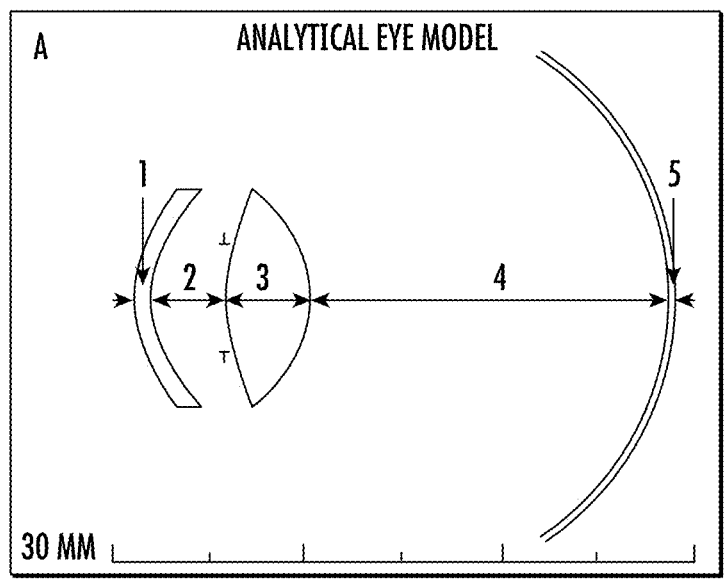
FIGS. 12A and 12B are diagrams illustrating optical schematics of the analytical (12A) and the optomechanical (12B) eye models in accordance with some embodiments of the present inventive concept.
Figure 12B:
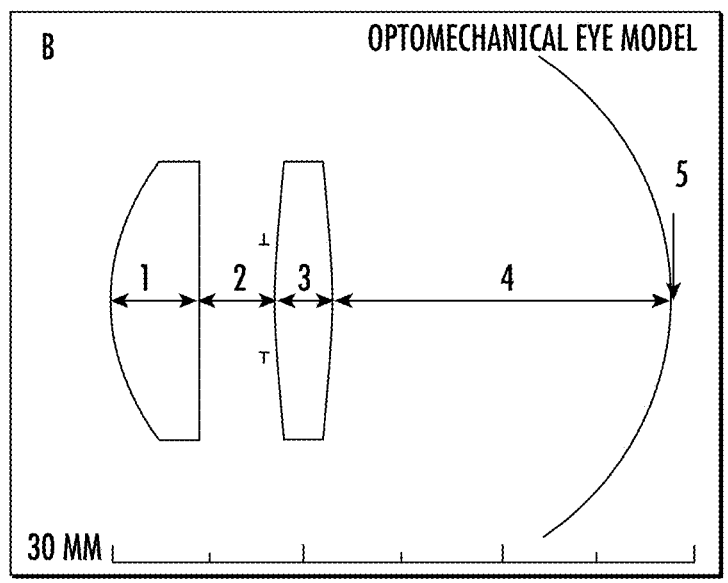

In some embodiments, a model eye is provided with a defined geometry that facilitates calibration of both scanning and full field, for example, photographic, retinal imaging systems. A Spherical Model Eye (SME) is illustrated in FIGS. 12A and 12B. In particular, FIGS. 12A and 12B provide optical schematics of the analytical (12A) and the optomechanical (12B) eye models. All the elements of the eye including cornea (1), anterior chamber (2), crystalline lens (3), posterior chamber/vitreous cavity (4) and retina (5) are reported. Thus, as illustrated, the SME has a spherical inner surface posterior to a focusing anterior objective lens assembly, a pupil plane corresponding to the nodal point of the focal assembly, a posterior distance from the pupil plane to the posterior pole of the spherical surface, and fiducials imprinted on the inner surface. In some embodiments of the inventive concept, the radius of curvature of the posterior surface is specified, and the radius of curvature is smaller than the posterior distance from pupil to posterior pole. The anterior focal assembly focus the image of an object at infinity in a Maxwellian fashion to the central region of the inner surface, for example, the posterior pole of the system. As such, the SME is a model of an emmetropic human eye. The posterior chamber length is designed at 17 mm. The radius of curvature of the inner "retina" surface is 13 mm. The refracting power of the anterior objective lens assembly is nominally 60 Diopters. Specific parameters of a model eye that satisfies this set of criteria are listed in the Table of FIG. 12C.

The model is based on a simplified version of the Dubbelman schematic eye derived from Scheimpflug biometric measurements of the human eye. In the simplified model, all refractive surfaces are spherical in shape. Surface curvatures, intraocular distances are set (Table 1) to reproduce a relaxed adult eye (35 years, 0 D accommodation). The optical model is plotted in FIG. 12A. The eye model contains a 5 mm pupil and a curved retina with a radius of 13 mm6. Refractive indices of the cornea and ocular media are taken from Gullstrand except for the lens for which a uniform "equivalent" refractive index is adopted instead of the gradient since the goal is to model paraxial behavior only. With an axial length of 24.35 mm, an effective focal length of 16.70 mm (refractive power~60 D) and the object at infinity the eye is emmetropic for the paraxial rays.

In some embodiments of the SME, the posterior chamber may be fluid filled with, for example, a balanced saline solution to mimic the vitreous. The pupil plane may include an aperture of diameter between 3 mm and 7 mm, and this aperture may be controlled via a blade shutter mechanism or may be a replaceable component. The anterior lens assembly in a preferred embodiment is a replaceable element. The anterior lens assembly may be a single, uncorrected, 60 Diopter singlet, or may be designed as per the table of FIG. 12C to include a par of lenses that mimic the cornea and the crystalline lens, respectively. The crystalline lens assembly may also be replaced with intraocular lenses of the type used in cataract replacement surgery.

As will be discussed below with respect to an example calibration method, precision in the posterior surface curvature and the posterior chamber length are desirable to support accurate calibration. The spherical posterior surface may be produced using modern three dimensional (3D) printing technologies, casting or molding technologies. It will be understood that the state of the art in precision stereolithography allows for printing with micrometer resolution. Alternatively, lower resolution 3D printing or other molding or casting technologies may be used, with a diamond turned inner surface to the specified radius and surface flatness. The optimum target surface flatness expressed as a deviation from spherical target is equal to the axial resolution of the imaging system, i.e., between 3 and 10 micrometers, requiring a final surface finish such as diamond turning (and readily obtained therewith.) The spherical surface preferable extends to 30 degrees or more beyond the pole enabling calibration of widefield scanning systems.

In some embodiments of the inventive concept, the inner surface of the surface is printed with fiducials of known angular extent with respect the nodal point. In some embodiments, the fiducials mimic longitude and latitude as may be drawn on the surface of a globe, may be hyper- or hypo reflective relative to the underlying surface, are provided in angular increments of between 1 and 5 degrees, and have a line width no wider than 10% of the angular increment.

In some embodiments, the inner surface includes a thin hypo-reflective polymer coat of less than 5 micrometers to reduce specular reflections from the finished surface, where such a coating may be above or below the fiducials but where the visibility of the fiducials remains.

In some embodiments, the surface is further coated with one or more translucent polymer layers of thickness between 25 micrometer and 250 micrometers, such that the underlying surface remains visible in OCT imaging, and where there is a differential contrast between layers to simulate retinal layers. An example layer stack is illustrated in FIG. 13.

Figures 13A, 13B:
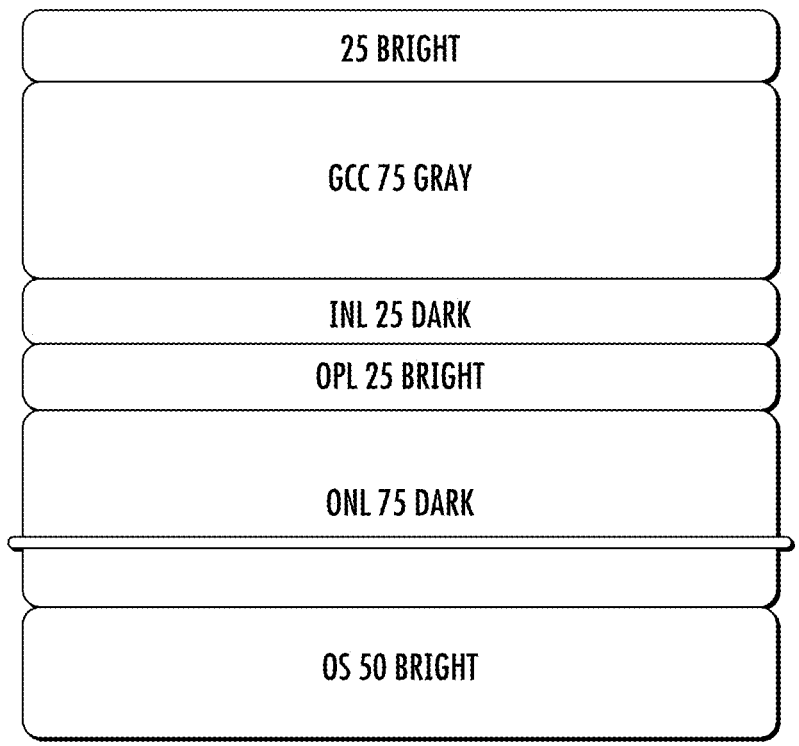
FIG. 13A is a diagram illustrating an example layer stack in accordance with some embodiments of the present inventive concept.
FIG. 13B is a table related to FIG. 13A including details associated therewith in accordance with some embodiments of the present inventive concept.

As illustrated in FIG. 13, the layer stack 1305 includes polymeric layers of alternating translucence that are stacked to mimic the major layer organization of the retina as illustrated, for example, in FIG. 3C. The stack construction is defined in the table of FIG. 13B. It is understood that in embodiments illustrated, one very thin layer of 5 micrometer has been included representing the External Limiting Membrane to device the Outer Nuclear Layer (ONL). The desired attenuation coefficients are well within the range of 3D printable polymers, and the adjustment of attenuation coefficient is an evolving field in the art of 3D printable optics, and will be known to practitioners in the art that choice of polymer, additives, and inclusions are among the options for controlling optical properties. The details in the table of FIG. 13B include details associated with a Spherical Model Eye layer stack model, including thickness in micrometers, Beer's law attenuation coefficient (1/micrometer), layer one-way attenuation coefficient (dB/micrometer), total layer attenuation (dB) for a total stack one-way attenuation of 3 dB.

The spherical shape and its radius of curvature provides a shape function that is expected from the OCT scanning geometry, and as discussed in the derivations below the error of the imaged shape function provides direct information on the scan angle and errors on the optical path length arising from the optics of the scanning system. The fiducials provide an enface projection image from the OCT, or a direct image from a scanning laser ophthalmoscope or full-field imager that can be inverted analogously to structured illumination imaging to derive perturbations in the imaged scan angle versus the programmed scan angle. The layer stack provides a depth dimension that can be used as a model both for calibrating systems in the axial (longitudinal) dimension, as well as providing an artifact for developing segmentation algorithms. The layer stack also provides a system for assessing wavelength dependent properties, and cross-calibrating systems that operate in different wavebands.

Figure 14:
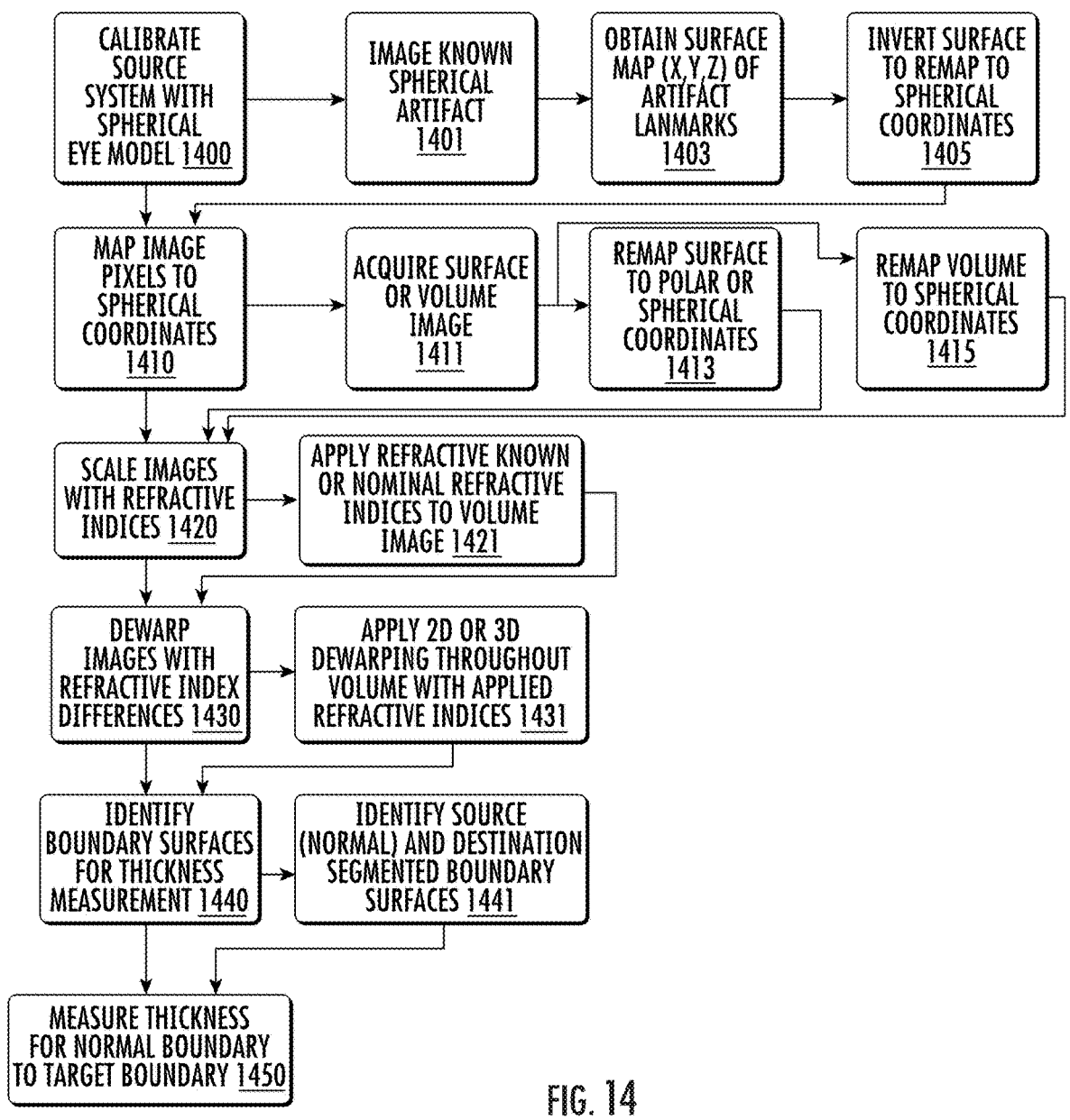
FIG. 14 is a flowchart illustrating operations for calibration and scaling using the Spherical Eye Model in accordance with some embodiments of the present inventive concept.

Referring now to FIG. 14, operations for calibration and scaling for the SEM in accordance with some embodiments of the present inventive concept will now be discussed. As illustrated in FIG. 14, operations begin at block 1400 by calibrating the system with the SEM. The basic steps further include mapping the acquired image pixels from Cartesian to Spherical coordinates (block 1410); scaling segmented images with refractive indices (block 1420); dewarping images with Snell's Law and refractive index differences (block 1430); identifying boundary surfaces for thickness measurements (block 1440); and measuring thickness from the posterior too the inner (or anterior) boundary, using a vector normal to the posterior boundary (block 1450).

As further illustrated in FIG. 14, each of the basic steps in the method include sub steps. For example, calibrating the source system further includes determining if the image is a known spherical artifact (block 1401); obtaining surface map (x, y, z) of artifact landmarks (block 1403) and inverting the surface to remap to spherical coordinates (block 1405). The output of block 1405 may be provided to block 1410, which sub steps including acquiring a surface or volume image (block 1411); remapping surface to polar or spherical coordinates (block 1413)/remap volume to spherical coordinates (block 1415). The output of blocks 1413 or 1415 is provided to block 1420, which sub steps include applying refractive known or normative refractive indices to volume image (1421). The output of block 1421 is provided to block 1430, which sub steps include applying a 2D or 3D dewarping throughout volume with applied refractive indices (block 1431). The output of block 1431 is provided to block 1440, which sub steps including identifying source (normal) and destination segmented boundary surfaces (block 1441). The output of block 1441 is provided to block 1450, which as discussed above measures the thickness from the normal boundary to the target boundary.

Figure 15A:
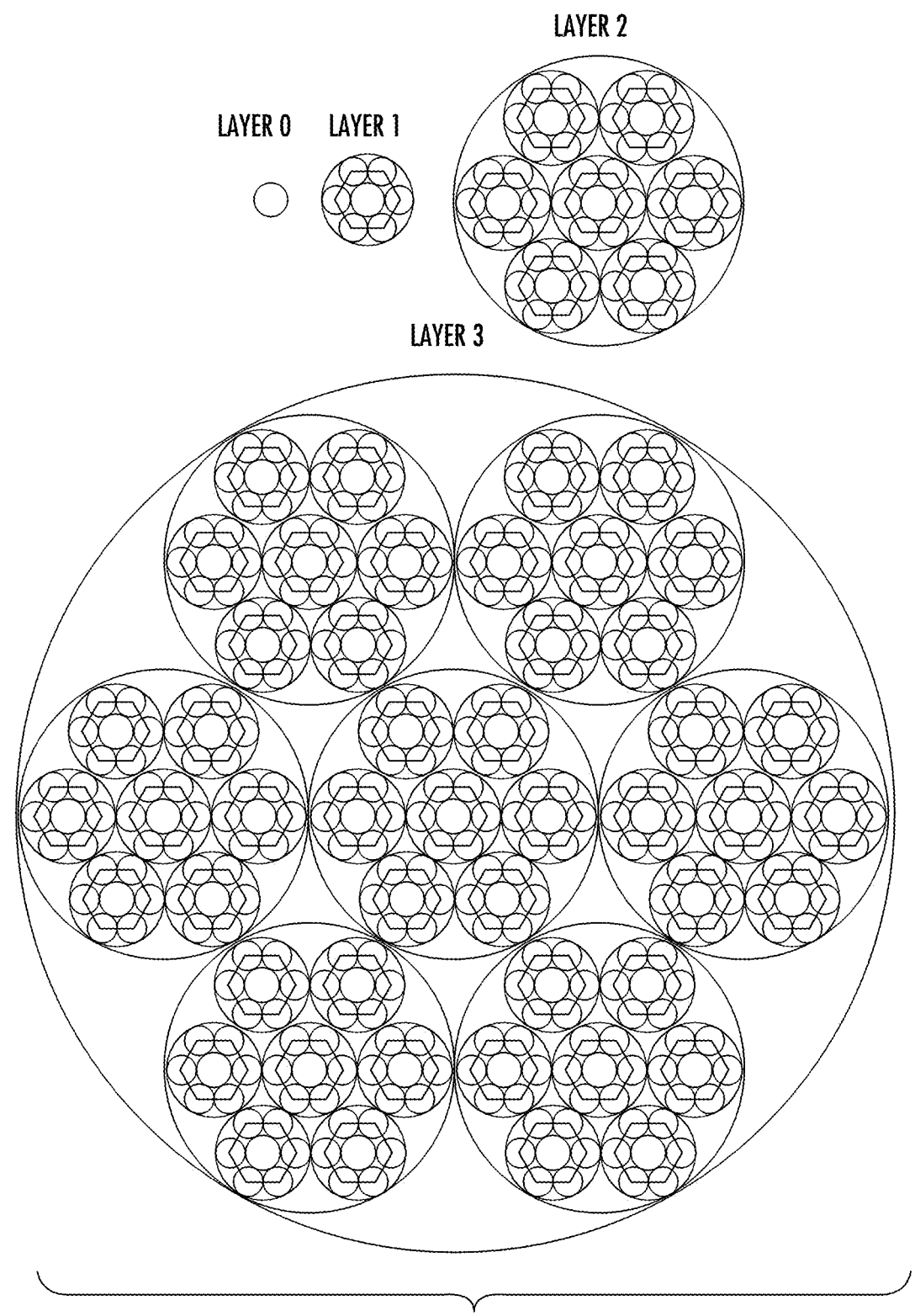
FIG. 15A is a diagram of a simple hexlet using circles in accordance with some embodiments of the present inventive concept.
Figure 18:
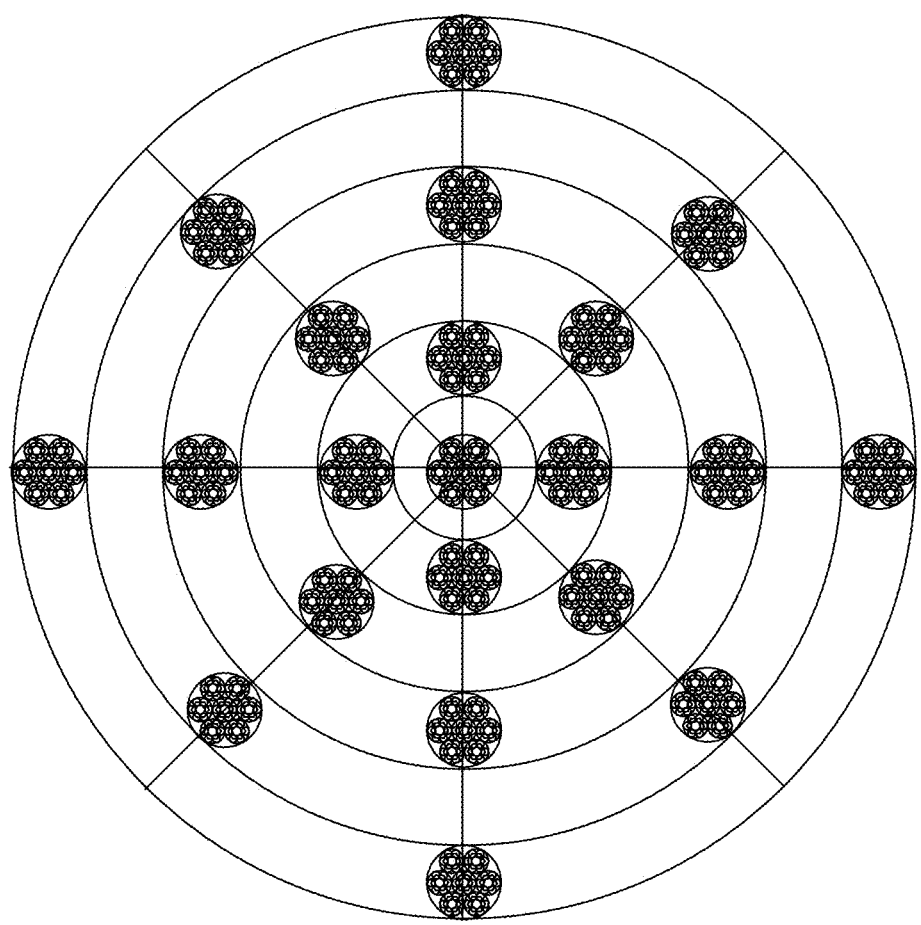
FIG. 18 is a diagram illustrating a representation of a spherical model eye in accordance with some embodiments of the present inventive concept.

In further embodiments of the inventive concept, a second set of fiducials is added that is designed to calibrate lateral resolution as a function of position relative to the posterior pole of the SME. Uniquely, this resolution "phantom" is designed to provide information of multiple scales, using a fractal-like assembly of circles, as shown in FIG. 15A. This is the simplest representation of a hexlet, having the desirable properties that the circles (in this embodiment six equal-radius circles surrounding a seventh same-radius circle) are all "kissing." These "kissing" circles are enclosed in an outer circle, itself tangent to, or "kissing" the six outer circles, and thus the pattern may be scaled at will to a similar construct of six circles around one, each of a radius three-times the previous radius. The radii in the embodiment illustrated in FIG. 15A scale to the power of three with each layer (r=1, 3, 9, 27, 81 . . . for layer 0, 1, 2, 3, 4 . . . respectively). As designed, this figure is printed at the pole, in locations centered at equal-angular separations radially from the pole in increments at least greater than the angular diameter of the pattern, and generally between 2 and 5 degrees, and rotationally at least along the major compass axes a 0, 90, 180 and 279 degrees, and additionally at the 45 degree lines as well. As shown in FIG. 18, the placements along the intermediate 45 degree lines may be offset by half a separation period for a greater positional coverage.

In some embodiments of the inventive concept, a printed circle of smallest radius is given a radius of 1 micrometer, comparable to the radius of a cone photoreceptor. The pattern is reproduced in three circumscribing layers (layers 0, 1, 2, and 3), with a maximum radius of the outer circumscribed circle of 1*3^3=27 micrometers.

In more general embodiments of the inventive concept, the smallest printed unit circle has a radius between 0.5 micrometer (diameter of 1 um) and 5 micrometers (diameter of 10 um) and is arranged with between two and five layers around the primary unit. The table illustrated in FIG. 15B illustrates the resolved cone angle, given the described Spherical Model Eye with a posterior chamber length h=17 mm, in milliradians and degrees, for this hexlet construction from zero layers (primary unit only) to five layers, with a unit diameter from 1 micrometer to ten micrometers.

Figure 16C:
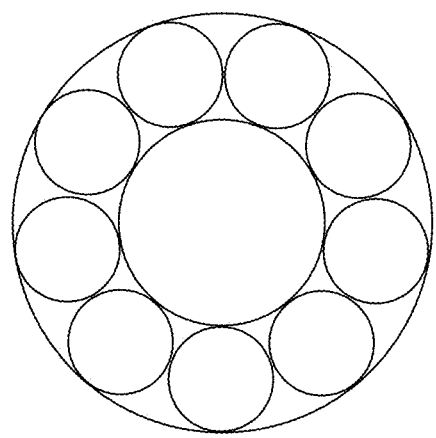
FIGS. 16A through 16C are diagrams illustrating Steiner chains in accordance with some embodiments of the present inventive concept.
Figure 16B:
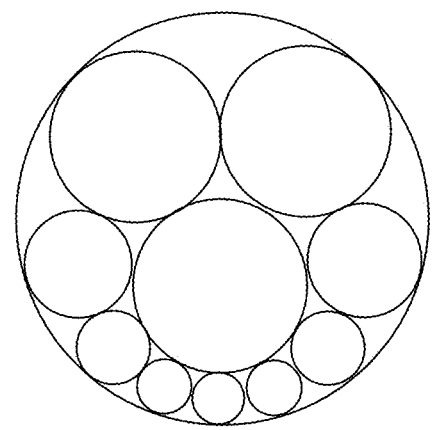
Figure 16A:
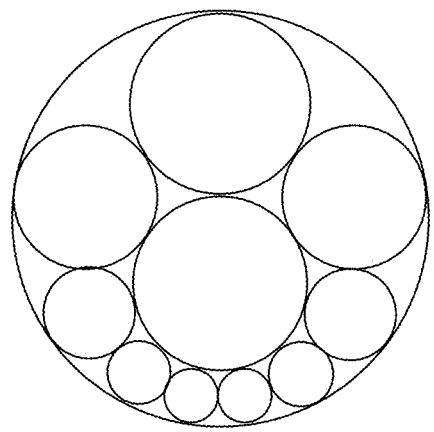
Figure 17A:
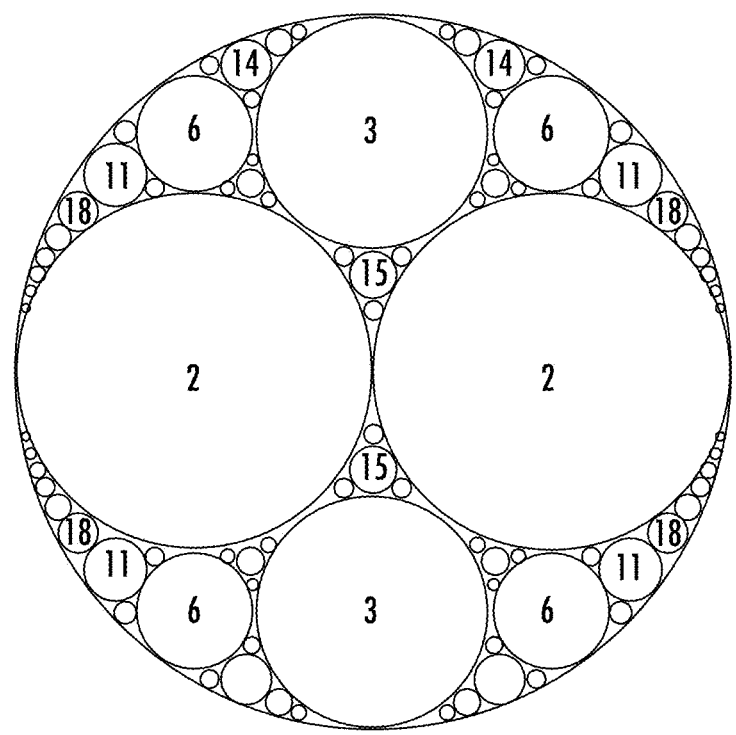
FIGS. 17A and 17B are diagrams illustrating Apollonian Circle Packings in accordance with some embodiments of the present inventive concept.
Figure 17B:
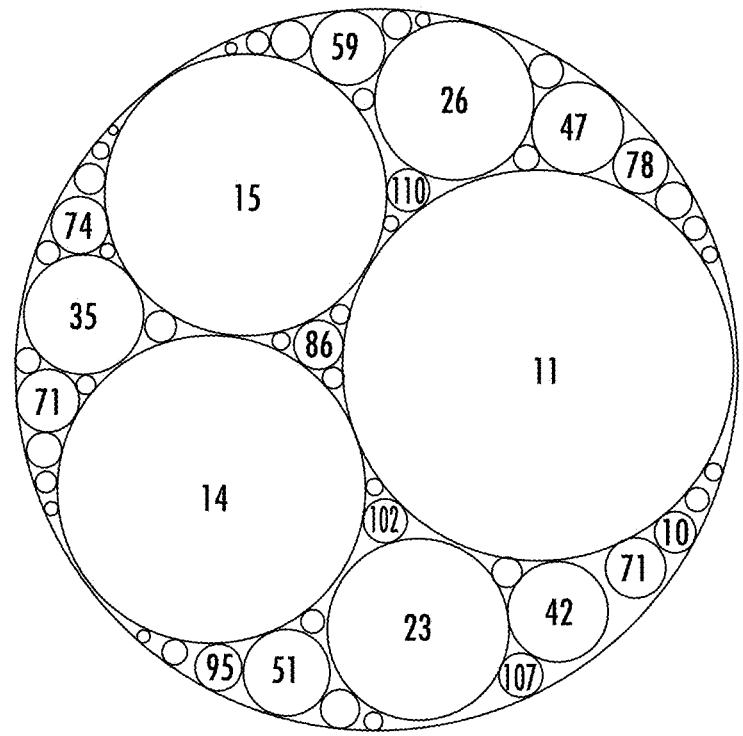

In further embodiments, any hexlet construction may be defined that meet the criteria of "kissing," and the design concept may further be extended to Steiner Chains illustrated, for example, in FIGS. 16A through 16C and Apollonian Circle Packings illustrated in FIGS. 17A and 17B. FIG. 17A illustrates an Apollonian Circle packing (-1, 2, 2, 3) and FIG. 17B illustrates and Apollonian Circle packing (-6, 11, 14, 15). FIGS. 16A through 16C and FIGS. 17A and 17B illustrate embodiments that meet the conditions of a tangential packing of circles within a circle, such that the packing may be expanded concentrically to provide a test plate at multiple scales.

A difference between the simplest hexlet of FIG. 15 and the those illustrates in FIGS. 16A through 17B, is that the diameters of the simple hexlet of FIG. 15 scale as integer powers of 3, whereas in the other patterns there is a greater variety of diameters for a more finely resolved imaging scale. It will be understood that FIGS. 15 through 17B are provided as examples only and that other such geometries may be also used without deviating from the intent of the inventive concept.

In some embodiments of the present inventive concept, the Spherical Eye Model may include a spherical inner surface, cartographic fiducials mapping out orthogonal angular spacings in spherical coordinates, a translucent layered structure of dimension of the order of major retinal layers, and a multi-scale resolution test pattern placed strategically at the posterior pole of the SME, at increasing eccentricities away from the pole towards the scanning periphery at rotational positions around the pole at various eccentricities, as illustrated, for example, in FIG. 18.

The role of the Spherical Model Eye and the angular fiducials will be discussed below. An OCT image of the inner surface of SME is analogous to the image of a retina. If a perfect imaging system with a pupil located at the center of curvature of the SME was available, the optical path lengths to the inner surface would be a constant in all directions. All optical rays would impinge the inner surface of the SME normal to the surface, no correction for refraction at the surface would necessary, and the image would appear flat.

Figure 20:
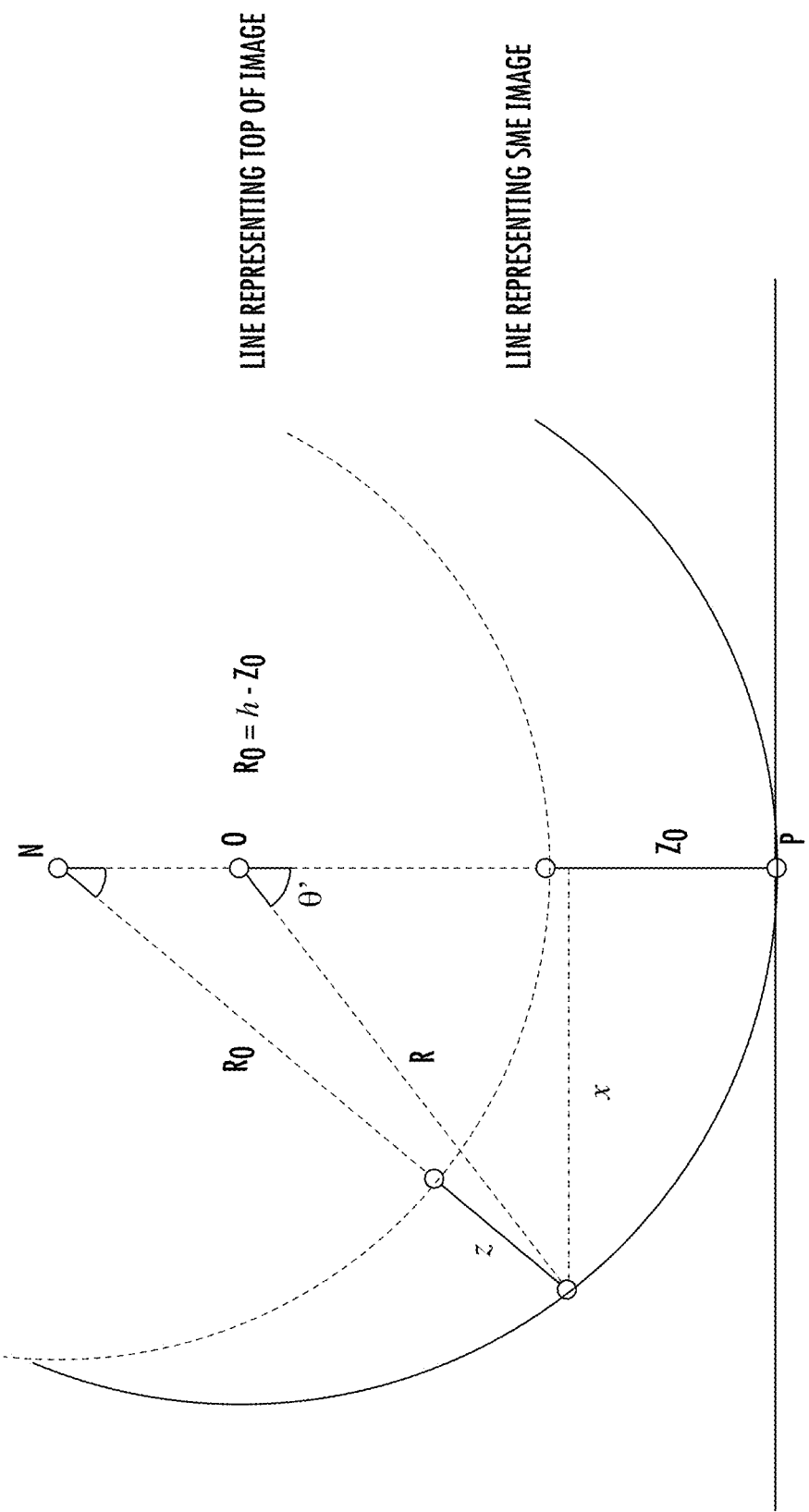
FIG. 20 is a diagram illustrating a line representing a spherical model eye surface and a top of the image in accordance with some embodiments of the present inventive concept.

The first deviation from this condition originates from the displacement of the pupil, for example, a nodal point of the "eye", anterior to the equator of the SME surface, as shown in, for example, FIG. 19A. In an otherwise perfect OCT scanning system, the optical path length to the surface DECREASES as the scan angle increases away from the posterior pole. An OCT image will thus show the inner surface of the SME as CURVED, in relationship to the differences of the curvature of the SME to the maximum radius defined by the distance h, where h is the distance from the nodal plane to the posterior pole of the SME (see FIGS. 19B through 19F). In a perfect scanning system, where the distance h is known, the radius of curvature R of the SME is known, the input scanner geometry is perfectly telecentric to the polar axis at anterior surface of the SME, and the focal optics introduce no path length distortions, we can derive a scan angle at any point along a cross sectional image of the SME inner surface simply by analyzing the local deviation in image flatness as function of position, according to Eqn. (2):

$$\theta = \cos^{-1}\left(\frac{\frac{1}{2}(z_0 - z)^2 - h(z_0 - z + R) + h^2}{(h - (z_0 - z))(h - R)}\right) \quad \text{Eqn. (2)}$$

where z0 is a distance measured from the top of the image frame to the observed surface of the SME at the posterior pole; z is the distance to this observed surface at any lateral position x; h is posterior chamber length of the SME; and R is the radius of curvature of the inner surface of the SME. It may be noted that only the difference (z0–z) are important, the values z0 and z on their own are not. This is illustrated in FIG. 20.

Figure 21A:
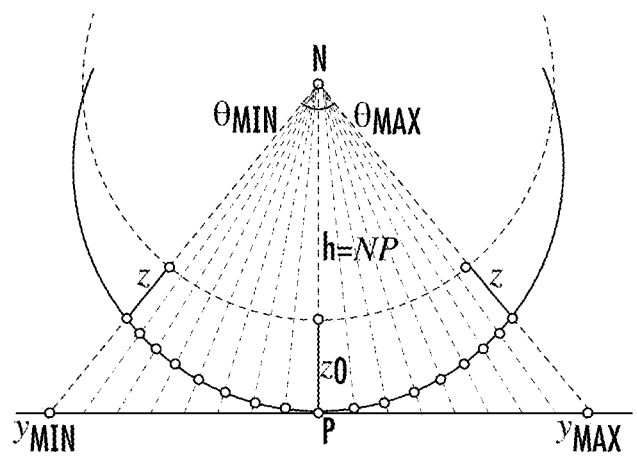
FIGS. 21A and 21B are diagrams illustrating equal-angle fiducials mapped onto the inner surface of the model eye and the enface projection, respectively, in accordance with some embodiments of the present inventive concept.
Figure 21B:
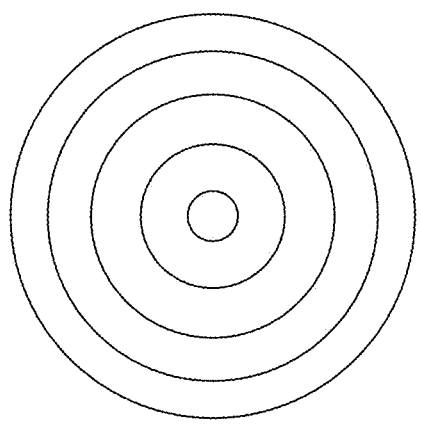

FIGS. 21A and 21B illustrate equal-angle fiducials mapped onto the inner surface of the ME (FIG. 21A) and the associated enface projection (FIG. 21). The fiducials at angular eccentricity θ map onto the cartesian projection plane at radial distance x according to Eqn. (3), the derivation of which is illustrated in FIG. 20, set out below. Deviations from this projection imply that the angular scaling of the instrument is incorrect. Since h, θ and R are known properties of the SME, the deviation will be due to the instrument assumption of posterior chamber length, which can now be calculated.

$$x = R\sin\theta\sqrt{1 - \left(\frac{h-R}{R}\sin\theta\right)^2} + (h - R)\sin\theta\,\cos\theta \quad \text{Eqn. (3)}$$

In reality, real-world OCT imaging systems do not have a perfect constant optical path length across the imaging field. Thus, the optical path length deviation (OPLD) may be further corrected by analyzing the two-dimensional imaged surface of the SME and comparing to the predicted value for the known SME surface, given a measured value of $\hat{z}_0$. The known surface equation as a function of any scan angle for the SME will be rotationally symmetric, and expressed by Eqn. (4):

$$z = \hat{z}_0 + R\left(\sqrt{1 - \left(\frac{h-R}{R}\sin\theta\right)^2} - \cos\theta\right) - h(1 - \cos\theta) \quad \text{Eqn. (4)}$$

The OPLD is given by the difference between the predicted and measured surface height values for a given scan angle θ within the B-scan ϕ, or OPLD(θ, ϕ)=$\hat{z}$–z.

Once we have collected the data from the SME, we can also model the OPLD using a finite series expansion (Eqn. 5) with respect to an orthogonal basis {$Y_i(\theta, \phi)$)} over the domain of interest, such as the spherical harmonics. The coefficients $c_i$ of the expansion are determined using an ordinary least squares fit to the calibration data.

$$OPLD(\theta, \phi) = \sum_{i=0}^{n} c_i Y_i(\theta, \phi) \quad \text{Eqn. (5)}$$

where the equation represents a sum over an orthogonal basis set such as spherical harmonics. The Spherical Model Eye may therefore be used to calibrate a retinal imaging system in three dimensions, and correct for scan distortions with one apparatus.

Some embodiments of the present inventive concept further apply methods discussed herein to the pediatric normative database. In particular, 20% of the image frames will be elected by age interval, these images are triaged with the IQM into equal collections of High, Moderate, and Low quality, and processed with the segmentation recipes according to the local sector classifications and scale according to embodiments discussed herein. Segmentation results and measured thickness distributions will be visually reviewed to identify and categorize outliers and failure modes.

As briefly discussed above, some embodiments of the present inventive concept provide an informative image classification library based on the proposed local IQM. The classification is mutually exclusive and collectively exhaustive in order to be applied efficiently, and the classifications must actually couple to reproducible segmentation recipes. Furthermore, some embodiments may be used to train reliable segmentation that works across a significant the range of images within the pediatric image set without user intervention. Traditional edge detection techniques with finely grained tuning may be utilized.

Figure 22:
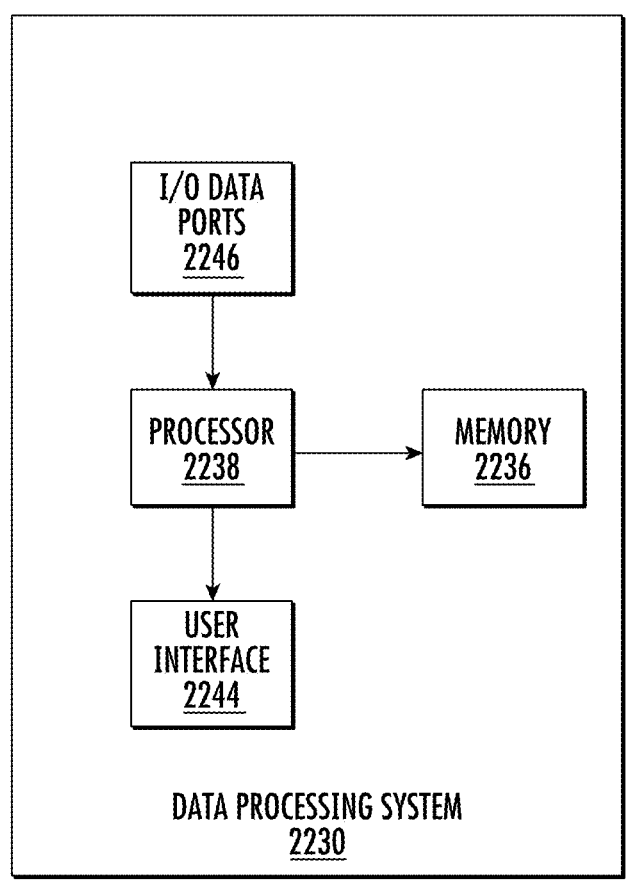
FIG. 22 is a block diagram of a data processor in accordance with some embodiments of the present inventive concept.

As is clear from the embodiments discussed above, some aspects of the present inventive concept may be implemented by a data processing system. The data processing system may be included at any module of the system without departing from the scope of the preset inventive concept. Exemplary embodiments of a data processing system 2230 configured in accordance with embodiments of the present inventive concept will be discussed with respect to FIG. 22. The data processing system 2230 may include a user interface 2244, including, for example, input device(s) such as a keyboard or keypad, a display, a speaker and/or microphone, and a memory 2236 that communicate with a processor 2238. The data processing system 2230 may further include I/O data port(s) 2246 that also communicates with the processor 2238. The I/O data ports 2246 can be used to transfer information between the data processing system 2230 and another computer system or a network using, for example, an Internet Protocol (IP) connection. These components may be conventional components such as those used in many conventional data processing systems, which may be configured to operate as described herein.

One specific example of embodiments of the present inventive concept is discussed above. In particular, pediatric images obtained with a handheld device and stored in a specific database. However, embodiments of the present inventive concept are not limited thereto. As discussed above, embodiments discussed herein may be applied to images in any database obtained with any relevant imaging system. Further embodiments of the present inventive concept will be discussed below.

As discussed above, variability in the size of a subject's eye may cause variability in the resulting images. Accordingly, some embodiments of the present inventive concept may provide methods, systems and computer program products for quantifying structures of the eye that are less sensitive to the variability of the image.

Figure 23:
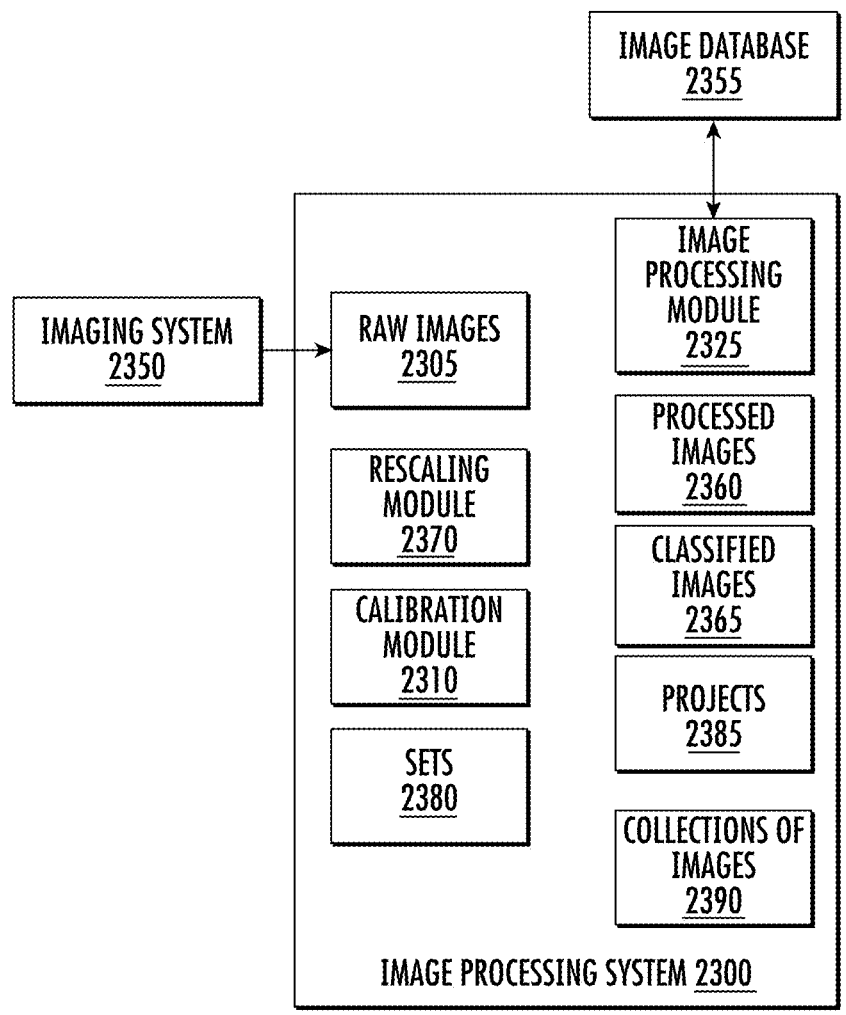
FIG. 23 is a high level block diagram of an image processing system in accordance with some embodiments of the present inventive concept.

Referring now to FIG. 23, a high level block diagram of an image processing system 1000 in accordance with embodiments of the present inventive concept will be discussed. As illustrated, the image processing system 2300 interacts with one or more imaging systems 2350 and one of more image databases 2355, for example, the Leicester Pediatric Image Bank discussed above. The imaging system 2350 may be, for example, a multimodal imaging system, such as OCT. However, embodiments of the present inventive concept are not limited thereto. The imaging system 2350 provides the raw images 2305 to the image processing system 2300. The image processing system 2300 includes various modules and data that provide the various methods and systems discussed above.

Although the imaging system 2350 and the image database 2355 are shown as separate from the image processing system 2300 in FIG. 23, embodiments of the present inventive concept. For example, the imaging system 2350 and/or the image database 2355 may be included with the image processing system without departing from the scope of the present inventive concept.

In particular, as illustrated, some embodiments of the present inventive concept provide a calibration module 2310 in the image processing system 2300. The calibration module (calibration model/artifact) 2310 allows for calibration of systems that are not explicit to the variability of the eye. In other words, as discussed above, eye size varies in all subjects, especially pediatric subjects. Thus, the calibration module 2310 may be used to adjust for variability even in the adult eye. Use of this calibration module may allow systems not specifically meant to quantitatively image the pediatric eye to do so effectively.

Some embodiments of the present inventive concept implement rescaling algorithms (rescaling module 2370) for use in calibration. For example, rescaling algorithms may be used for pediatric data so that existing data may be used to evaluate the pediatric eye. These rescaling algorithms involve rescaling data from cartesian coordinates to spherical coordinates. This is done because the shape of the eye is spherical. Cartesian coordinates require knowledge of the length of the eye of the subject to perform certain calculations, spherical coordinates do not. As discussed above, in pediatric and, to a lesser extent, adult patients, the length of the eye varies and, thus, this information is not always available.

In particular, it is known that an eye grows like a balloon. Some embodiments of the present inventive concept provide model eyes, for example, one model for mature/adult eyes and one model for a pediatric eye. The models behave like an eye, a curvature of the inner surface is defined, for example, an 8 mm curvature for a newborn. The cartesian output from imaging device is used to develop an error function, a correction function. This correction function is used to correct the settings on the imaging system so that the system is calibrated for the subject. It is known that imaging systems are not consistent, calculation of this correction factor will allow systems to be more consistent and allow devices to be interoperable. For example, light traveling from the imaging system through the tissue encounters a curved surface from the air to the tissue when imaging, for example, the cornea. Currently, no correction is made when imaging the retina as it is assumed to be nominal. It is not nominal and should be corrected. Embodiments of the present inventive concept allow for this correction.

As further illustrated in FIG. 23, some embodiments of the present inventive concept provide an image processing module 2325 that allows management of the images from the imaging system 2350 or from an external database 2355. Conventionally, an image was obtained using the imaging system and the whole image was analyzed at one time. However, due to variability spatial regions may appear very different due to the quality of the image. Thus, embodiments of the present inventive concept provide an image processing module 2325 that breaks the image up into different sectors and labels these sectors. The segmented, labeled images can then be used in various applications as discussed further herein.

With respect to segmentation, a conventional segmentation process is discussed above with respect to FIGS. 3A and 3B. However, some embodiments of the present inventive concept may use contouring techniques to connect/bridge sectors. Different techniques may be used depending on the quality of the image/sectors. In other words, one method or set of rules may be used for contiguous good sectors and a different set of rules may be used for a discontinuous sector. If the image quality is not good, a confidence level for the image may be low. For example, for a discontinuous sector, segmentation may be stopped after a plurality of discontinuous gaps in the image are encountered. Furthermore, it may be determined if the gap extends to an edge of the image. The discontinuous portions of the image or segment may be contoured but after a certain number of discontinuities, it may not be worth recovering the image as the image may not be useable. Various rules may be used to determine what images should be contoured and which images should be discarded.

In the process of developing and validating the local segmentation processes, attributes of the image classification and associated segmentation recipes, including methods and tuning parameters are coupled, as per FIG. 11. Among the quantification labels (QuantLabels 1113, FIG. 11) is the Image Quality Metric. The QuantLabels 1113 may be a group of quantitative labels designed to facilitate decision making on managing contours across neighboring segments. Consider the following labels as part of the QuantLabels set:

_isSegmentable=[true/false] tells the program that a segmentation recipe has been developed (or not).

_isContourable=[n,true_false] tells the program that a neighboring sector with an IQM n–grades below the current classification are (or are not) acceptable for contouring. This is a local decision that is simply based on information on the current classification.

typeContour=[n, type] tells the program that if _isContourable=[n, true], specific recipe for contouring is to be drawn from a library of contour types. One such method, for the embodiment where two adjacent segments are of a relatively high IQM is to apply a line across the two regions to create one contiguous sector. A second such method to apply a straight line from the neighboring end of the segmented sector to the first point of the next segmented sector found, and if no segmented sector is found along the line, the contour is abandoned.

After the images are properly segmented, the image processing module may locate the boundaries of the segments. For example, the boundaries may be located by applying refractive indices. A refractive index refers to the ratio of the velocity of light in a vacuum to its velocity in a specified medium. The segment may be defined from the vitreous of the eye to the tissue or to the retina itself. The vitreous is the gel-like fluid that fills your eye. It's full of collagen and proteins that attach to your retina. The vitreous can be replaced with other material during surgery. As you get older, the matrix of your vitreous pull away from the retina. Using the refractive index, no adjustment of the system may be needed if the light is normal to the eye. However, as discussed above, some patients, especially pediatric patients are uncooperative and move during image acquisition. This may cause a non-normal angle, which may cause a more than nominal factor in the image acquisition, resulting in a less than desirable result.

As discussed above, images may be labeled. Some embodiments of the present inventive concept may associate the various images and/or image segments with both qualitative and quantitative labels. Qualitative labels, by definition, describe the quality of something in size, appearance, value, and the like, as opposed to specific quantities. Thus, a qualitative label may be a general indication of whether the image is good or bad. However, the qualitative label may also be given by an expert in the field, for example, a doctor, and the label may be physiological, i.e. this image looks like the sample contains disease.

In contrast, quantitative labels, by definition, related to a type of data that deals with measurable information. In other words, the labels reflect data that is quantifiable, verifiable, and amenable to statistical manipulation classifies as quantitative data. Thus, a quantitative label may include measurable data, for example, signal to noise ratio (SNR), contrast, modality and the like. In some embodiments, these quantitative labels may be automatically assigned without user intervention. For pediatric patients, the quantitative labels may include the gestational age of the child or birth age. Similar labels may be applied for all ages of subjects, i.e., gestations, birth, adolescence, young adult, middle age, geriatric and the like. Embodiments of the present inventive concept are not limited to the pediatric eye.

Thus, each sectored portion of the image may include a unique label including both qualitative and quantitative labels and may be stored with other processed images 1060. Some embodiments of the present inventive concept use autocorrelation techniques. Autocorrelation, generally, is the correlation of a signal with a delayed copy of itself as a function of delay. In other words, it is the similarity between observations as a function of the spatial (generally more relevant to images) or time lag (generally more relevant to time series or signals that may also be visualized or interpreted in the context of the present inventive concept) between them. The analysis of autocorrelation is a mathematical tool for finding repeating patterns, such as the presence of a periodic signal obscured by noise, or identifying the missing fundamental frequency in a signal implied by its harmonic frequencies, for example, a power spectrum). One may apply autocorrelations to a variety of different representations of an image. For example, a sector of the image may be averaged horizontally across the image, which may produce a line that represents the signal strength. In some embodiments, the sectored image may be averaged or a two-dimensional (2D) may be performed without averaging. Regardless of the method used, the results of the autocorrelation of the sectors may be used to provide quantitative label to the sector as discussed above.

As discussed above, some embodiments of the present inventive concept use SHERPA to manage images and associated metadata, organization into meaningful collections (for example, hierarchical ensembles), presentation for visualization, annotation and review, classifying and processing images and metadata with methods drawn from libraries of algorithms and recipes, and analysis of results to draw meaningful conclusions.

Figure 24:
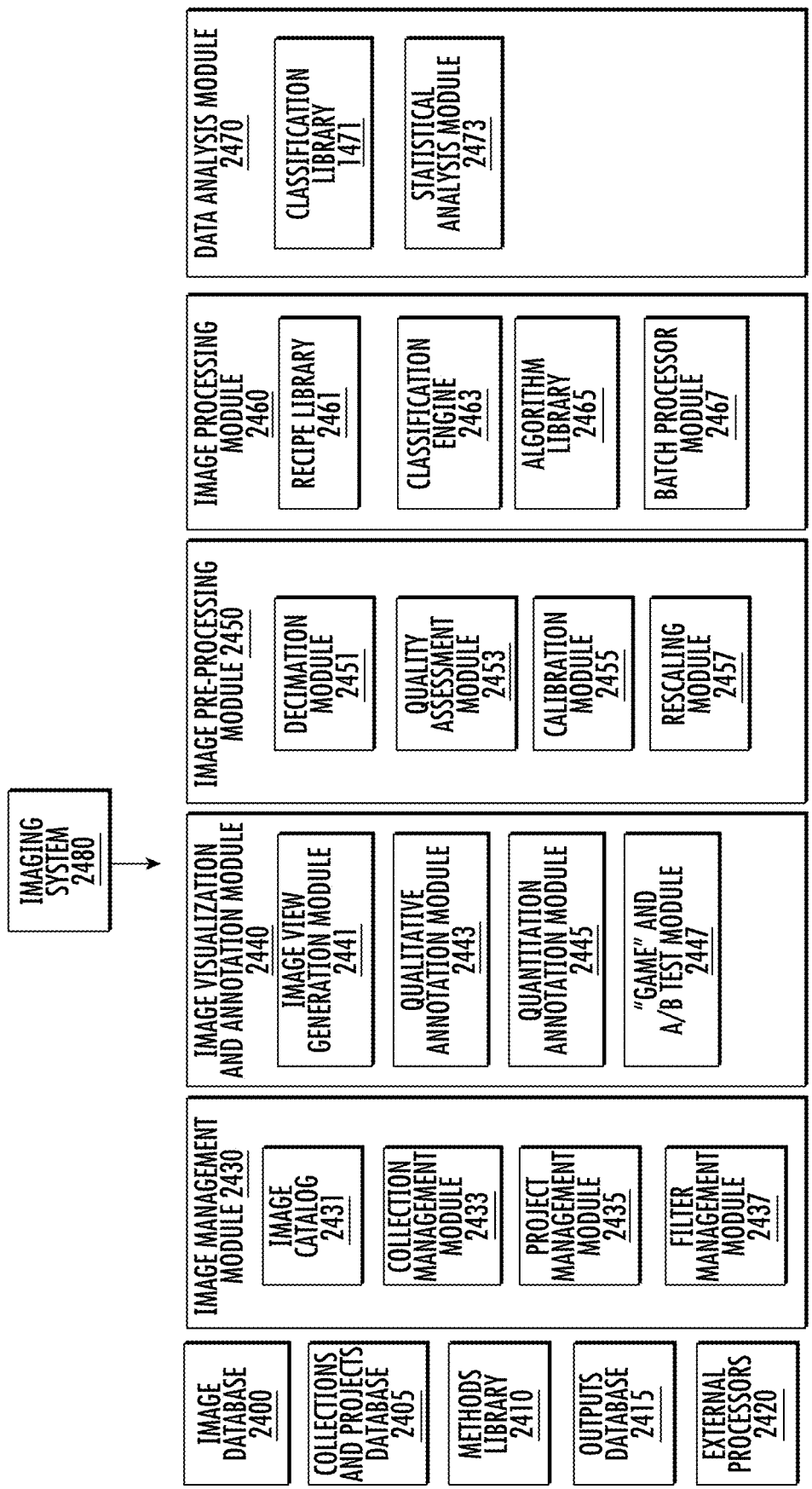
FIG. 24 is a high level block diagram of Systematic Hierarchical Ensembles for Review, Process, and Analysis (SHERPA) in accordance with some embodiments of the present inventive concept.

Referring now to FIG. 24, a high level block diagram of SHERPA will be discussed. As illustrated, the example SHERPA includes an Image Database 2400, a Collections and Projects Database 2405, a Methods Library 2410, An Outputs and Reports Database 2415, and APIs for External Processors 2420. It will be understood that although the SHERPA example of FIG. 24 includes these databases, libraries etc., embodiments of the present inventive concept are not limited thereto. These modules may be divided into more modules or combined without departing from the scope of the present inventive concept.

As further illustrated in FIG. 24, the processing systems include an Image Management Module 2430 including an interface to the Image Catalog 2431, and Collection Management Module 2433, a Project Management Module 2435, and a Filter Management Module 2437 for managing the dimensions against which collections may be created. The SHERPA of FIG. 24 further includes an Image Visualization and Annotation Module 2440, which includes a View Generation Module 2441, a Qualitative Annotation Module 2443, a Quantitative Annotation Module 2445, and a "Game" Module 2447, where the Game Module includes an A/B Test Functionality. As further illustrated, an Image Pre-Processing Module 2450 includes an Image Decimation Module 2451, a Quality Assessment Module 2453, a Calibration Module 2455, and a Rescaling Module 2457. The Image Processing Module 2460 includes a recipe library 2461, the classification engine 2463, the Algorithm Library 2465 and a Batch Processer Module 2467, where the Batch Processor may feed collections to MOSAIC OCULOMICS or an external processor. The Data Analysis Module 2470 includes the Classification Library 2471 and a Statistical Analysis and Reporting Module 2473. It will be understood that all are in communication with an imaging system 2480 and/or an image storage system.

In some embodiments of the present inventive concept, OCT images are imported into a SHERPA Catalog 2431. A Catalog 2431 is the highest level in SHERPA hierarchy, and includes a database of all metadata associated with the image capture device (in the case of the pediatric normative data, multiple Envisu C2300 OCT imaging devices), anonymized subject metadata, including gender, month and year of birth, ethnicity, and Study label applied at the time of data acquisition and associated with the record of Institutional Review Board approval. The Catalog also includes the records of image acquisition, including data of acquisition, scan pattern used, calibration information that is drawn from the device (for example, EXIF data and the equivalent or similar). The Catalog also includes all of the specific records and image files that are saved by the instrument during the image session. In these embodiments, the Envisu saves multiple types of files, including raw data off the detector, raw data that has been processed into a viewable image, and averaged view of the viewable image, if such is available. Additionally, Envisu creates multiple small thumbnail images that representative of different views of the image set.

In some embodiments of the present inventive concept, SHERPA maintains a library of viewable file types with internal instructions for viewing the images within the SHERPA display, and instructions for applying calibration information to such images for quantitation.

In some embodiments of the present inventive concept, Sherpa can import data from multiple different imaging modalities, different vendors, and different image types, with data maintained withing the SHERPA database in a consistent hierarchical fashion.

In some embodiments of the present inventive concept, imaging modalities may include OCT, photography, multispectral or hyperspectral imaging, scanning laser ophthalmoscopy (SLO), adaptive-optics enabled SLO, ultrasound, MRI, X-Rays and CT Scans, Fluoroscopy, microscopy, structured illumination images, videos, strip-charts and time sequences of data drawn from imaging equipment, surgical equipment, anesthesia equipment and the like, electrograms (electro-encephalogram, electro-cardiogram, electro-retinogram and the like).

In some embodiments of the present inventive concept, images and associated metadata may be organized into encounters, individual sequences of data acquisition organized into exams within encounters, individual sets of data that may be independently stored with a specific exam into a generic "scan", and duplicates, copies, thumbnails, and the other closely related images of a scan into a set of "images" associated with a scan.

In some embodiments of the present inventive concept, such images may be of two, three (volumes or videos), or four dimensions (videos of volumes), and may have one or more channels (for example, colors in photographic image and the like).

In some embodiments of the present inventive concept, images may be displayed in a manner suited to the modality and dimension, using methods attached the modality and image type with the SHERPA library of methods.

In some embodiments of the present inventive concept, and Image View may be set to provide a specific orientation to the user. Such a view may be a cross-sectional view of a volume of data in an (x-z) or (y-z) plane (oriented at 90 degrees to each other, and cross-sectional with respect to depth.

Figure 25:
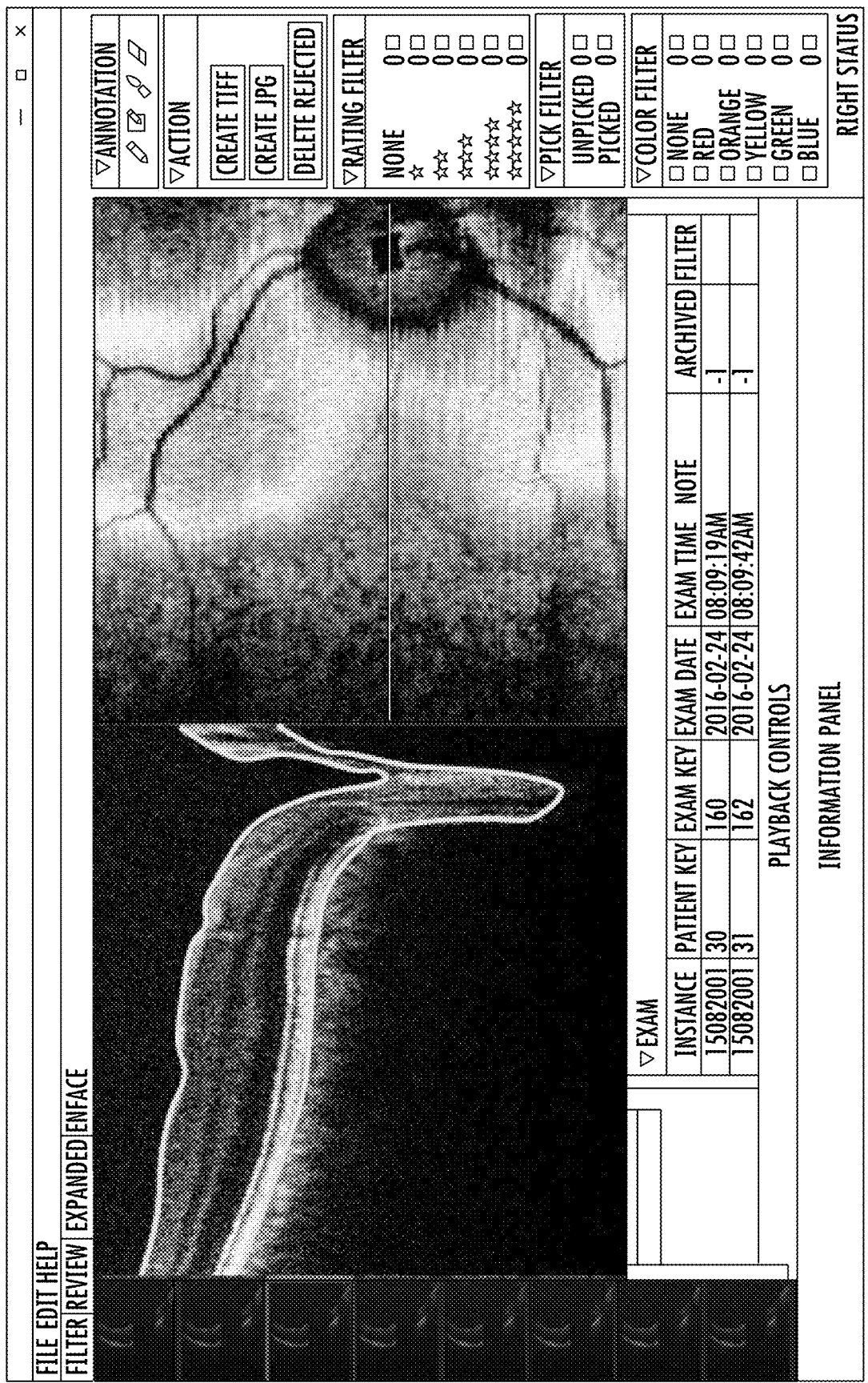
FIG. 25 is a diagram illustrating a B-scan shown in a window next to an enface view of the same volume in accordance with some embodiments of the present inventive concept.

In some embodiments of the present inventive concept, the Image View may be an enface view of a volume of data in an (x-y) plane (oriented at 90 degrees to a cross-section). As shown in FIG. 25, a B-scan may be shown in a window next to an enface view of the same volume, as is common in the art. Embodiments of the present inventive concept enable a new level of utility in the views of the enface projection.

The user has two additional controls. The first allows the user to toggle between modes of projections. The most common mode is an Average Intensity, or Summed Voxel Projection, commonly used in the art and appropriate for soft tissue imaging. The user may have other objectives, and may instead choose a Maximum Intensity Projection, or create their own projection module. SHERPA allows the user to Toggle through a set number of pre-defined projection modes (generally three). The next control is the to toggle between weightings used to calculate the projections. Generally, a uniform weighting has been applied. However, such a weighting may obscure interesting physiology. Therefore, it is useful to be able to toggle through various weighting functions in order to look for informative features that may be otherwise obscured.

Figure 27D:
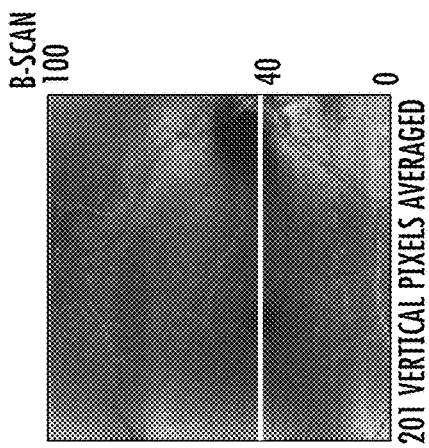
FIGS. 27A through 27G illustrate a B-scan (FIG. 27A) and two C-Scans and related vertical pixels (FIGS. 27B through 27G) in accordance with some embodiments of the present inventive concept.
Figure 27G:
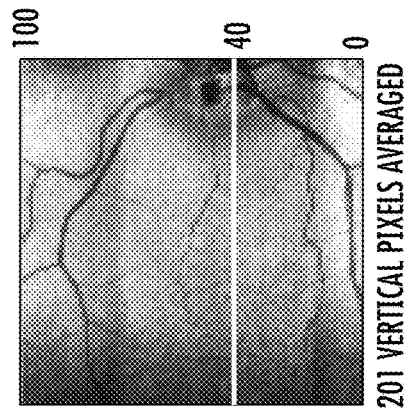
Figure 27C:
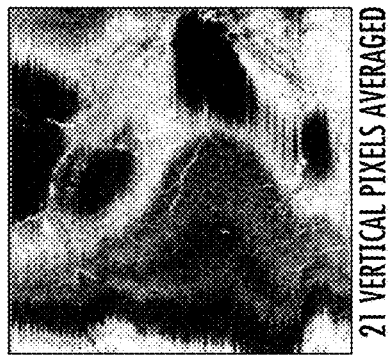
Figure 27F:
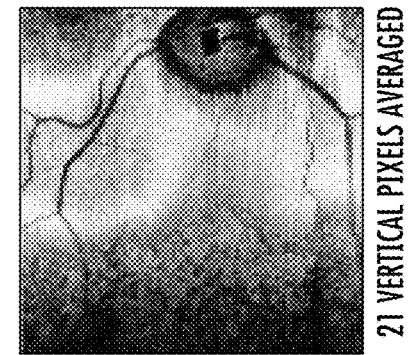
Figure 27B:
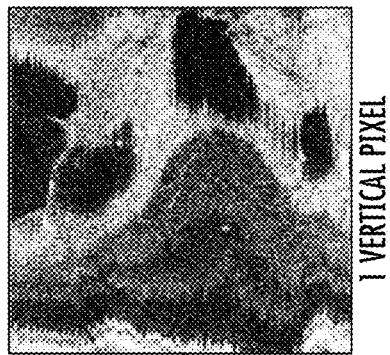
Figure 27E:
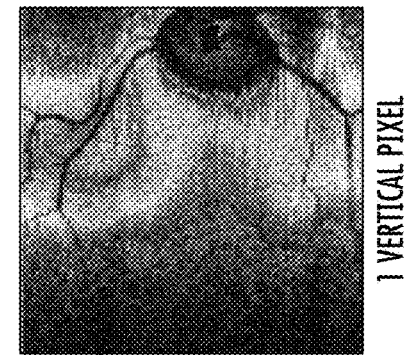
Figure 27A:
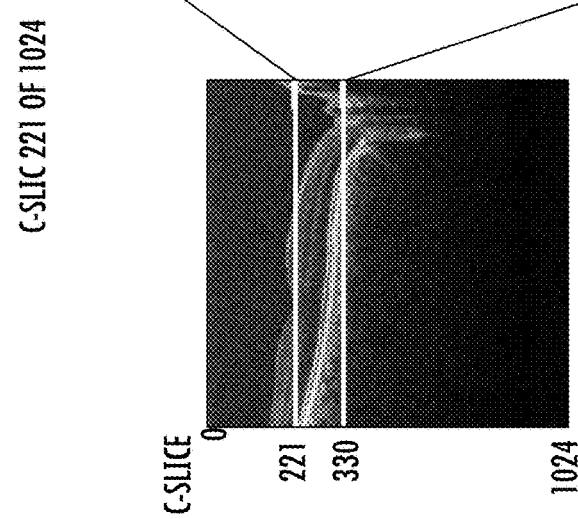

Referring now to FIGS. 27A through 27G, an example of toggling between views will be discussed. As shown in FIG. 27A, a slab (horizontal planes) enface views is taken at two depth locations—at pixel depth 221 (of 1024) and at depth 330. The user may toggle between a single pixel thick view (FIGS. 27B and 27E), a 21 pixel thick view (FIGS. 27C and 27F), and a 201 pixel thick view (FIGS. 27D and 27G). In these embodiments, a triangular weighting function is used around the central depth and the Averaging weight of each plane above and below the center is reduced linearly to edge of the slab thickness.

Figure 26:
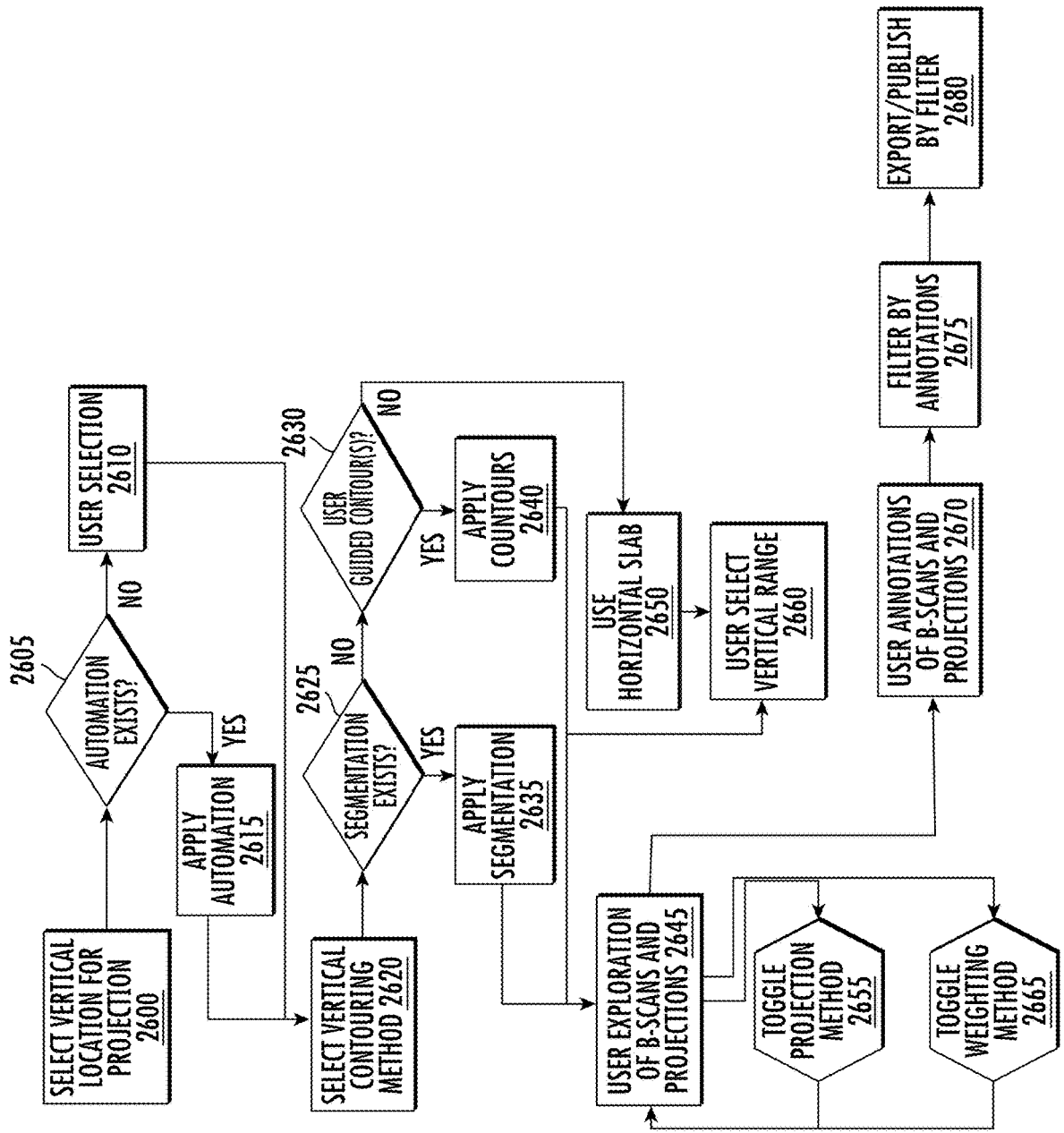
FIG. 26 is a flowchart illustrating toggling between modes of observation of enface views and any given depth location in accordance with some embodiments of the present inventive concept.

In some embodiments of the present inventive concept, the user is able to toggle between modes of observation of enface views and any given depth location as discussed with respect to FIGS. 27A through 27G. Operations for operating systems in according with embodiments of the present inventive concept will now be discussed with respect to the flowchart of FIG. 26. The user may choose between automated and manual modes of selecting the viewed projection location (depth of origin of a C-slice) (block 2600). If automation exists (block 2605), operations proceed to block 2615 where SHERPA will pre-calculate views based on available segmentation information, or rapid-preprocessing based on a pre-defined smoothing and thresholding kernel. This first setup provides depth locations. If automation does not exist (block 2605) operations proceed to block 2610 where the user can make manual selections.

Operations then proceed to determining the contour of the C-slice (block 2620). Again, if segmentation exists (block 2625), the user may choose to use the available segmentation (block 2635) and obtain enface projections between available boundary surfaces. If segmentation does not exist (block 2625), the user (block 263) may instead choose interactive contouring (block 2640) to set boundary surfaces using layer-based annotations (described above) to define upper and lower boundaries that define the enface projection. Alternatively the user may choose to use a planar cut (block 2650) to observe an enface view at any desired depth, such a planar cut having a unique ability to observe oblique cross section between layers, exposing physiology not otherwise readily visible, as discussed above with respect to FIGS. 27A through 27G. The user may select the vertical range (block 2660).

Any of block 2635, 2640 and 2660 proceed to block 2645 where the user can explore the B-scans and projections (block 2645). Details of these explorations are discussed below. However, for example, a user may toggle the projection method (block 2655), the user may toggle the weighting method (block 2665), the user may annotate the B-scans and projections (block 2670), filter by annotations (block 2675) and export/publish by filter (block 2680).

In some embodiments of the present inventive concept, a volumes and video may be viewed frame-by-frame, and decimated, for example into a time-stamped sequence of sub-videos, for better functional management and memory management.

In some embodiments of the present inventive concept any image greater than two dimensions or (dimensions plus channels) may be viewed on a frame-wise (two dimension, single channel) basis, and any views of such images similarly presented by frames.

In some embodiments of the present inventive concept, and frame may be further decimated into sub-frames, or sectors, and any such sector may be subsequently viewed and annotated analogously to their parent frames.

In some embodiments of the present inventive concept, any level of the hierarchy may be annotated, where such annotations may be qualitative annotations represented by graphical icons, user notes, voice recordings, and the like.

In some embodiments of the present inventive concept, a series of independent annotation layers may be applied to any frame. Any layer may be used to apply one more qualitative annotations. Any layer may be toggled to be visible or not visible, may be edited or deleted, and may be stored and recalled.

In some embodiments of the present inventive concept, annotation layers may be named by the user, and restricted to a subset of annotations as defined by the user.

In some embodiments of the present inventive concept, annotation layers may be comprised of quantitative, rather than qualitative information. Such Quantitative information may include graphical icons placed or drawn onto a frame. Quantitative information may be of type POINTS (a single location identifier), CALIPERS (a line between two points), ANGLES (an object defined by the location of a vertex and the angle between two lines drawn from the vertex), SQUARES (rectangular objects defined by the location of four vertices along two orthogonal axes with an associated area), CIRCLES (elliptical objects defined by the location of a center and two orthogonal axes with an associated area), and AREAS (irregular areas defined by a point cloud and associated with an area)

In some embodiments of the present inventive concept, Quantitative Annotations shall be defined by Attributes (type, name, description) and Values (locations, areas). Empty Quantitative Annotation tables shall be DEFAULT or USER DEFINED collections of Annotations and their Attributes that may be applied to A frames, with empty Values pending application.

In some embodiments of the present inventive concept, Annotation Tables may be defined as GLOBAL (available without restriction for use within a CATALOG) or LOCAL to a COLLECTION (constrained to a given COLLECTION and all PROJECTS therein) or LOCAL to a PROJECT only.

In some embodiments of the present inventive concept, Users shall be able to CREATE, EDIT, DELETE, IPORT, EXPORT Annotation TABLES.

In some embodiments of the present inventive concept, the data is organized into a primary three-tier hierarchy. In this primary hierarchy, all records of origin are stored in a Catalog. Catalogs may be filtered according to a body of metadata labels into Collections. Collections may be assigned into Projects.

In some embodiments, the catalogs may be used to make "collections." As used herein, a "collection" refers to a set of images filtered according to one or more attributes of the metadata accessible within the database of the Catalog. A Collection is a "set" of data with a commonality defined by the user. The commonality may be as simple or rich as the user desires to achieve any particular objective. The tools in accordance with embodiments of the present inventive concept may be used to build collections, track and share collections, and the like.

In some embodiments, one or more Projects may be established within any collection. Projects may be used to assigned different tasks to one or more users, ensuring that the users have access to the exact same data, for example, the Collection, for performing their specific task. For any of the quantitative analyses, Projects may be managed inside the collections database.

In some embodiments, the sectored images may be recombined to recreate the original image but maintaining the labels applied when sectored. These recombined images may be used in accordance with embodiments discussed herein.

Using the qualitative and quantitative labels applied to the sectors of images as discussed above, the labeled images may be organized into "classifications." As used herein, a "classification" refers to a specification of a group of images, data and method that may be used to create groups for analysis, attach labels for search, interoperability, and re-use, attach methods that are guaranteed, validated, tested, or likely to successfully operate on objects of a given classification. Classifications are an organizational structure that is intended to be used orthogonally to the hierarchy of Catalogs, Collection, and Projects, and may be thought of as any piece of metadata, but metadata that provides more specific information, examples, labels and attributes than may be found in the origin metadata. Such classifications as defined in the present inventive concept lend themselves to grouping images, frames, sectors and the like into groups that can first be used to train image processing and deep learning algorithms, and second may be used in subsequent decision making and diagnostics. It will be understood that sectors/images may be assigned to one or more classifications, depending on the objective of the classification schema. In other words, the same image may be included in multiple classification groups. On the other hand, the application of any qualitative or quantitative label that forms a piece of a classification schema should be carefully unambiguous. A two-channel, two-color image file MAY be red and green at the same time, but a single channel from such a file must be EITHER red OR Green.

In some embodiments of the present inventive concept, a quantified normative database of gray-scale OCT images is created. The metadata includes, for example, gender, ethnicity, age at time of imaging, and the laterality of the imaged eye (eft or right). Once the images are sectored, labeled and classified as discussed above, these images can be used to provide a normative database of healthy eyes that may be used to contrast with unhealthy eyes for purposes of, for example, training and diagnosis.

As discussed above, some embodiments of the present inventive concept provide methods, systems and computer program products for organizing images; managing parallel projects for manually marking and labeling images, decimating images into sectors; applying manual labels to segment boundaries of images; storing manual segmentation results in records associated with such projects; applying automated algorithmic labels to images that quantify an image quality metric; applying an automated algorithmic label to images that quantify one or more structural attributes; organizing images or image sectors into classifications according to combinations of image quality and structural metrics; applying automated boundary segmentation recipes (algorithms plus specific tuning parameters) to image sectors according to the classification for such a sector; segmenting these images at the sector level; applying nearest-neighbor logic to contour the automated segment from one sector to its neighbor according to a set of search rules; terminating the contour where the image fails to exist or where image quality is below a defined threshold; storing segmented surfaces numerically as a reduced data set associated with the original image; recombing sectors into their original image construction; applying the sector-wise segmentation as overlays to the image.

As discussed above, some embodiments of the inventive concept further provide for classifying the images, sectors, and segmentations according to clinically relevant classifications, including gender, ethnicity, and age at time of imaging; further classifying images according the presence of clinically relevant landmarks, such as fovea, macula, optic nerve head, and the like; automating the creation of one or more Collections along any dimensions of interest drawn from these clinical classifications; automating the creation of one or more Projects to from such collections; establishing and executing methods to operate on the derived and reduced data set to obtain relevant statistical comparisons between manual and automated processes, statistical comparisons between genders, ages, ethnicities, and the like.

As discussed above, in some embodiments of the present inventive concept, a calibration apparatus and calibration method is used to calibrate devices used to collect images, and to apply such calibrations to the image files collected by calibrated devices, where such calibration specifically removes the dependence of subject eye length from the numerical scaling of the images.

As discussed above, in some embodiments of the present inventive concept, the calibration apparatus and calibration method further include axial thickness and lateral resolution artifacts to provide inter-device and inter-manufacturer calibration in order to improve interoperability of OCT imaging systems and the normative data set that is a subject of the present inventive concept.

As discussed above, in some embodiments of the present inventive concept, a refractive correction will be applied to the segmented images in order to correct for refraction at the vitreous-retina interface, appropriately scale the vitreous region and retina regions according to refractive index, to improve the accuracy of visualization posterior to the vitreous-retina interface, and to improve the accuracy of thickness measurements, particularly on tilted images and image regions peripheral to the posterior pole (for example, fovea).

It will be understood that aspects of the present inventive concept may be used to support projects that may involve machine learning/augmented reality (AI).

For example, from the collections, embodiments of the present inventive concept may use segmentation rules to take parts of the collections and assign these parts of the collections to a project, for example, a validation project. Three projects may be assigned to a same collection. The first project may involve the collection being annotated manually by experts. For example, the edges of the images may be marked by experts. This is considered the gold standard.

The second project may be used to provide a development set for training algorithms. A test set may be used to test manually versus development set. In this project, an automated algorithm may be applied during development and the algorithm is allowed to make corrections and learn from the process. However, a validation project uses escrowed data so that there is no risk of contaminating the data. This data is never seen by the development set and therefore provides real results. It will be understood that projects may be customized for any purpose, these projects are only provided for example. Allocation rules may be written and then allocation may be commanded based on the rules.

Some embodiments of the present inventive concept allow comparison between a gold standard project (experts) and a development project. The differences encountered between the data in the two projects may be used to correct the errors and improve automation. In other words, this provided a feedback loop to the algorithm. For example, it is assumed that the gold standard it correct. When a discrepancy between the development project and the gold standard project is located, the algorithm may be corrected so that same error does not occur again.

Furthermore, some embodiments of the present inventive concept enable creation of different "hold out sets" that may be used to verify that things are working on different sets withing the collection. For example, only female, only male, Caucasian, African American and the like.

Some embodiments of the present inventive concept further allow third parties to be trained and then used to mark images. For example, collections and projects may be fed to different groups of people for marking including experts, intelligent adult groups, children and the like. This data may be used to refine the algorithm. In some embodiments, this may be provided in a form of a game for people to play where the results of the game are used in the algorithm. In particular, using experts to provide the gold standard can be very expensive, therefore, embodiments of the present inventive concept provide images to different types and groups of people who trained through the "game." These people are not paid, but the data can be used as a measuring stick for other data.

Figure 28:
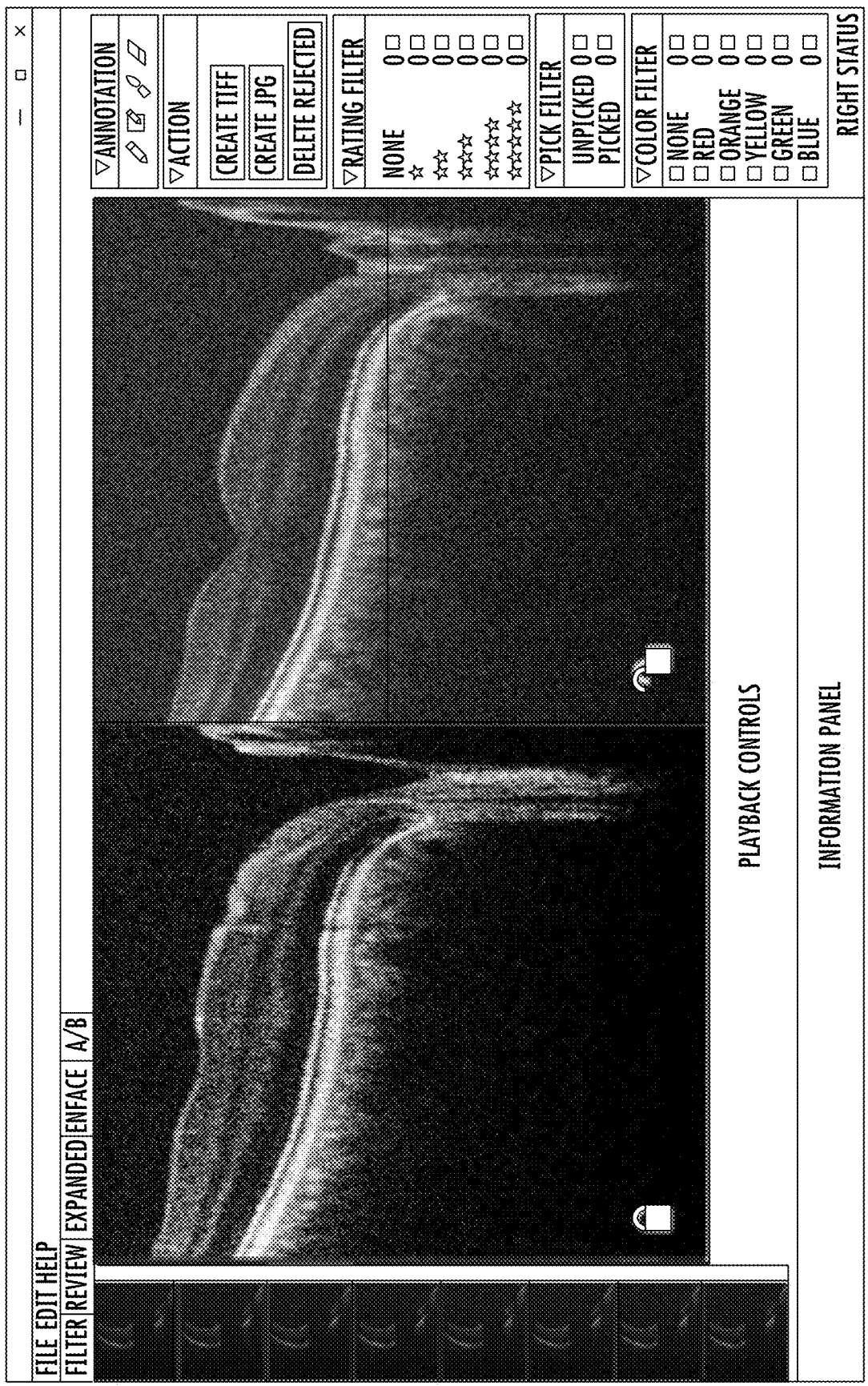
FIG. 28 is a diagram an A/B presentation of two frames of an optical coherence tomograph (OCT) image side-by-side in accordance with some embodiments of the present inventive concept.

In some embodiments of the present inventive concept, a simple "game" means comparing one image to a second image in an A/B test, where the A/B test is posed against a reference question (for example, which image is "better", or "brighter", or "lower noise," or which image shows a "fovea" or which image shows and "optic nerve head"). In some embodiments of the present inventive concept, a player is shown a full-factorial pairwise set of images for comparison, and their score is ranked against an automated assessment or other players. In further embodiments of the present inventive concept, the images are drawn from a specific SHERPA Collection, and each question and each player represent a specific PROJECT withing the Collection. In still further embodiments of the present inventive concept, the player may "advance" in the game by being asked more difficult, more ambiguous, or more clinically-specific questions. This game serves the dual purpose of training algorithms with human feedback, and engaging users in increasingly more substantive games. An A/B presentation of two frames of an OCT image side-by-side is shown, for example, in FIG. 28.

As discussed briefly above, some embodiments of the present inventive concept provide methods, systems and computer program products for storing image data that makes the data searchable and reusable. This data can be used for diagnosis, testing, training, refining and the like.

In the drawings and specification, there have been disclosed exemplary embodiments of the inventive concept. However, many variations and modifications can be made to these embodiments without substantially departing from the principles of the present inventive concept. Accordingly, although specific terms are used, they are used in a generic and descriptive sense only and not for purposes of limitation, the scope of the inventive concept being defined by the following claims.

That which is claimed is:

1. A method for segmenting images, the method comprising:
    tessellating an image obtained from one of an image database and an imaging system into a plurality of sectors;
    classifying each of the plurality of sectors by applying one or more pre-defined labels to each of the plurality of sectors, wherein the pre-defined labels indicate at least one of an image quality metric (IQM) and a metric of structure;
    assigning each of the plurality of classified sectors an Image Quality Classification (IQC); and
    identifying anchor sectors among the plurality of classified sectors, wherein identifying comprises:
        applying the assigned IQC to identify columns across the image as candidates for initial segmentation;
        using the assigned IQC along each column to identify rows of maximum probability of containing segmentable images; and
        identifying an array of high-probability sectors to become anchor cells for initiating segmentation;
    applying filtering and edge detection to identify target boundaries;
    applying contouring across contiguous sectors and using the assigned IQC as a guide to complete segmentation of an edge between any two identified anchor sectors; and
    smoothing across segmented regions to increase parametric second-order continuity.

2. The method of claim 1, wherein tessellating the image comprises applying a repeating geometric pattern to the image to provide a plurality of sectors in a grid and wherein each of the plurality of sectors are shaped like the geometric pattern.

3. The method of claim 2, wherein the geometric pattern comprises one of a rectangular geometric pattern and a hexagonal geometric pattern.

4. The method of claim 1, further comprising:
    determining if the assigned IQC indicates a below-threshold probability of finding an edge; and
    completing a bridge to preserve a gap if it is determined that the assigned IQC indicates a below-threshold probability of finding an edge.

5. The method of claim 1, wherein classifying each of the plurality of sectors comprises labeling each of the plurality of sectors with one or more of the following types of labels: System-Specific, Subject-Independent grades, or metrics; Subject-Specific, Quality Independent grades; Quality-Specific grades and Expert labels.

6. The method of claim 5, wherein the expert labels are obtained by expert annotation of the images wherein the expert physically marks the images at pre-defined points.

7. The method of claim 1, wherein the image database comprises images acquired using healthy control subjects to develop an age-stratified normative database.

8. A system for segmenting images, the system comprising:
    an image processing module configured to receive images from at least one of an image database and an image system and the image processing module:
    tessellates an image obtained from the image database and/or the imaging system into a plurality of sectors;
    classifies each of the plurality of sectors by applying one or more pre-defined labels to each of the plurality of sectors, wherein the pre-defined labels indicate at least one of an image quality metric (IQM) and a metric of structure;
    assigns each of the plurality of classified sectors an Image Quality Classification (IQC); and
    identifies anchor sectors among the plurality of classified sectors, wherein the anchor sectors are identified by:
        applying the assigned IQC to identify columns across the image as candidates for initial segmentation;
        using the assigned IQC along each column to identify rows of maximum probability of containing segmentable images; and
        identifying an array of high-probability sectors to become anchor cells for initiating segmentation;
    applies filtering and edge detection to identify target boundaries;
    applies contouring across contiguous sectors and using the assigned IQC as a guide to complete segmentation of an edge between any two identified anchor sectors; and
    smooths across segmented regions to increase parametric second-order continuity.

9. The system of claim 8, wherein the image processing module further tessellates the image by applying a repeating geometric pattern to the image to provide a plurality of sectors in a grid and wherein each of the plurality of sectors are shaped like the geometric pattern.

10. The system of claim 9, wherein the geometric pattern comprises one of a rectangular geometric pattern and a hexagonal geometric pattern.

11. The system of claim 8, wherein the image processing module further:
    determines if the assigned IQC indicates a below-threshold probability of finding an edge; and
    completes a bridge to preserve a gap if it is determined that the assigned IQC indicates a below-threshold probability of finding an edge.

12. The system of claim 8, wherein the image processing module further classifies each of the plurality of sectors by labeling each of the plurality of sectors with one or more of the following types of labels: System-Specific, Subject-Independent grades, or metrics; Subject-Specific, Quality Independent grades; Quality-Specific grades and Expert labels.

13. The system of claim 12, wherein the expert labels are obtained by expert annotation of the images wherein the expert physically marks the images at pre-defined points.

14. The system of claim 8, wherein the image database comprises images acquired using healthy control subjects to develop an age-stratified normative database.

15. A computer program product for segmenting images, the computer program product comprising:
- a non-transitory computer readable storage medium having computer readable program code embodied in said medium, the computer readable program code comprising:
- computer readable program code that tessellates an image obtained from one of an image database and an imaging system into a plurality of sectors;
- computer readable program code that classifies each of the plurality of sectors by applying one or more pre-defined labels to each of the plurality of sectors, wherein the pre-defined labels indicate at least one of an image quality metric (IQM) and a metric of structure;
- computer readable program code that assigns each of the plurality of classified sectors an Image Quality Classification (IQC); and
- computer readable program code that identifies anchor sectors among the plurality of classified sectors, wherein the computer readable program code that identifies comprises:
  - computer readable program code that applies the assigned IQC to identify columns across the image as candidates for initial segmentation;
  - computer readable program code that uses the assigned IQC along each column to identify rows of maximum probability of containing segmentable images; and
  - computer readable program code that identifies an array of high-probability sectors to become anchor cells for initiating segmentation;
- computer readable program code that applies filtering and edge detection to identify target boundaries;
- computer readable program code that applies contouring across contiguous sectors and using the assigned IQC as a guide to complete segmentation of an edge between any two identified anchor sectors; and
- computer readable program code that smooths across segmented regions to increase parametric second-order continuity.

16. The computer readable program code of claim 15, wherein the computer readable program code that tessellates the image comprises computer readable program code that applies a repeating geometric pattern to the image to provide a plurality of sectors in a grid and wherein each of the plurality of sectors are shaped like the geometric pattern.

17. The computer program product of claim 16, wherein the geometric pattern comprises one of a rectangular geometric pattern and a hexagonal geometric pattern.

18. The computer program product of claim 15, further comprising:
- computer readable program code that determine if the assigned IQC indicates a below-threshold probability of finding an edge; and
- computer readable program code that completes a bridge to preserve a gap if it is determined that the assigned IQC indicates a below-threshold probability of finding an edge.

19. The computer program product of claim 15, wherein the computer readable program code that classifies each of the plurality of sectors comprises computer readable program code that labels each of the plurality of sectors with one or more of the following types of labels: System-Specific, Subject-Independent grades, or metrics; Subject-Specific, Quality Independent grades; Quality-Specific grades and Expert labels.

20. The computer program product of claim 19, wherein the expert labels are obtained by expert annotation of the images wherein the expert physically marks the images at pre-defined points.

* * * * *